United States Patent
Abe et al.

(10) Patent No.: US 7,697,770 B2
(45) Date of Patent: Apr. 13, 2010

(54) PICTURE CODING METHOD AND PICTURE DECODING METHOD

(75) Inventors: Kiyofumi Abe, Kadoma (JP); Shinya Kadono, Nishinomiya (JP); Satoshi Kondo, Yawata (JP); Makoto Hagai, Moriguchi (JP)

(73) Assignee: Panasonic Corporation, Osaka (JP)

( * ) Notice: Subject to any disclaimer, the term of this patent is extended or adjusted under 35 U.S.C. 154(b) by 252 days.

(21) Appl. No.: 11/976,552

(22) Filed: Oct. 25, 2007

(65) Prior Publication Data

US 2008/0063056 A1 Mar. 13, 2008

Related U.S. Application Data

(60) Continuation of application No. 11/453,084, filed on Jun. 15, 2006, now Pat. No. 7,308,144, which is a division of application No. 10/479,831, filed as application No. PCT/JP03/03794 on Mar. 27, 2003, now Pat. No. 7,095,896.

(30) Foreign Application Priority Data

Apr. 15, 2002 (JP) .............................. 2002-112665

(51) Int. Cl.
*G06K 9/36* (2006.01)
*H04B 1/66* (2006.01)
*H03M 7/00* (2006.01)

(52) U.S. Cl. ..................... 382/238; 375/240.12; 341/67

(58) Field of Classification Search ......... 382/232–251; 375/240.03, 240.12, 240.16, 240.2, 240.23, 375/240.24; 348/14.13; 341/67, 106
See application file for complete search history.

(56) References Cited

U.S. PATENT DOCUMENTS

| | | | |
|---|---|---|---|
| 5,500,678 A | 3/1996 | Puri | |
| 5,510,841 A | 4/1996 | Iwamura | |
| 5,512,952 A | 4/1996 | Iwamura | |
| 5,563,593 A | 10/1996 | Puri | |
| 5,576,765 A | 11/1996 | Cheney et al. | |

(Continued)

FOREIGN PATENT DOCUMENTS

EP 0 876 058 11/1998

(Continued)

OTHER PUBLICATIONS

Richardson, I. E.G., entitled "*H.264/MPEG-4 Part 10 White Paper, Variable-Length Coding*", MPEG-4 Part 10 White Paper, Oct. 17, 2002 (XP002258064).

(Continued)

*Primary Examiner*—Kanji Patel
(74) *Attorney, Agent, or Firm*—Wenderoth, Lind & Ponack L.L.P.

(57) ABSTRACT

The method includes the following units: a coefficient number detecting unit (109) for detecting the number of coefficients which has a value other than 0 for each block according to the generated coefficient, a coefficient number storing unit (110) for storing the number of coefficients detected, a coefficient number coding unit (111) for selecting a table for variable length coding based on the numbers of coefficients in the coded blocks located on the periphery of a current block to be coded with reference to the selected table for variable length coding so as to perform variable length coding for the number of coefficients.

2 Claims, 30 Drawing Sheets

U.S. PATENT DOCUMENTS

| | | | |
|---|---|---|---|
| 5,668,599 | A | 9/1997 | Cheney et al. |
| 5,740,283 | A | 4/1998 | Meeker |
| 5,777,679 | A | 7/1998 | Cheney et al. |
| 5,821,887 | A | 10/1998 | Zhu |
| 5,974,184 | A | 10/1999 | Eifrig et al. |
| 6,020,923 | A | 2/2000 | Hosaka et al. |
| 6,292,588 | B1 | 9/2001 | Shen et al. |
| 6,341,144 | B1 * | 1/2002 | Haskell et al. ........... 375/240.2 |
| 6,449,395 | B1 | 9/2002 | Kobayashi |
| 6,473,459 | B1 | 10/2002 | Sugano et al. |
| 6,625,211 | B1 | 9/2003 | Etoh et al. |
| 6,658,157 | B1 | 12/2003 | Satoh et al. |
| 6,907,142 | B2 * | 6/2005 | Kalevo et al. ............... 382/238 |
| 2002/0037108 | A1 | 3/2002 | Matsumoto |

FOREIGN PATENT DOCUMENTS

| | | |
|---|---|---|
| JP | 4-100390 | 4/1992 |
| JP | 4-223773 | 8/1992 |
| JP | 5-347710 | 12/1993 |
| JP | 6-232765 | 8/1994 |
| JP | 7-107492 | 4/1995 |
| JP | 10-191324 | 7/1998 |
| KR | 2002-0006150 | 1/2002 |
| TW | 373408 | 11/1999 |
| TW | 393856 | 6/2000 |

OTHER PUBLICATIONS

Bjontegaard, G., entitled *"Improved Low Complexity Entropy Coding for Transform Coefficients"*, Joint Video Team (JVT) of ISO/IEC MPEG & ITU-T VCEG (ISO/IEC JTC1/SC29/WG11 and ITU-T SG16 Q6), XX, XX, Jan. 29, 2002 (XP002257294).

Hartung, F., et al., entitled *"Improved Encoding of DCT Coefficients for Low Bit-Rate Video Coding Using Multiple VLC Tables"*, Image Processing, 1999, ICIP 99. Proceedings. 1999 International Conference of Kobe, Japan Oct. 24-28, 1999, Piscataway, NJ, USA, IEEE, US, Oct. 24, 1999, pp. 51-55, (XP010368953).

* cited by examiner

Fig. 11
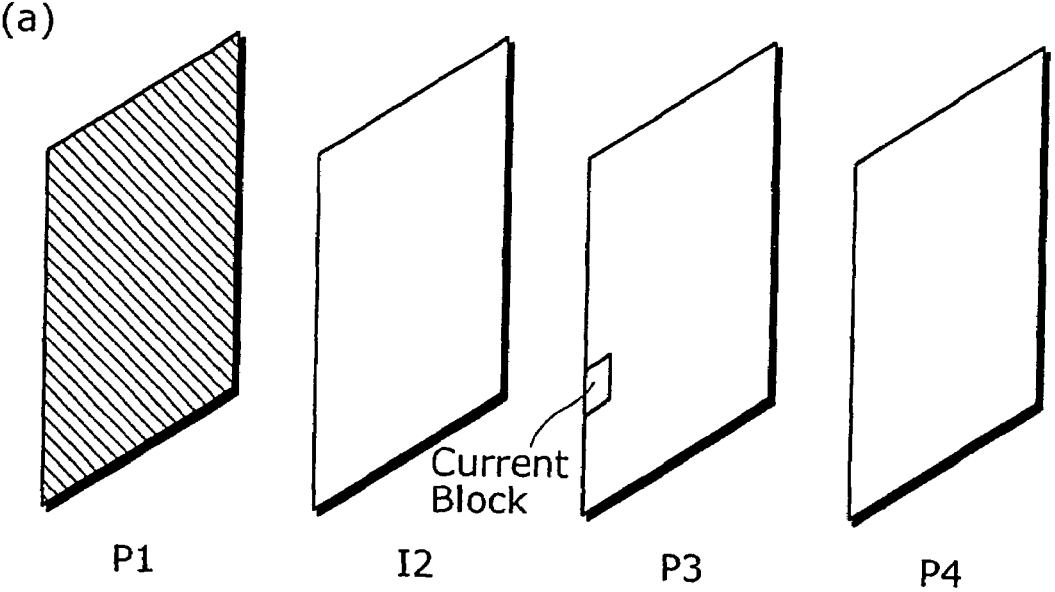
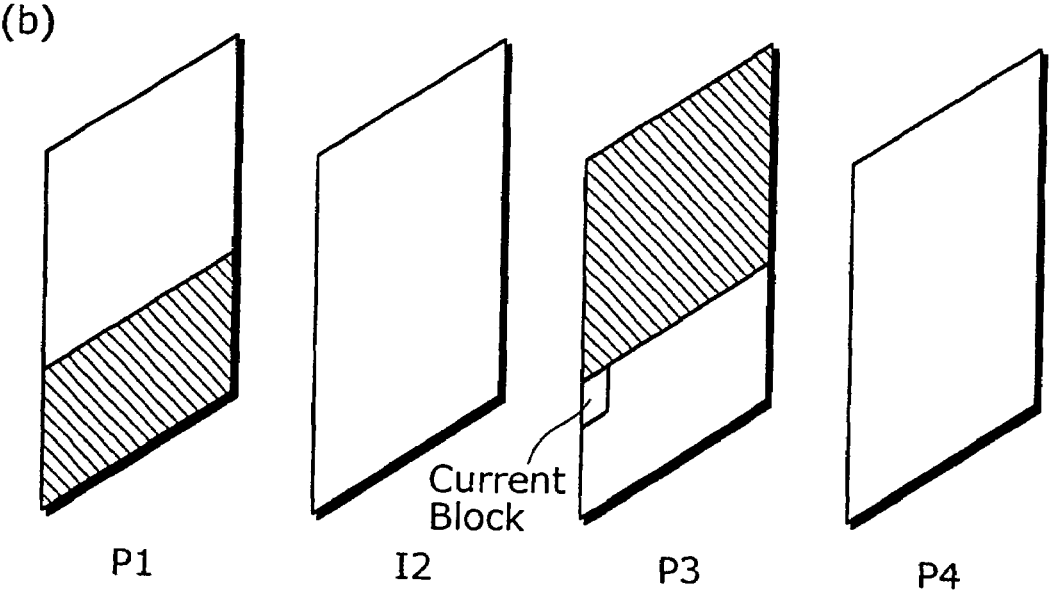

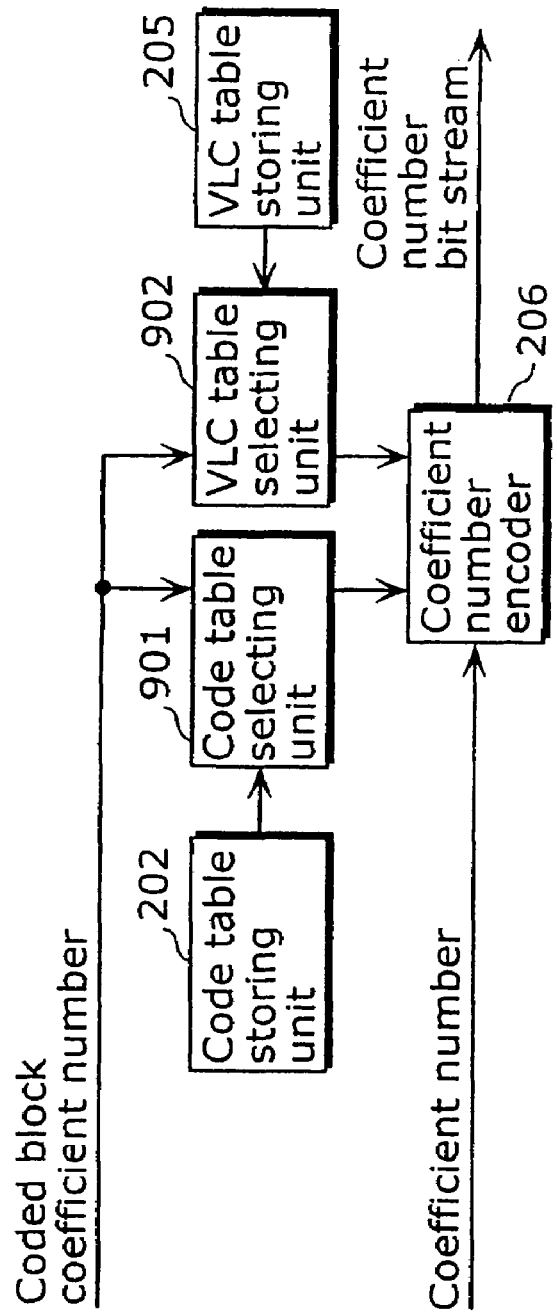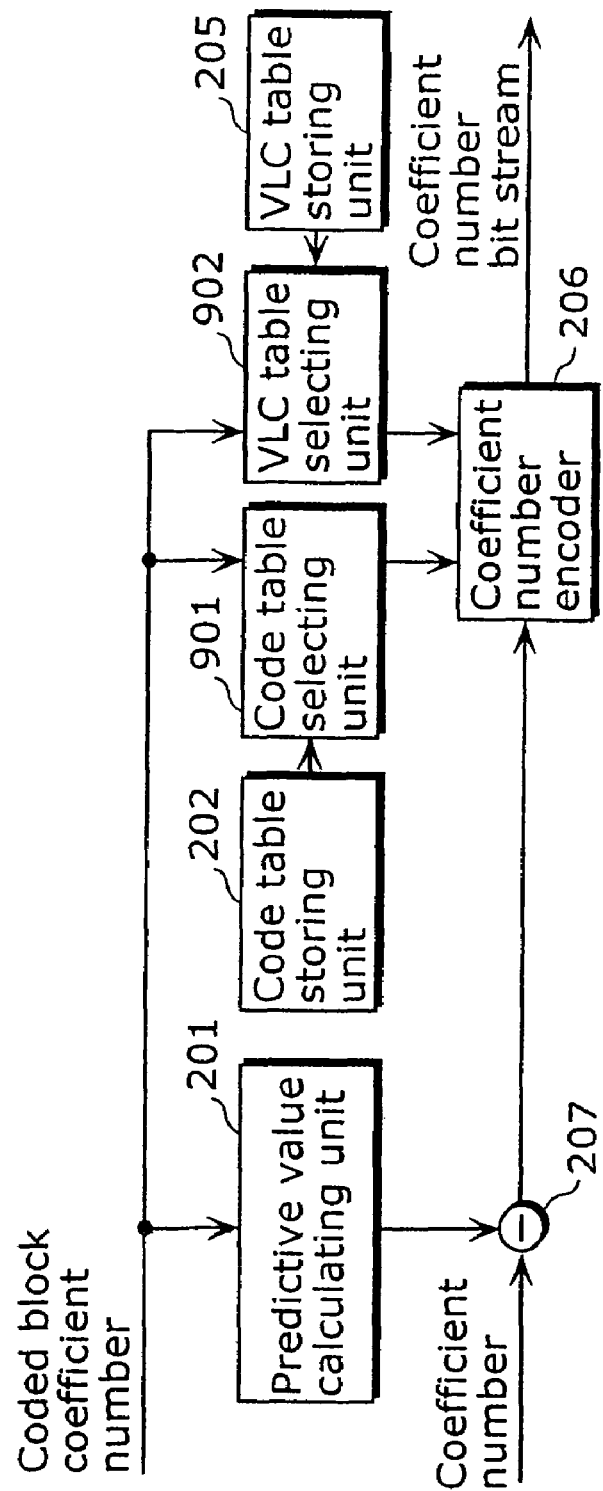
Fig. 12A
Fig. 12B

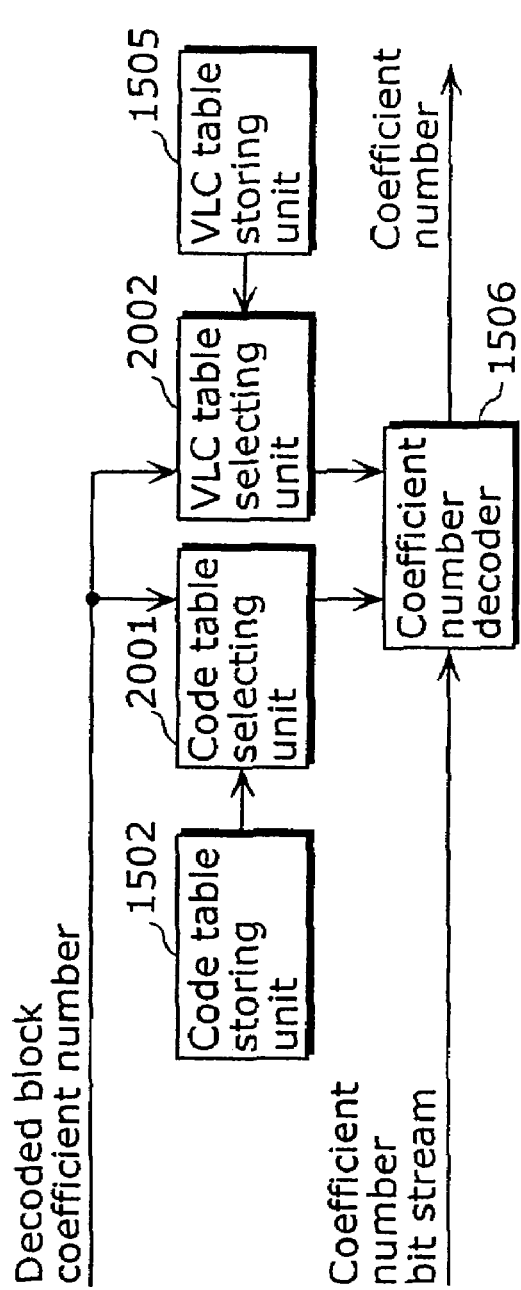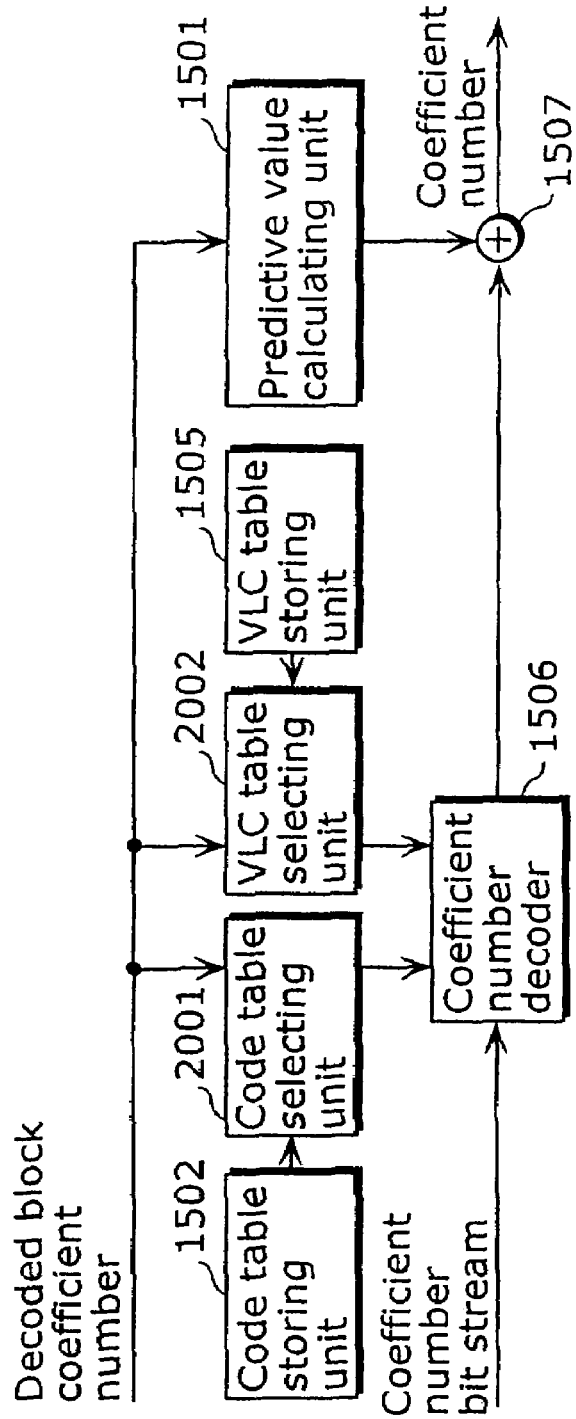
Fig. 23A
Fig. 23B

PICTURE CODING METHOD AND PICTURE DECODING METHOD

This application is a continuation of U.S. patent application Ser. No. 11/453,084, filed Jun. 15, 2006 now U.S. Pat No. 7,308,144, which is a divisional of U.S. patent application Ser. No. 10/479,831 filed Dec. 8, 2003, now Pat. No. 7,095,896, which is the National Stage of International Application No. PCT/JPO3/03794, filed Mar. 27, 2003.

TECHNICAL FIELD

The present invention relates to a picture coding method and a picture decoding method for coding an image digitally so as to transfer or store it.

BACKGROUND ART

A coding of moving pictures, in general, divides a picture into a certain size of blocks and performs intra picture prediction and inter picture prediction for each block. It then applies orthogonal transformation, for example, discrete cosine transform or the like for each block of the smallest unit of a division (i.e. 4×4 pixels) so as to perform coding using variable length coding based on run level coding for coefficients showing spatial frequency components gained by orthogonal transformation.

The variable length coding assigns variable length code to values of the coefficients contained in the block to which orthogonal transformation is applied (level) as well as to numbers consisting of a series of a coefficient 0 (run). In this case, a table which corresponds the values with variable length code is called a VLC table. Under the conventional method, only one table is prepared as a VLC table respectively for intra prediction coding and inter prediction coding (reference to ISO/IEC 14496-2:1999(E) Information technology—coding of audio-visual objects Part 2: Visual (1999-12-01) P. 119 7.4.1 Variable length decoding).

Under the variable length coding method explained in the existing technique, only one table is prepared as a VLC table respectively for intra prediction coding and inter prediction coding. Therefore, it contains a problem that coding efficiency differs greatly depending on a quality of a current picture to be coded.

In order to solve this problem, a method of preparing a plurality of tables so as to refer to them by switching between them according to the number of coefficients other than 0 contained in a current block to which orthogonal transformation is applied is conceivable. For realizing this, it is necessary to perform coding by applying variable length coding for the numbers of the coefficients other than 0, however, the coding method and the decoding method are not yet established.

DISCLOSURE OF INVENTION

The present invention has been devised in view of these circumstances and it is an object of the present invention to suggest a picture coding method as well as a picture decoding method that realize coding of the number of coefficients other than 0 contained in the block to which orthogonal transformation is applied with high efficiency regardless of the quality of the current picture.

In order to solve the problem as mentioned above, a picture coding method according to the present invention codes, on a block-to-block basis, an image by transforming the image into coefficients showing spatial frequency components and comprises: a predicting step for calculating a predictive value of the number of coefficients other than 0 contained in a current block to be coded based on the numbers of coefficients other than 0 contained in coded blocks located on a periphery of the current block; a table selecting step for selecting tables for variable length coding based on the predictive value calculated in the predicting step; and a variable length coding step for performing variable length coding for the number of the coefficients other than 0 contained in the current block with reference to the tables for variable length coding selected in the table selecting step.

Thus, it realizes an improvement in coding efficiency since it is possible to refer to optimal tables for variable length coding when coding the number of the coefficients other than 0 contained in the current block.

Also, in the predicting step, the predictive value is calculated using an average value of the numbers of the coefficients other than 0 contained in the coded blocks.

Also, the tables for variable length coding include at least one VLC table. In the table selecting step, the VLC table is selected based on the predictive value calculated in the predicting step and in the variable length coding step, the number of the coefficients other than 0 contained in the current block is transformed into a variable length code with reference to the VLC table selected in the table selecting step.

The tables for variable length coding include at least one code table and one VLC table. In the table selecting step, a code table and a VLC table are selected based on the predictive value calculated in the predicting step and in the variable length coding step, the number of the coefficients other than 0 contained in the current block is transformed into a code number with reference to the code table selected in the table selecting step and then the code number is transformed into a variable length code with reference to the VLC table selected in the table selecting step.

The picture coding method comprises a keeping step for keeping the numbers of the coefficients other than 0 contained in the coded blocks neighboring an uncoded block at least until the uncoded block is coded.

In the predicting step, the predictive value of the number of the coefficients other than 0 contained in the current block is calculated based on the numbers of the coefficients other than 0 contained in the coded blocks located above and on the left of the current block.

In the predicting step, a value 0 is set as the predictive value when no coded blocks are found above and on the left of the current block.

In the predicting step, an average value of the numbers of the coefficients other than 0 contained in the coded blocks located above and on the left of the current block is calculated as the predictive value when the coded blocks are found above and on the left of the current block.

In the predicting step, the number of the coefficients other than 0 contained in the coded block on the left of the current block is set as the predictive value when the coded block is found on the left but not above the current block.

In the predicting step, the number of the coefficients other than 0 contained in the coded block above the current block is set as the predictive value when the coded block is found above but not on the left of the current block.

In the predicting step, a value 0 is set as the predictive value when upper and left boundaries of the current block are either a boundary of pictures, each of which is a unit of the picture or a boundary of slices, each of which is what the picture is divided into a plurality of sections.

In the predicting step, an average value of the numbers of the coefficients other than 0 contained in the coded blocks located above and on the left of the current block is set as the predictive value when upper and left boundaries of the current block are neither a boundary of pictures, each of which is a unit of the picture nor a boundary of slices, each of which is what the picture is divided into a plurality of sections.

In the predicting step, the number of the coefficients other than 0 contained in the coded block on the left of the current block is set as the predictive value when an upper boundary of the current block is either a boundary of pictures, each of which is a unit of the picture or a boundary of slices, each of which is what the picture is divided into a plurality of sections, and the left boundary is neither the boundary of pictures nor the boundary of slices.

In the predicting step, the number of the coefficients other than 0 contained in the coded block above the current block is set as the predictive value when a left boundary of the current block is either a boundary of pictures, each of which is a unit of the picture or a boundary of slices, each of which is what the picture is divided into a plurality of sections, and an upper boundary is neither the boundary of pictures nor the boundary of slices.

A picture decoding method according to the present invention decodes, on a block-to-block basis, an image that is coded by transforming the image into coefficients showing spatial frequency components and comprises:

a predicting step for calculating a predictive value of the number of the coefficients other than 0 contained in a current block to be decoded based on numbers of coefficients other than 0 contained in decoded blocks located on a periphery of the current block;

a table selecting step for selecting tables for variable length decoding based on the predictive value calculated in the predicting step; and a variable length decoding step for performing variable length decoding for the number of the coefficients other than 0 contained in the current block with reference to the tables for variable length decoding selected in the table selecting step.

Thus, it realizes a correct decoding of a bit stream, in which the number of the coefficients other than 0 contained in the block is coded, referring to optimal tables for variable length decoding.

Also, in the predicting step, the predictive value is calculated using an average value of the numbers of the coefficients other than 0 contained in the decoded blocks.

Also, the tables for variable length decoding include at least one VLC table. In the table selecting step, the VLC table is selected based on the predictive value calculated in the predicting step, and in the variable length decoding step, a variable length code showing the number of coefficients other than 0 contained in the current block is transformed into said number of the coefficients other than 0 contained in the current block, with reference to the VLC table selected in the table selecting step.

The tables for variable length decoding include at least one code table and one VLC table. In the table selecting step, the code table and the VLC table are selected based on the predictive value calculated in the predicting step, and in the variable length decoding step, a variable length code showing the number of coefficients other than 0 contained in the current block is transformed into a code number with reference to the VLC table selected in the table selecting step, and then the code number is transformed into said number of the coefficients other than 0 contained in the current block, with reference to the code table selected by the table selecting step.

The picture decoding method comprises a keeping step for keeping the numbers of the coefficients other than 0 contained in the decoded blocks neighboring an undecoded block at least until the undecoded block is decoded.

In the predicting step, the predictive value of the number of the coefficients other than 0 contained in the current block is calculated based on the numbers of the coefficients other than 0 contained in the decoded blocks located above and on the left of the current block.

In the predicting step, a value 0 is set as the predictive value when no decoded blocks are found above and on the left of the current block.

In the predicting step, an average value of the numbers of the coefficients other than 0 contained in the decoded blocks located above and on the left of the current block is set as the predictive value when the decoded blocks are found above and on the left of the current block.

In the predicting step, the number of the coefficients other than 0 contained in the decoded block on the left of the current block is set as the predictive value when the decoded block is found on the left but not above.

In the predicting step, the number of the coefficients other than 0 contained in the decoded block above the current block is set as the predictive value when the decoded block is found above but not on the left of the current block.

In the predicting step, a value 0 is set as the predictive value when upper and left boundaries of the current block are either a boundary of pictures, each of which is a unit of the picture or a boundary of slices, each of which is what the picture is divided into a plurality of sections.

In the predicting step, an average value of the numbers of the coefficients other than 0 contained in the decoded blocks located above and on the left of the current block is set as the predictive value when upper and left boundaries of the current block are neither a boundary of pictures, each of which is a unit of the picture nor a boundary of slices, each of which is what the picture is divided into a plurality of sections.

In the predicting step, the number of the coefficients other than 0 contained in the decoded block on the left of the current block is set as the predictive value when an upper boundary of the current block is either a boundary of pictures, each of which is a unit of the picture or a boundary of slices, each of which is what the picture is divided into a plurality of sections, and a left boundary of the block is neither the boundary of pictures nor the boundary of slices.

In the predicting step, the number of coefficients other than 0 contained in the decoded block above the current block is set as the predictive value when a left boundary of the current block is either the boundary of pictures, each of which is a unit of the picture or a boundary of slices, each of which is what the picture is divided into a plurality of sections, and an upper boundary of the block is neither the boundary of pictures nor the boundary of slices.

The present invention is realized not only as a picture coding method and a picture decoding method, but also as a picture coding device and a picture decoding device including the characteristic steps contained in these methods as means. It is realized also as a program which causes a computer to execute these steps or as a bit stream created by the picture coding method. Such a program can surely be distributed through a storage medium like CD-ROM and a transmission medium like Internet.

BRIEF DESCRIPTION OF DRAWINGS

FIG. 4A presents a case of using three adjacent blocks whereas FIG. 4B presents a case of using two adjacent blocks.

FIG. 6A presents a case of using three adjacent blocks whereas FIG. 6B presents a case of using two adjacent blocks.

FIG. 7A presents a case where a processing proceeds to the next macroblock whereas FIG. 7B presents a case where the processing further proceeds to the next macroblock. FIG. 7C presents a case where the current macroblock is located at the right edge of the picture and the processing shifts to the next macroblock.

FIG. 8A presents a case of fixing a code table. FIG. 8B presents a case of fixing a VLC table. The FIG. 8C presents a case of using only a VLC table without using code tables.

FIG. 11A and FIG. 11B are pattern diagrams for showing a position of blocks targeted for statistics of the numbers of coefficients according to the second and the seventh embodiments of the present invention.

FIG. 12A is a block diagram showing a structure of a coefficient number encoder according to the third embodiment of the present invention. FIG. 12B is a block diagram showing a structure of a transformational example of the coefficient number encoder.

FIG. 20A presents a case of fixing a code table. FIG. 20B presents a case of fixing a VLC table.

FIG. 23A is a block diagram for explaining an operation of processing showing a structure of a coefficient number decoder according to the eighth embodiment of the present invention. FIG. 23B is a block diagram showing a structure of a transformational example of the coefficient number decoder.

FIG. 26A is an explanatory diagram showing an example of a physical format of a flexible disk which is a main body of a recording medium. FIG. 26B is an explanatory diagram showing a full appearance of the flexible disk, a structure at cross section and the flexible disk itself.

BEST MODE FOR CARRYING OUT THE INVENTION

The following describes the embodiments of the present invention with reference to the diagrams and equations.

First Embodiment

Figure 1:
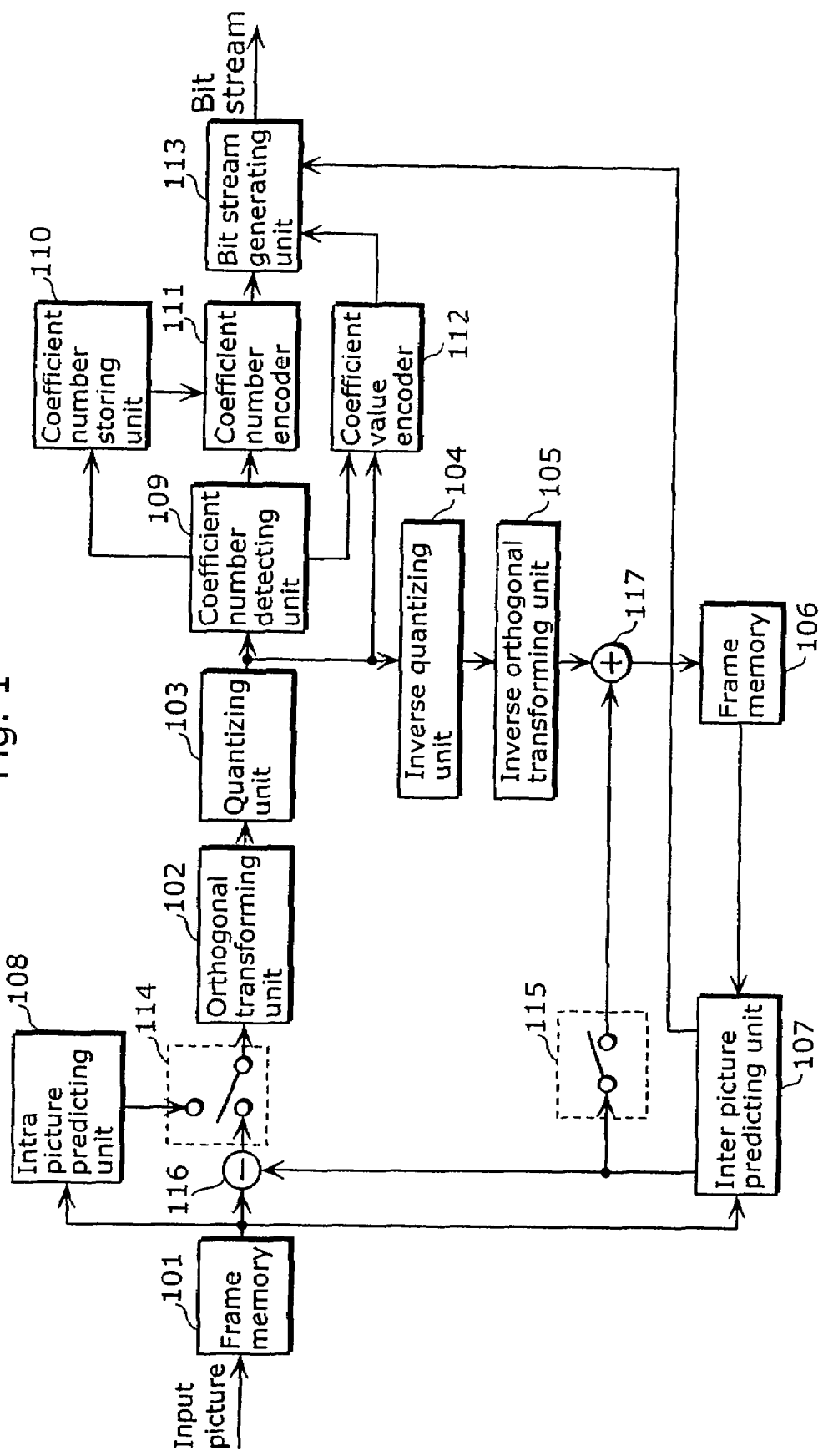
FIG. 1 is a block diagram showing a structure of an embodiment of a picture coding device using a picture coding method according to the present invention.

FIG. 1 is a block diagram showing a structure of an embodiment of a picture coding device using a picture coding method according to the present invention.

The picture coding device includes, as shown in FIG. 1, frame memories 101 and 106, an orthogonal transforming unit 102, a quantizing unit 103, an inverse quantizing unit 104, an inverse orthogonal transforming unit 105, an inter picture predicting unit 107, an intra picture predicting unit 108, a coefficient number detecting unit 109, a coefficient number storing unit 110, a coefficient number encoder 111, a coefficient value encoder 112, a bit stream generating unit 113, switches 114 and 115, a difference calculating unit 116 and an addition calculating unit 117.

The frame memory 101 stores moving pictures inputted on a picture-to-picture basis in display order. The inter picture predicting unit 107 detects motion vectors which show a position predicted as optimal in the searching area in the picture, using picture data reconstructed in a coding device as reference pictures so as to create predictive picture data based on the motion vectors. The difference calculating unit 116 calculates a difference between the input picture data read out from the frame memory 101 and the predictive picture data inputted from the inter picture predicting unit 107 so as to create predictive residual picture data.

The intra picture predicting unit 108 creates predictive picture data using the picture data of the coded area in the current picture and creates predictive residual picture data by calculating the difference between the created predictive picture data and the input picture data.

The orthogonal transforming unit 102 performs orthogonal transformation to the inputted predictive residual picture data. The quantizing unit 103 performs a quantization to the orthogonal transformed data and creates coefficients showing spatial frequency components which is an object for variable length coding. The inverse quantizing unit 104 performs inverse quantization to the coefficients created in the aforementioned processing. The inverse orthogonal transforming unit 105 performs inverse orthogonal transformation to the inverse quantized data and creates reconstructed predictive residual picture data. The addition calculating unit 117 adds the reconstructed residual picture data inputted from the inverse orthogonal transforming unit 105 and the predictive picture data inputted from the inter predicting unit 107 and creates reconstructed picture data. The frame memory 106 stores the created reconstructed picture data.

The coefficient number detecting unit 109 detects the number of coefficients having a value other than 0 (hereafter simply refers to number of coefficients) from each block by examining the value of the created coefficient. The coefficient number storing unit 110 stores the numbers of coefficients detected by the coefficient number detecting unit 109. The coefficient number encoder 111 refers to the values of the coefficients in the block, that are already coded and stored in the coefficient number storing unit 110 and performs coding for the numbers of the coefficients using a method to be mentioned later. The coefficient value encoder 112 performs variable length coding for the values of the coefficients themselves with reference to VLC tables necessary for variable length coding by switching between them using the numbers of the coefficients detected by the coefficient number detecting unit 109. The bit stream generating unit 113 generates a bit stream by adding other information on the motion vectors or the like inputted from the inter picture prediction unit 107 to the numbers of the coefficients and the values of the coefficients, which are coded.

Next, an explanation regarding an operation of a picture coding device constructed as above follows.

Figure 2A:
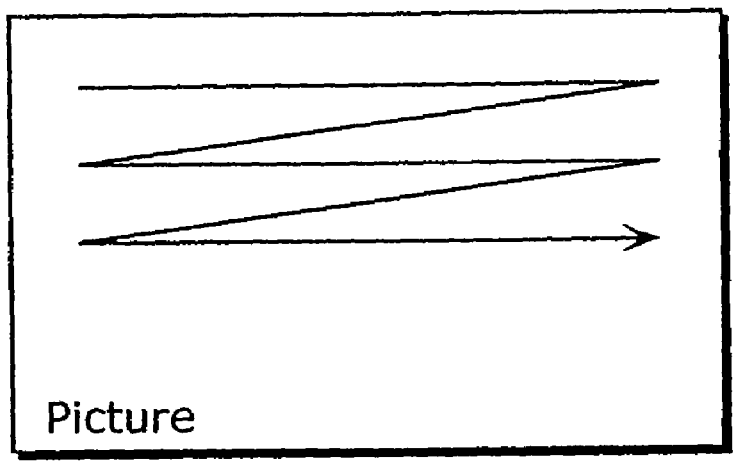
FIG. 2A is a pattern diagram showing a sketch of a processing order of macroblocks in each picture.
Figure 2B:
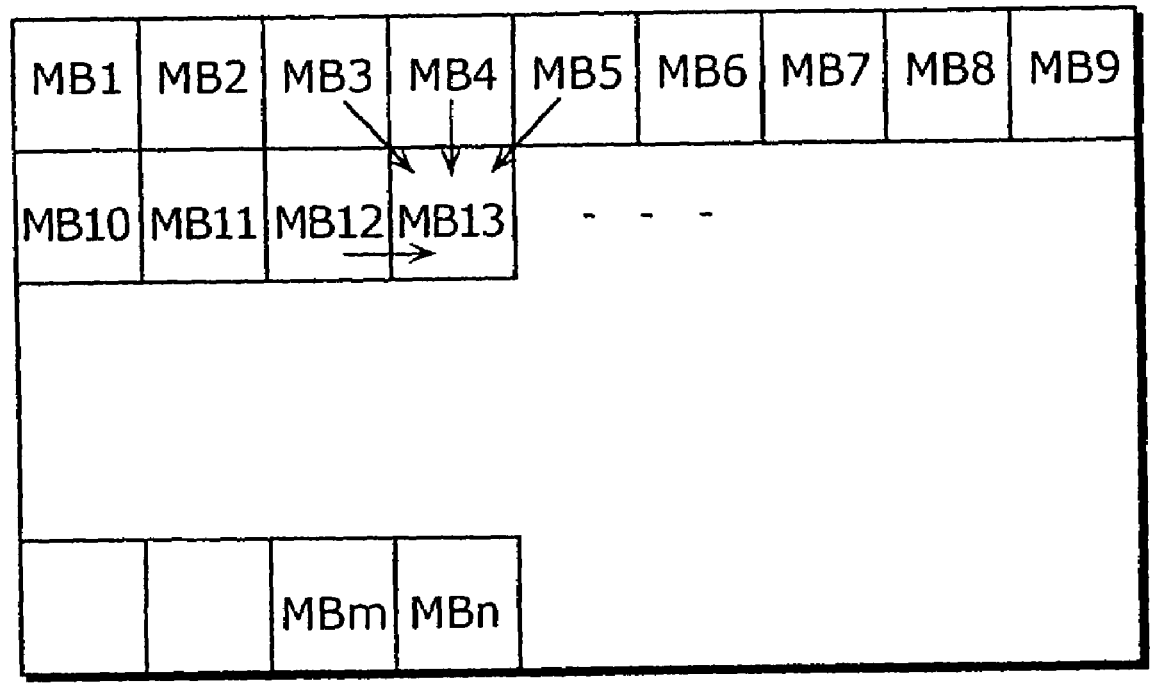
FIG. 2B is a pattern diagram showing macroblocks which belong to coded blocks used for reference in order to encode a number of coefficients of a current block to be coded.

The moving pictures targeted for coding are inputted to the frame memory 101 on a picture-to-picture basis in display order and then reordered in the order of coding. Each picture is divided into a block of, for instance, 16 (horizontal)×16 (vertical) pixels called macroblock, and subsequent processing take place using the unit of macroblock. FIG. 2A is a pattern diagram showing a sketch of a processing order of macroblocks in each picture whereas FIG. 2B is a pattern diagram showing macroblocks to which the coded blocks used for reference in order to encode the numbers of the coefficients in the current block belong. The FIG. 2B shows a case where a macroblock MB13 is the current macroblock.

Coding of the macroblocks in each picture starts from upper left, one by one, to the right, as shown in the FIG. 2A, goes one step down when it comes to the right edge and starts again from the left to the right. The macroblock, which is read out from the frame memory 101, is firstly inputted to the inter picture predicting unit 107 when a current macroblock to be coded is coded using inter picture prediction. The inter picture predicting unit 107 uses reconstructed picture data of the coded pictures stored in the frame memory 106 as reference pictures for detecting motion vectors in each block [i.e. 4 (horizontal)×4(vertical) pixels] which is a further divided macroblock. The inter picture predicting unit 107 outputs predictive picture data created by the detected motion vectors to the difference calculating unit 116. The difference calculating unit 116 creates predictive residual picture data by measuring the difference between the predictive picture data and the input picture data of the current macroblock.

On the contrary, for coding the target macroblock by means of intra picture prediction, the macroblock which is read out from the frame memory 101 is firstly inputted to the intra picture predicting unit 108. The intra picture predicting unit 108 performs intra picture prediction using the information on the surrounding blocks and creates predictive residual picture data.

The thus created predictive residual picture data goes through processing of orthogonal transformation at the orthogonal transforming unit 102, processing of a quantization at the quantizing unit 103 for each block and then is transformed into the coefficients for which variable length coding is to be performed. These coefficients are inputted to the coefficient number detecting unit 109, to the coefficient value encoder 112 and to the inverse quantizing unit 104.

The coefficient number detecting unit 109 detects the number of coefficients having a value other than 0 in each block. The numbers of coefficients detected here are stored in the coefficient number storing unit 110. The coefficient number encoder 111 refers to the values by reading out from the coefficient number storing unit 110 the numbers of the coefficients in the coded blocks and performs coding for the number of the coefficients of the current block. Also, the coefficient value encoder 112 performs coding of the values of the coefficients themselves using the numbers of the coefficients detected by the coefficient number detecting unit 109. Lastly, the bit stream generating unit 113 generates a definitive bit stream by adding, to the bit stream, the numbers of the coefficients and the values of the coefficients, which are coded, together with other information on the motion vectors or the like.

The coefficients inputted to the inverse quantizing unit 104 go through the processing of inverse quantization at the inverse quantizing unit 104 as well as the processing of inverse orthogonal transformation at the inverse orthogonal transforming unit 105, and then, are transformed into reconstructed predictive residual picture data. Next, the addition calculating unit 117 adds the reconstructed predictive residual picture data and the predictive picture data inputted from the inter picture predicting unit 107 so as to create reconstructed picture data and stores it in the frame memory 106.

Thus, a sequence of coding is explained above. As for variable length coding processing of the numbers of coefficients performed by the coefficient number encoder 111, the detail is explained with reference to FIG. 3~FIG. 9 as well as Chart 1~Chart 7.

Figure 3A:
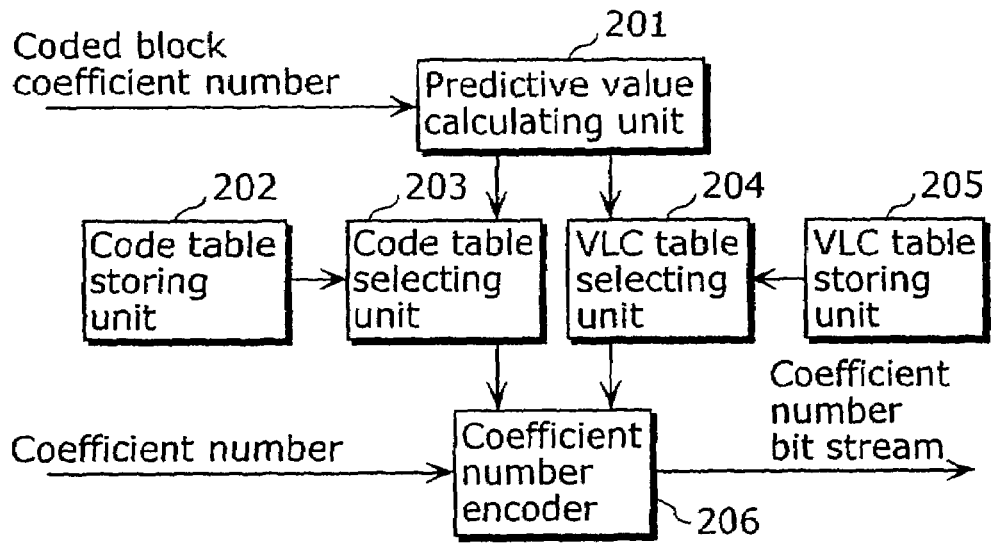
FIG. 3A is a block diagram showing a structure of a coefficient number encoder according to the first embodiment of the present invention.
Figure 3B:
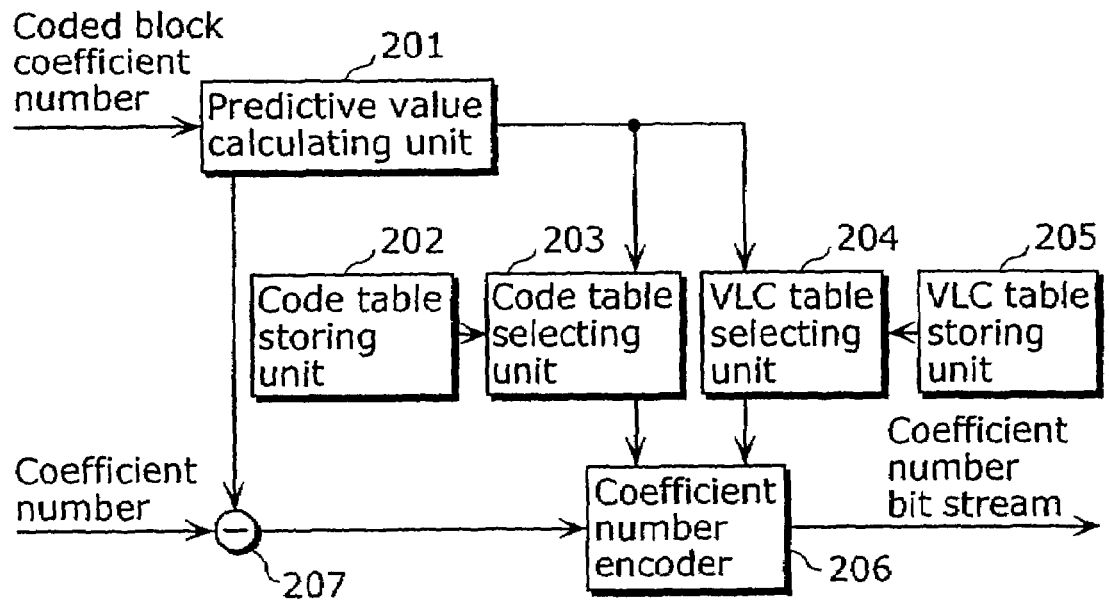
FIG. 3B is a block diagram showing a structure of a transformational example of the coefficient number encoder.

FIG. 3A is a block diagram showing in detail an internal structure of the coefficient number encoder 111.

Here, an example of using two tables of a code table and a VLC table in order to perform variable length coding for the number of coefficients is shown. The code table is a table for transforming the number of coefficients into a code number whereas the VLC table is a table for transforming the code number gained by the code table into variable length code.

The coefficient number encoder 111 includes, as shown in FIG. 3A, a predictive value calculating unit 201, a code table storing unit 202, a code table selecting unit 203, a VLC table selecting unit 204, a VLC table storing unit 205 and a coefficient number encoder 206.

Firstly, the numbers of coefficients of coded blocks on the periphery are inputted from the coefficient number storing unit 110 shown in the FIG. 1 to the predictive value calculating unit 201. The predictive value calculating unit 201 determines the predictive value by calculating an average value of these values. A maximum value, a minimum value or a medium value may be used instead of the average value as a method to determine the predictive value.

Figure 4A:
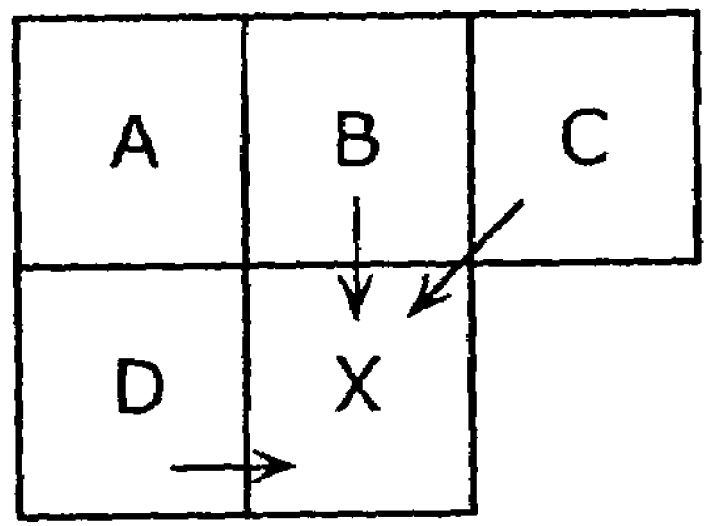
FIG. 4A and FIG. 4B are pattern diagrams showing a physical position of a current block to be coded and the coded blocks used for the reference.

FIG. 4A is a pattern diagram showing a location relationship between a current block to be coded and the coded blocks to be used for the reference. Here, a block X is a current block whereas three blocks in a position of blocks B, C and D are reference blocks. As for the three blocks in the position of the blocks B, C and D, when blocks which are neither coded nor located outside the picture or outside the slice which is a picture divided into a plurality of sections, occurs, a change is made to the reference blocks as in Chart 1.

CHART 1

| B | C | D | Reference block |
|---|---|---|---|
| ○ | ○ | ○ | B, C, D |
| ○ | X | ○ | A, B, D |
| X | X | ○ | D |
| ○ | ○ | X | B, C |
| X | X | X | None |

As for signs in Chart 1, a sign ○ signifies a coded block and a sign X signifies a block which can not be referred to since it is neither coded nor located outside the picture or outside the slice. For example, when only a block C can not be referred to, it shows that the references are blocks A, B and D. Chart 1 shows a relation between a condition of the reference blocks and the block(s) which can be referred to, however, the patterns are not limited to this. Also, if no reference blocks are found, either a value 0 or other arbitrary value is given directly as a predictive value.

The code table selecting unit 203 selects a code table for an actual use from a plurality of code tables stored in the code table storing unit 202 in accordance with a predictive value calculated by the predictive value calculating unit 201.

Chart 2 is an example of a code table in which numbers of coefficients correspond to code numbers prepared beforehand by the code table storing unit 202.

CHART 2

| Coefficient number value | Code table 1 | Code table 2 | Code table 3 | Code table 4 |
|---|---|---|---|---|
| 0 | 0 | 4 | 8 | 8 |
| 1 | 1 | 2 | 7 | 7 |
| 2 | 2 | 0 | 5 | 6 |
| 3 | 3 | 1 | 4 | 5 |
| 4 | 4 | 3 | 2 | 4 |
| 5 | 5 | 5 | 0 | 3 |
| 6 | 6 | 6 | 1 | 2 |
| 7 | 7 | 7 | 3 | 1 |
| 8 | 8 | 8 | 6 | 0 |

According to this example, a code table 1, for example, assigns code numbers which are identical to numbers of coefficients whereas a code table 2 assigns the code numbers so that a value 2 of the coefficient number plays a central role. Four types of code tables are prepared here; however, the numbers of types of tables and values of tables are not limited to those used in Chart 2. Also, Chart 3 presents selection criteria for code tables based on a predictive value.

CHART 3

| Predictive value | Reference table |
|---|---|
| 0~2 | Code table 1 |
| 3~5 | Code table 2 |
| 6~8 | Code table 3 |
| 9~16 | Code table 4 |

According to this example, the code table selecting unit 203 selects a code table as follows: it refers to a code table 1 when the predictive value calculated by the predictive calculating unit 201 is no more than 2 whereas it refers to a code table 2 when the predictive value is more than or equal to 3 and less than or equal to 5. The way of assigning predictive values and the items of reference tables are not limited to those used in Chart 3.

The VLC table selecting unit 204 selects a VLC table for actual use from a plurality of VLC tables stored in the VLC table storing unit 205 in accordance with the predictive value calculated by the predictive calculating unit 201.

Chart 4 is an example of a VLC table in which code numbers prepared in advance by the VLC table storing unit 205 correspond with variable length codes.

CHART 4

| Code number | VLC table 1 | VLC table 2 | VLC table 3 | VLC table 4 |
|---|---|---|---|---|
| 0 | 0 | 1 | 10 | 100 |
| 1 | 01 | 010 | 11 | 101 |
| 2 | 001 | 011 | 0100 | 110 |
| 3 | 0001 | 00100 | 01012 | 111 |
| 4 | 00001 | 00101 | 0110 | 01000 |
| 5 | 000001 | 00110 | 0111 | 01001 |

CHART 4-continued

| Code number | VLC table 1 | VLC table 2 | VLC table 3 | VLC table 4 |
|---|---|---|---|---|
| 6 | 0000001 | 00111 | 001000 | 01010 |
| 7 | 00000001 | 0001000 | 001001 | 01011 |
| 8 | 000000001 | 0001001 | 001010 | 01100 |

According to this example, a VLC table 1, in comparison with a VLC table 4, is designed with a tendency that an amount of bit increases if the code number is large and decreases if the code number is small. It shows that the VLC table 1 can perform variable length coding more efficiently when an apparition probability of the code number concentrates in the area where the values are small while the VLC table 4 can perform more efficiently when the apparition probability scatters to the area where the values are big. Four types of tables are prepared here; however, the numbers of types of tables and the values of tables are not limited to those used in Chart 4. Also, Chart 5 presents selection criteria for VLC tables based on a predictive value.

CHART 5

| Predictive value | Reference table |
|---|---|
| 0~1 | VLC table 1 |
| 2~3 | VLC table 2 |
| 4~6 | VLC table 3 |
| 7~16 | VLC table 4 |

According to this example, the VLC table selecting unit 204 selects a VLC table as follows: it refers to a VLC table 1 when the predictive value calculated by the predictive value calculating unit 201 is no more than 1 whereas it refers to a VLC table 2 when the predictive value is more than or equal to 2 and less than or equal to 3. The way of assigning predictive values and the items of reference tables are not limited to those used in Chart 5.

Figure 5:
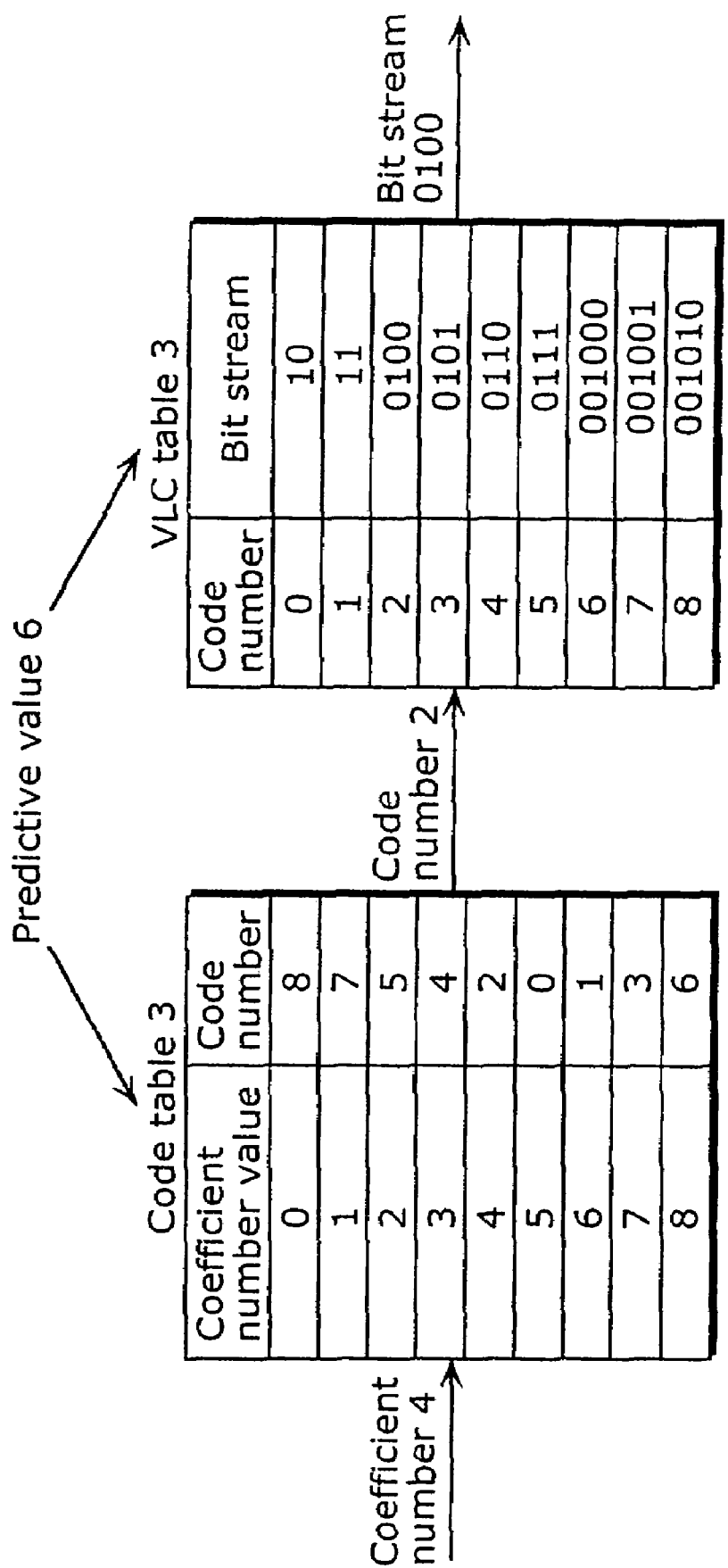
FIG. 5 is a pattern diagram showing an example of a flow when the number of coefficients is transformed into a bit stream with reference to tables.

The coefficient number encoder 206 refers to the code table and the VLC table which are selected by the above processing and performs variable length coding of the number of the coefficients in the inputted current block. The coefficient number encoder 206 firstly transforms the number of coefficients into a code number using the code table and then transforms it into a variable length code corresponded to the code number, using the VLC table. FIG. 5 is a pattern diagram showing an example of coding when the predictive value calculated by the predictive calculating unit 201 is "6" and the number of the coefficients in the current block is "4". A code table 3 shown in FIG. 5 is selected at the code table selecting unit 203 using Chart 3 and Chart 2 according to the predictive value "6" and also a VLC table 3 shown in FIG. 5 is selected at the VLC table selecting unit 204 using Chart 5 and Chart 4. The coefficient number encoder 206 transforms the inputted number of the coefficients "4" into a code number "2" according to the code table 3 and furthermore creates a definitive bit stream "0100" according to the VLC table 3.

Figure 6B:
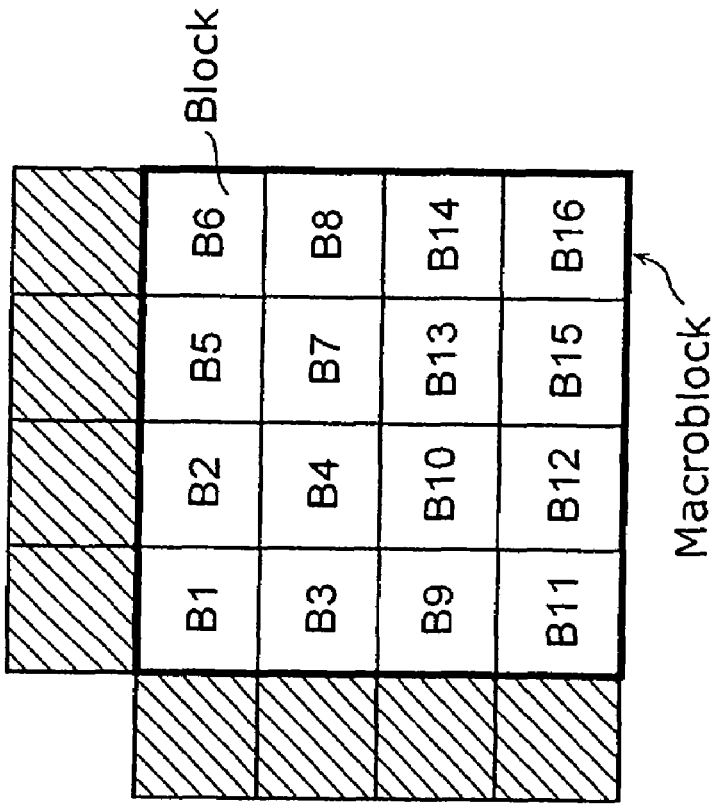
FIG. 6A and FIG. 6B are pattern diagrams showing reference blocks for a current macroblock to be coded.
Figure 6A:
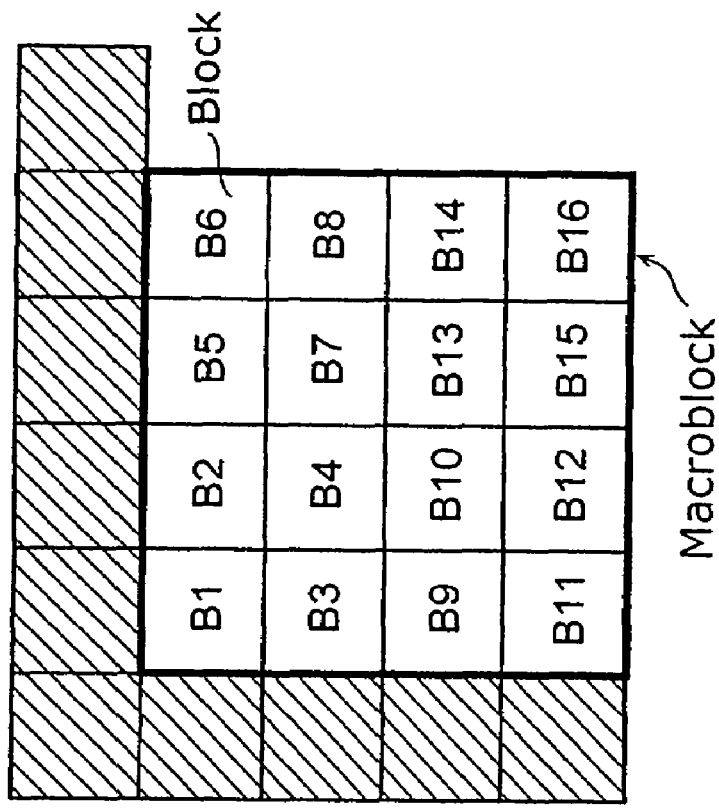

Next, as for a storing processing of number of coefficients performed by the coefficient number storing unit 110, the detail is explained. FIG. 6A is a pattern diagram showing reference blocks with respect to a current macroblock to be coded in the predictive value calculating unit 201. Here, a black border containing the blocks coded as B1~B16 shows the current macroblock whereas a hatched section shows the reference blocks with respect to the current macroblock. Also, the numbers assigned to the blocks indicate the order of coding in the macroblock.

The coefficient number storing unit 110, for example, at the time of starting the processing of the current macroblock shown in FIG. 6A stores the numbers of coefficients detected by the coefficient number detecting unit 109, at least for the reference blocks shown in FIG. 6A which are necessary for the current macroblock. Namely, the coefficient number storing unit 110 stores the numbers of coefficients detected according to the blocks of the current macroblock (B1, B2, B3, ... and B16) which are to be processed sequentially. For example, when the current block is a block B6, the coefficient number storing unit 110 stores the numbers of each coefficient of B1, B2, B3, B4 and B5 which are already processed in addition to the reference blocks shown as hatched in FIG. 6A. Then, the coefficient number storing unit 110 stores the number of coefficients of this block B6 when it is detected by the coefficient number detecting unit 109. Thus, the coefficient number storing unit 110 stores the numbers of the coefficients detected from the blocks in the current macroblocks (B1, B2, B3, ... and B16) which are to be processed sequentially.

Figure 7A:
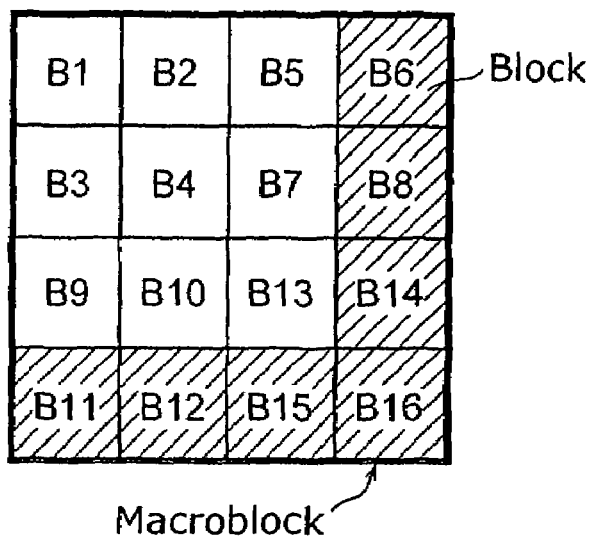
FIG. 7A, FIG. 7B and FIG. 7C are pattern diagrams showing an operation in which a coefficient number storing unit stores the numbers of coefficients.

Then, for example, when the current macroblock is a macroblock MB11 shown in FIG. 2, the coefficient number storing unit 110 at least stores the numbers of the coefficients of the blocks in a bottom row and a right column (hatched blocks) of the macroblock MB11 as shown in FIG. 7A when the processing of the macroblock MB11 terminates and proceeds to the next macroblock MB12. Next, when the processing of the macroblock MB12 terminates and the processing proceeds to the next macroblock MB13, the coefficient number storing unit 110 stores at least the numbers of the coefficients for the blocks located in the bottom row and in the right column of the macroblock MB12 in the same way as well as the numbers of coefficients of the blocks in the bottom row of the macroblock MB11 (hatched blocks) as shown in FIG. 7B.

Figure 7B:
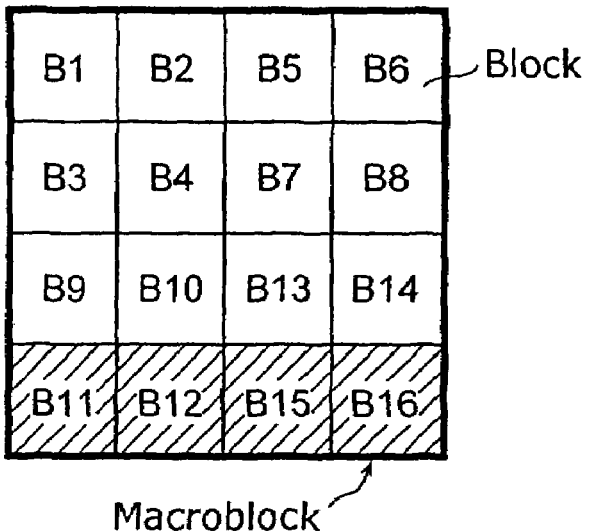

For example, when the current macroblock is located in the right edge of the picture as the macroblock MB9 shown in FIG. 2B, the coefficient number storing unit 110 stores at least the numbers of coefficients of the blocks in the bottom row of the macroblock MB9 (hatched blocks) as shown in FIG. 7B when the processing of the macroblock MB9 terminates and the processing proceeds to the next macroblock MB10.

Figure 7C:
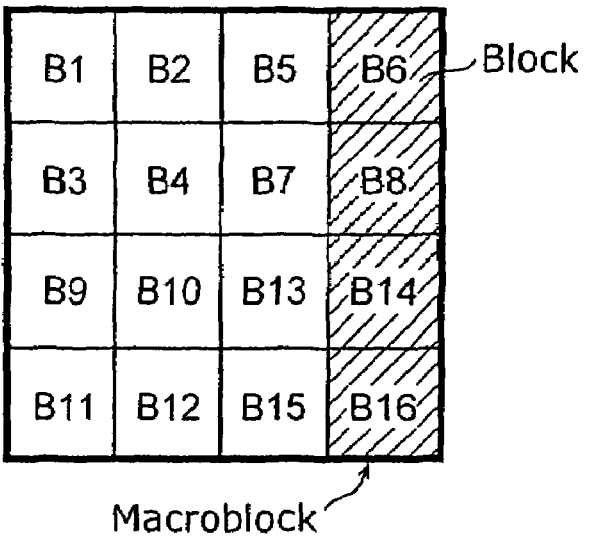

When the current macroblock is located in the bottom edge of the picture as MBm shown in FIG. 2B, the coefficient number storing unit 110 stores at least the numbers of the coefficients of the blocks in the right column of the macroblock MBm as shown in FIG. 7C when the processing of the macroblock MBm terminates and the processing proceeds to the next macroblock MBn.

The coefficient number storing unit 110 thus stores the numbers of coefficients for the blocks to be referred to. It is possible to delete, in an arbitrary timing, the information on the number of coefficients of the blocks other than those to be stored in the above explanation if they are no longer used for reference. For example, it is possible to delete when processing proceeds to the next macroblock as well as while processing the macroblock. Also, the numbers of coefficients in the blocks which are no longer used for reference do not always need processing of deleting. For instance, the coefficient number storing unit 110 may identify the numbers of coefficients in the blocks which are not referred to any longer as unnecessary and may overwrite to them if necessary.

It is explained above that it is possible to refer to the numbers of the coefficients of the coded blocks by storing them in the coefficient number storing unit 110. A system for calculating the number of coefficients, however, may be used, if necessary, by storing not the values of the number of the coefficients themselves but, for instance, the values of the coefficients in the blocks, which are transformed into spatial frequency components.

In the present embodiment, it is possible, as mentioned above, to calculate a predictive value using the numbers of the coefficients in the coded adjacent blocks so as to perform coding of the number of coefficients efficiently even to the pictures whose apparition probability of the coefficients is not even by referring to the code table and the VLC table adaptively according to the predictive value.

Also, it can, as described above, correspond to a fluctuation of a position where the apparition probability of the number of coefficients is the highest with reference to the code table by switching them according to the predictive value. It can also correspond to the size of the dispersion of the apparition probability of the number of coefficients by switching the VLC tables for reference according to the predictive value. Consequently, it is possible to perform effectively coding of the number of coefficients.

Figure 4B:
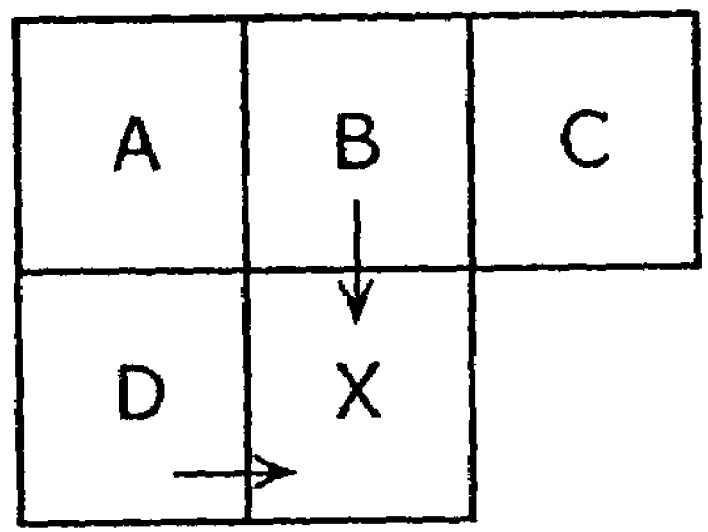

It is also possible to use only two blocks located in the position of blocks B and D for a current block X to be coded as shown in FIG. 4B in stead of using three neighboring blocks as reference blocks as shown in FIG. 4A at the predictive value calculating unit 201. A change is made concerning reference blocks as in Chart 6 when it happens that either of two blocks in the position of the blocks B and D is neither coded nor located outside the picture nor outside the slice.

CHART 6

| B | D | Reference block |
|---|---|---|
| ○ | ○ | B, D |
| X | ○ | D |
| ○ | X | B |
| X | X | None |

As for signs in Chart 6, a sign ○ signifies a coded block and a sign X signifies a block which can not be referred to since it is neither coded nor located outside the picture nor outside the slice as in Chart 1. Chart 6 shows a relation between conditions of the reference blocks and the block(s) which can be referred to, however, the patterns are not limited to this. If no reference blocks are found, either a value 0 or other arbitrary value can be given directly as a predictive value. In this case, the coefficient number storing unit 110 may only store the numbers of coefficients detected at the coefficient number detecting unit 109, at least for the reference blocks shown in FIG. 6B, which are necessary for the current macroblock.

It is also possible, as a method to calculate a predictive value in the predictive value calculating unit 201, for example, to select an optimal method according to each sequence, each GOP, each picture or each slice rather than to fix the method to use either of an average value, a maximum value, a minimum value or a medium value. The code for identifying the calculating method then selected is added at a header section of the sequence, the GOP, the picture or the slice. The slice is a picture divided into a plurality of sections. A section of one column in a transverse direction sectioned on a macroblock-to-macroblock basis is an example of this.

Also, it is possible to select, for example, either of an average value, a maximum value, a minimum value or a medium value according to the average value of the number of the coefficients in the coded reference blocks. Chart 7 shows its selection criteria.

CHART 7

| Average value | Predictive value calculation method |
|---|---|
| 0~4 | Minimum value |
| 5~8 | Average value |
| 9~16 | Maximum value |

According to this example, a minimum value of the numbers of the coefficients of more than one reference blocks is applied as a predictive value when, for example, an average value is less than or equal to 4 and an average value is applied as a predictive value when the average value is more than or equal to 5 and less than or equal to 8. The positive effects of improvement in coding efficiency can be obtained in both cases: by selecting a maximum value since a probability that greater number of coefficients appears becomes higher in the blocks in which the quantization step is small and the movements are complicated; and by selecting a minimum value since a probability that smaller number of coefficients appears becomes higher in the blocks in which the quantization step is inversely big and the movement is simple. The way of assigning the average value or the items indicated as predictive value calculating methods is not limited to those indicated in Chart 7.

The coefficient number encoder 111 in the present embodiment performs variable length coding for the value of the number of coefficients itself. The difference calculating unit 207 may, however, calculate a difference value between the predictive value calculated at the predictive value calculating unit 201 and the value of number of coefficients which is inputted so as to perform coding for the gained value with the same processing as described in the above embodiment. The positive effects can be obtained for the improvement in coding efficiency for a picture in which a change in the number of coefficients among the surrounding blocks becomes smaller when changes in luminance and in chrominance are monotonous across the screen.

Figure 8A:
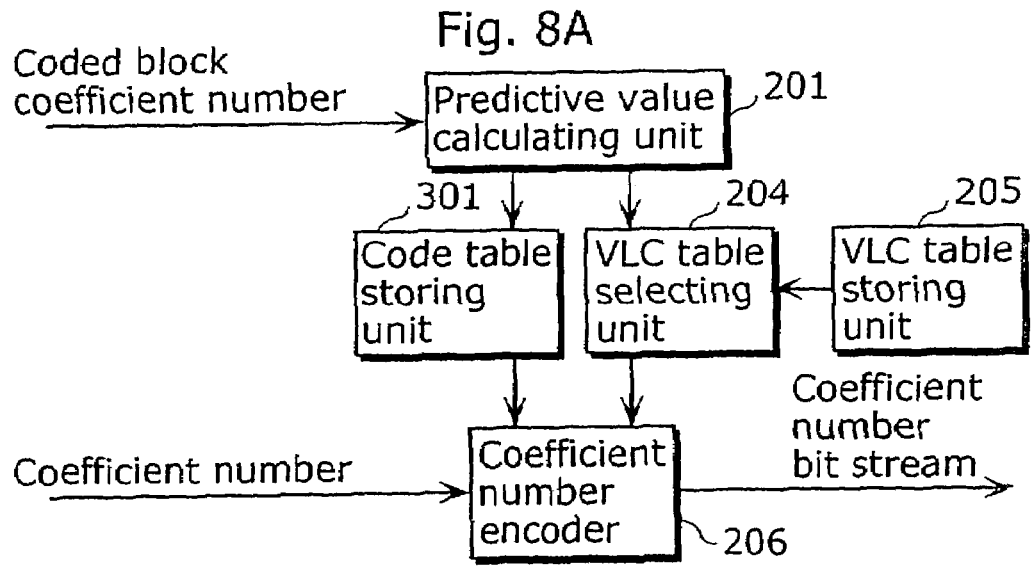
FIG. 8A, FIG. 8B and FIG. 8C are block diagrams showing a structure of a transformational example of a coefficient number encoder according to the first embodiment of the present invention.
Figure 8B:
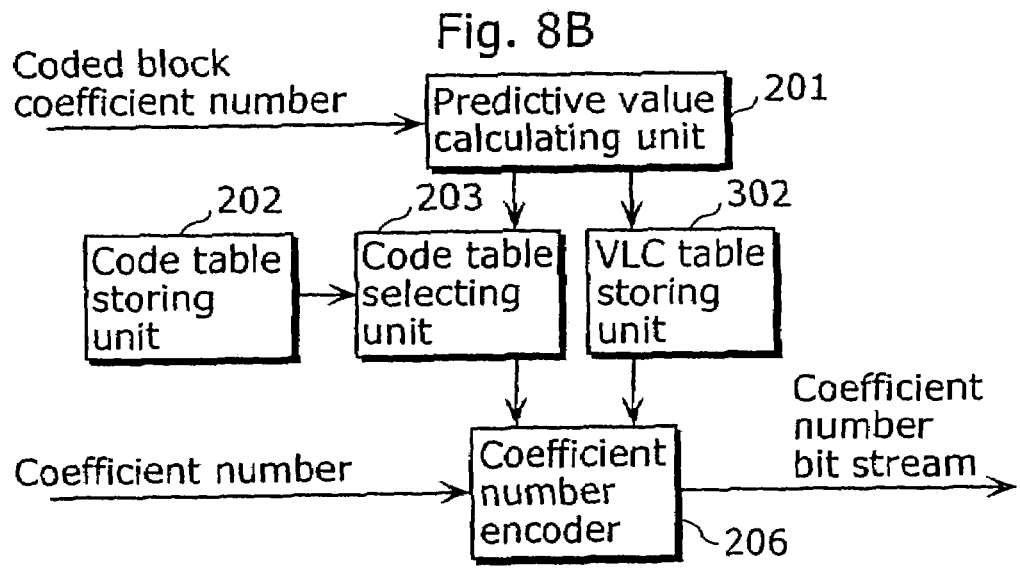

Also, the coefficient number encoder 111 performs coding by switching both the code table and the VLC table according to the predictive value based on the number of coefficients in the neighboring blocks; however, these tables may not be switched but fixed. This can be realized by using only a storing unit which has either one certain type of code tables or one certain type of VLC tables in stead of using table selecting units. FIG. 8A is a block diagram showing a structure of the coefficient number encoder 111 for performing variable length coding of the number of coefficients by fixing only a code table. Also, FIG. 8B is a block diagram showing a structure of the coefficient number encoder 111 for performing variable length coding of the number of coefficients by fixing only a VLC table. In case of fixing only a code table, the coefficient number encoder 111 as shown in FIG. 8A includes a code table storing unit 301 in stead of the code table storing unit 202 and the code table selecting unit 203 shown in FIG. 3A. The code table storing unit 301 has one type of code table. Then, the coefficient number encoder 206 first transforms the number of coefficients into a code number using a code table stored in the code table storing unit 301 then transforms the code number to variable length code using a VLC table selected by the VLC table selecting unit 204.

On the other hand, the coefficient number encoder 111 as shown in FIG. 8B includes a VLC table storing unit 302 in stead of the VLC table storing unit 205 and the VLC table selecting unit 204 shown in FIG. 3A. The VLC table storing unit 302 has one type of VLC table. Then, the coefficient number encoder 206 firstly transforms the number of coefficients into a code number using the code table selected by the code table selecting unit 203 then transforms the code number into a variable length code using the VLC table stored in the VLC table storing unit 302.

Thus by fixing either the code table or the VLC table in stead of switching between them, the throughput for switching tables can be reduced or an amount of memory for storing a plurality of tables can be reduced although the effects of coding efficiency decreases more or less.

Figure 8C:
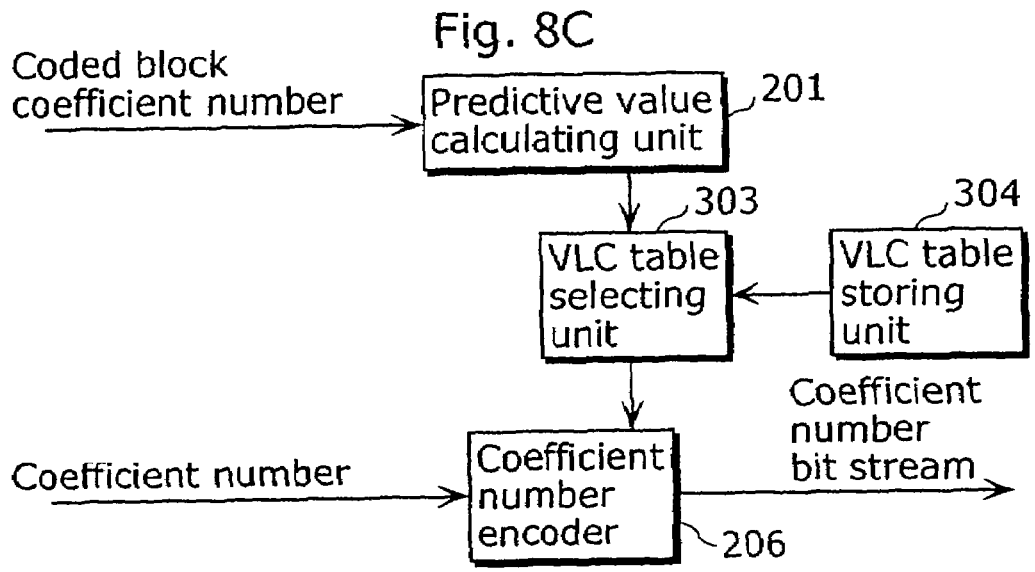

Also, the coefficient number encoder 111 may perform variable length coding by switching only the VLC tables according to the predictive value based on the numbers of coefficients in the neighboring blocks without using code tables. FIG. 8C is a block diagram showing a structure of the coefficient number encoder 111 for performing variable length coding of the number of coefficients using only the VLC tables without code tables. In this case, as shown in FIG. 8C, the coefficient number encoder 111 includes neither the code table storing unit 202 nor the code table selecting unit 203. The coefficient number encoder 111 selects a VLC table for actual use from a plurality of VLC tables stored in the VLC table storing unit 304. Then, the coefficient number encoder 206 directly transforms the number of coefficients into variable length code without transforming it into the code number as shown above. In this case, in the examples of VLC tables shown in Chart 4, the part shown as code numbers is replaced by values of number of coefficients.

Figure 9:
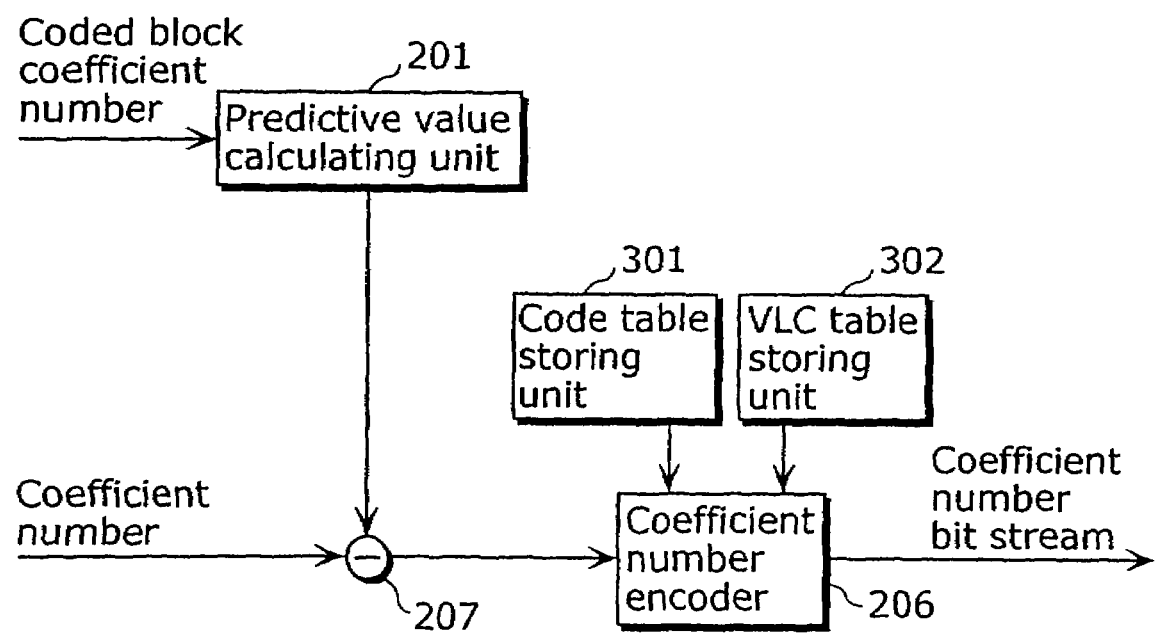
FIG. 9 is a block diagram showing a structure of a transformational example of the coefficient number encoder according to the first embodiment of the present invention.

Also, the case in which the coefficient number encoder 111 performs variable length coding using a difference value between a predictive value and a value of number of coefficients instead of a value of number of coefficients can be handled in the same way. FIG. 9 is a block diagram showing, as an example of it, a structure of the coefficient number encoder 111 for performing variable length coding for a difference value between the predictive value and the number of coefficients by fixing both a code table and a VLC table. In this case, the coefficient number encoder 111 as in FIG. 9 includes a code table storing unit 301 in stead of the code table storing unit 202 and the code table selecting unit 203 shown in FIG. 3A as well as a VLC table storing unit 302 in stead of the VLC table storing unit 205 and the VLC table selecting unit 204. The code table storing unit 301 has one type of code tables whereas the code VLC table storing unit 302 has one type of VLC tables. Then, the coefficient number encoder 206 firstly transforms the difference value between the number of coefficients and the predictive value into a code number using the code table stored in the code table storing unit 301 then transforms the code number into a variable length code using the VLC table stored in the VLC table storing unit 302.

Second Embodiment

The structure of the picture coding device and the outline of the coding processing according to the present embodiment are totally the same as those described in the first embodiment excepting the coefficient number encoder 111 shown in FIG. 1. Here, regarding variable length coding processing of the number of coefficients performed by the coefficient number encoder 111 in the second embodiment, the detail is explained using FIGS. 10 and 11.

Figure 10A:
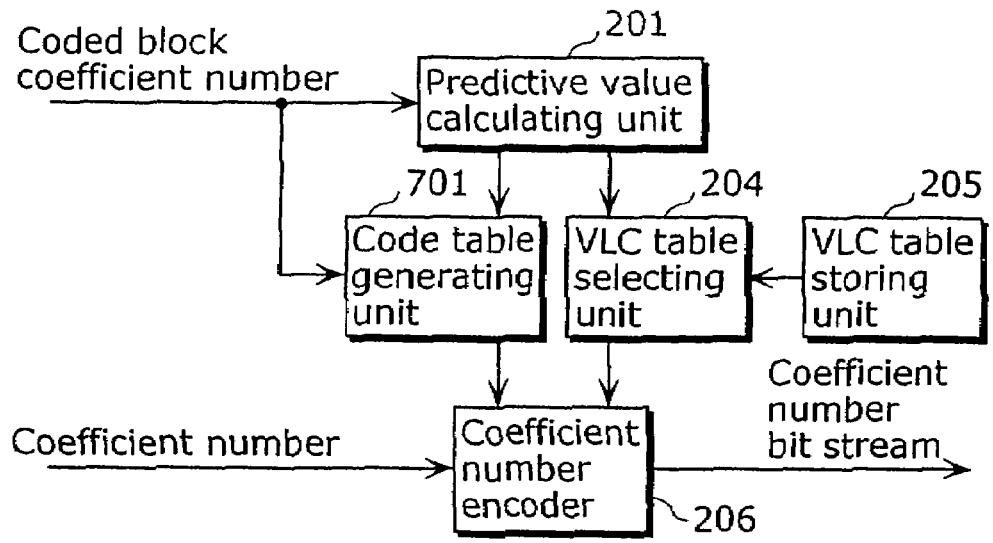
FIG. 10A is a block diagram showing a structure of a coefficient number encoder according to the second embodiment of the present invention.

FIG. 10A is a block diagram showing in detail an internal structure of the coefficient number encoder 111.

As shown in FIG. 10A, the coefficient number encoder 111 includes a code table generating unit 701 in stead of the code table storing unit 202 and the code table selecting unit 203 shown in FIG. 3A. The numbers of coefficients in the coded blocks are inputted to the code table generating unit 701 from the coefficient number storing unit 110. The code table generating unit 701 counts the number of the coded blocks having the same number of coefficients as the value of the number of coefficients at each of the values and creates code tables by assigning code numbers in descending order starting from a coefficient number which recorded the highest frequency based on the statistic. FIG. 11A is a pattern diagram presenting a position of the coded blocks targeted for statistic. Here, a P1, a P3 and a P4 are pictures in which inter picture prediction coding is performed whereas an I2 is a picture in which intra picture prediction coding is performed. Supposing that a current block belongs to the P3, all the blocks, which are coded using the same method as used for the current block, contained in the P1, which is a picture immediately preceding the current picture, are targeted for statistics. The case in which the blocks equivalents of one picture including the coded blocks in the current picture are targeted for statistics as in FIG. 11B can be handled in the same way. Also, a table for the initial condition in ascending order starting from the number 0 shall be used as a code table when the coded blocks equivalent to one picture which can be targeted for statistic do not exist. Here, the blocks equivalent to one picture are targeted for statistics, however, the case in which the number of blocks other than this is used as a parameter can be handled in the same way. In case of applying a referring method as shown in FIG. 11A so as to generate a code table, the table may be generated only once when encoding of the current picture is started.

Meanwhile, the numbers of coefficients in the coded blocks situated on the periphery are inputted to the predictive value calculating unit 201. The predictive value calculating unit 201 determines the predictive value by calculating an average value based on these values as described in the first embodiment. A maximum value, a minimum value or a medium value may be used in stead of the average value as a method to determine the predictive value. The coded blocks then used as the reference, are determined according to Chart 1 using three blocks in the position of the blocks B, C and D for the current block X shown in FIG. 4A in the first embodiment. Chart 1 shows a relation between conditions of the reference blocks and the block(s) which can be referred to, however, the patterns are not limited to this. Either a value 0 or other arbitrary value is given directly as a predictive value when no reference blocks are found.

The predictive value calculated by the predictive value calculating unit 201 is used only at the VLC table selecting unit 204. The VLC table selecting unit 204 selects, as in the first embodiment, according to this predictive value, a VLC table for coding the number of coefficients from a plurality of VLC tables prepared in the VLC table storing unit 205 in advance as shown in Chart 4 in accordance with the selection criteria shown in Chart 5.

The coefficient number encoder 206 refers to the code table created by the code table generating unit 701 and the VLC table selected by the VLC table selecting unit 204 and then performs variable length coding of the number of the coefficients in the current block targeted for coding which is inputted in the same way as described in the first embodiment.

Thus, in the present embodiment, a code table is created by taking statistics of the numbers of the coefficients in the coded blocks, furthermore, a VLC table is determined according to the predictive value calculated from the number of the coefficients in the coded blocks, and by referring to both of the tables, it is possible to perform coding of the number of coefficients efficiently even for a picture whose apparition frequency of coefficients is uneven.

As in the first embodiment, it is also possible to determine the coded blocks used for reference at the predictive value calculating unit 201 as in the first embodiment according to Chart 6 using only two blocks located in the position of the blocks B and D for the current block X shown in FIG. 4B instead of using three neighboring blocks as shown in FIG. 4A. Chart 6 shows a relation between conditions of the reference blocks and the block(s) which can be referred to, however, the patterns are not limited to this. Either a value 0 or other arbitrary value is given directly as a predictive value when no reference blocks are found.

As in the first embodiment, it is also possible to select, for example, either of an average value, a maximum value, a minimum value or a medium value according to an average value of the numbers of the coefficients in the coded reference blocks as a method to calculate a predictive value in the predictive value calculating unit 201 as in the first embodiment. Chart 7 shows the selection criteria, however a way of assigning the average value and items indicated as predictive value calculating methods are not limited to this.

Figure 10B:
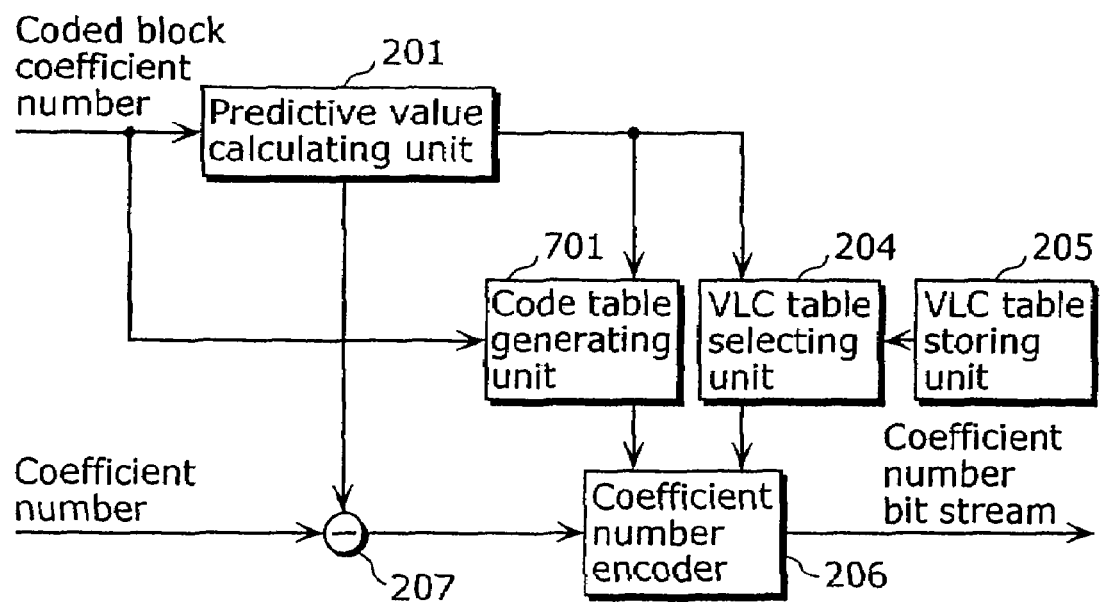
FIG. 10B is a block diagram showing a structure of a transformational example of the coefficient number encoder.

In the present embodiment, the coefficient number encoder 111 performs variable length coding for the value of the number of coefficients itself. However, as in the first embodiment, it is possible, as shown in FIG. 10, that a difference value between the predictive value calculated by the predictive value calculating unit 201 and the inputted value of the number of coefficients is calculated by the subtractor 207 and variable length coding is performed for the gained value by the same processing as described above.

Also, in the present embodiment, the coefficient number encoder 111 performs variable length coding by switching the VLC tables according to the predictive value based on the numbers of coefficients in the neighboring blocks. It is, however, possible to fix the table rather than to switch the VLC tables as in the first embodiment. In this case, this is realized by using only a VLC table storing unit which has one certain type of VLC tables in stead of using the VLC table selecting unit.

Third Embodiment

The structure of the picture coding device and the outline of the coding processing according to the present embodiment are totally the same as those described in the first embodiment, excepting the coefficient number encoder 111 shown in FIG. 1. Here, regarding variable length coding processing of the number of coefficients performed at the coefficient number encoder 111 in the third embodiment, the detail is explained using FIGS. 12A and 12B as well as Charts 8 and 9.

FIG. 12A is a block diagram showing in detail an internal structure of the coefficient number encoder 111.

As shown in FIG. 12A, the coefficient number encoder 111 does not include the predictive value calculating unit 201 shown in FIG. 3A. A code table selecting unit 901 and a VLC table selecting unit 902 therefore select a table for actual use differently from the first embodiment by using directly the numbers of the coefficients in the coded blocks, without using a predictive value. As for the coded blocks then used for the reference as shown in FIG. 4B, only two blocks in the position of the block B (above) and the block D (left) for the current block X are used. However, when the blocks located above and on the left are neither coded nor situated outside the picture nor outside the slice, either a value 0 or other arbitrary value can be substituted.

Chart 8 shows a method of selecting a code table in the code table selecting unit 901.

CHART 8

|  |  | Coefficient number (above) | |
|---|---|---|---|
|  |  | 0~5 | 6~16 |
| Coefficient number (left) | 0~5 | Code table 1 | Code table 2 |
|  | 6~16 | Code table 3 | Code table 4 |

The code table selecting unit 901 classifies into two groups the respective number of coefficients in the blocks situated above and on the left of the current block as shown in Chart 8 according to the value and selects a table using a combination of the four thus formed. For example, a code table 2 is selected when the number of the coefficients in the left block is 3 and the number of the coefficients in the above block is 8. The method to classify the number of the coefficients in the upper and the left blocks and the way to assign code tables are not limited to those used in Chart 8.

Chart 9 shows a method of selecting a VLC table at the VLC table selecting unit 902.

CHART 9

|  |  | Coefficient number (above) | |
|---|---|---|---|
|  |  | 0~5 | 6~16 |
| Coefficient number (left) | 0~5 | VLC table 1 | VLC table 2 |
|  | 6~16 | VLC table 3 | VLC table 4 |

The VLC table selecting unit 902 selects a VLC table for actual reference using the selection method as shown in Chart 9 as in the case of code table selecting unit 901.

The coefficient number encoder 206 refers to the code table selected by the code table selecting unit 901 and the VLC table selected by the VLC table selecting unit 902 so as to perform variable length coding for the number of coefficients in the current block which is inputted in the same way as in the first embodiment.

Thus, in the present embodiment, by classifying the numbers of coefficients in the coded blocks located above and on the left of the current block into "n" group(s) according to the value with reference to the code table and the VLC table according to the combination of N×N ways then formed and by switching between them adaptively, it is possible to perform efficiently the coding of the number of coefficients for the picture whose apparition frequency of coefficients is uneven.

In the present embodiment, the coefficient number encoder 111 performs variable length coding for the value of the number of coefficients itself. The difference calculating unit 207 may, however, calculate a difference value between the predictive value calculated at the predictive value calculating unit 201 as shown in FIG. 12B as in the first embodiment and a value of the number of coefficients inputted so as to perform variable length coding.

Also, in the present embodiment, the coefficient number encoder 111 performs variable length coding by switching both the VLC table and the code table according to the numbers of the coefficients in the neighboring blocks. It is, however, possible to fix either of these tables rather than to switch them as in the first embodiment. In this case, variable length coding is realized by using a storing unit which has either one certain type of code tables or one certain type of VLC tables in stead of using table selecting units. Furthermore, it is also possible to perform variable length coding by switching only the VLC tables according to the numbers of the coefficients in the neighboring blocks without using code tables, as in the first embodiment.

Fourth Embodiment

The structure of the picture coding device and the outline of the coding processing according to the present embodiment are totally the same as those described in the first embodiment, excepting the coefficient number encoder 111 shown in FIG. 1. Here, regarding variable length coding processing of the number of coefficients performed by the coefficient number encoder 111 in the fourth embodiment, the detail is explained using FIGS. 13 and 14.

Figure 13A:
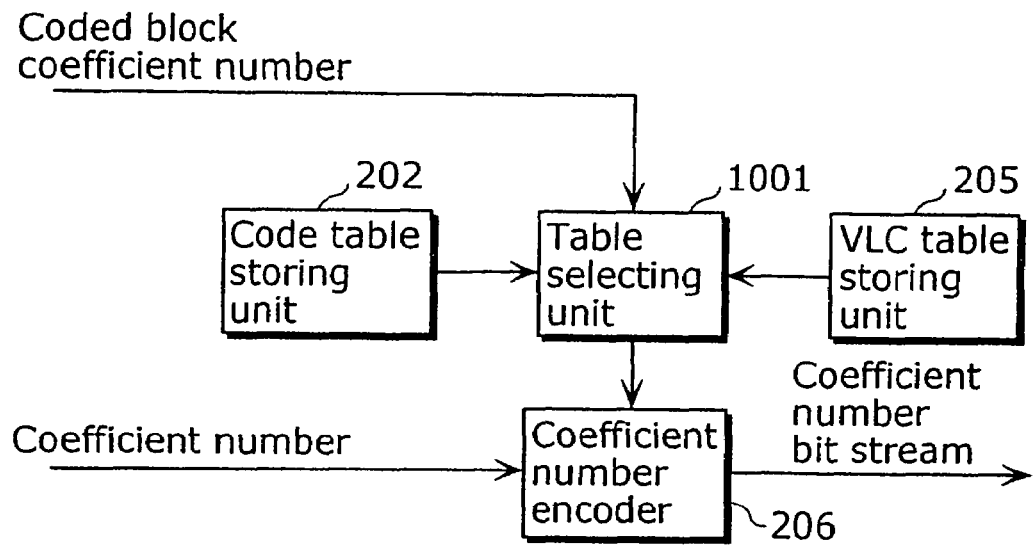
FIG. 13A is a block diagram showing a structure of a coefficient number encoder according to the fourth embodiment of the present invention.

FIG. 13A is a block diagram showing in detail an internal structure of the coefficient number encoder 111.

The coefficient number encoder 111 as shown in FIG. 13A includes a table selecting unit 1001 in stead of the predictive value calculating unit 201, the code table selecting unit 203 and the VLC table selecting unit 204 shown in FIG. 3A. The table selecting unit 1001 uses directly the number of coefficients in the coded blocks without using a predictive value so as to select tables for actual use by evaluating both a code table and a VLC table at the same time, which is different from the first embodiment. As for the coded blocks then used for the reference, the three blocks in the position of the blocks B, C and D for the current block X are used as in FIG. 4A. However, when the blocks located as such are neither coded nor situated outside the picture nor outside the slice, either a value 0 or other arbitrary value can be substituted.

Figure 14:
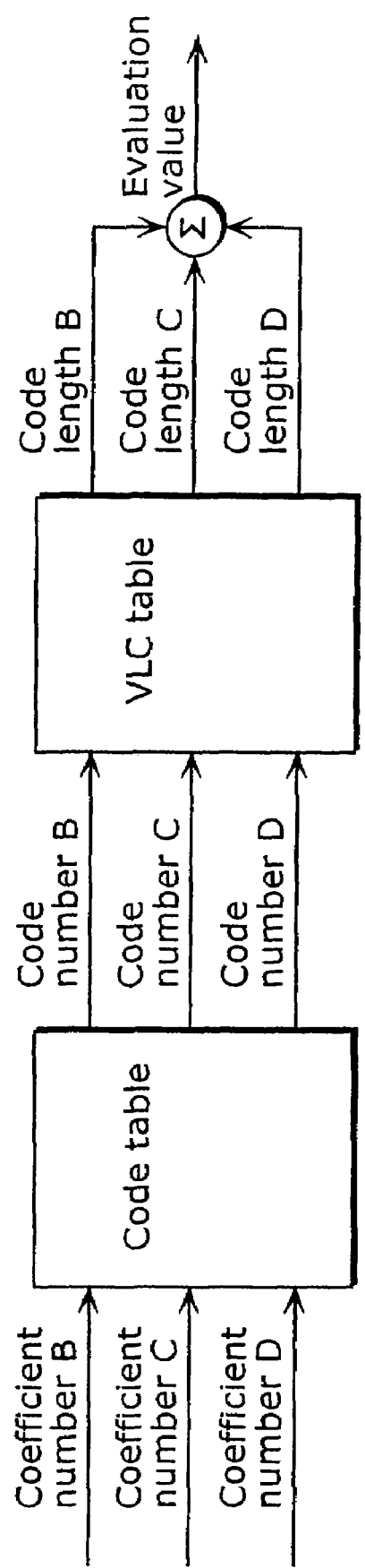
FIG. 14 is a block diagram for showing a method of calculating an evaluation value obtained by the table switching according to the fourth and the ninth embodiments of the present invention.

The table selecting unit 1001 calculates a sum of a length of a bit stream which is created as a result of coding the numbers of the coefficients in the reference blocks using both the code table and the VLC table at the same time and determines it as an evaluation value. FIG. 14 is a pattern diagram showing a method to perform coding for the numbers of coefficients in the three reference blocks using the code tables and the VLC tables and calculate the sum of the length of the gained bit stream so as to determine it as the estimation value. Then, the table selecting unit 1001 performs this processing to all the combinations of the code tables and the VLC tables stored in the code table storing unit 202 as well as the VLC table storing unit 205 and selects a combination of a code table and a VLC table in which the gained evaluation value is the smallest.

The coefficient number encoder 206 refers to the code table and the VLC table selected by the table selecting unit 1001 and performs variable length coding of the number of the coefficients in the current block which is inputted in the same way as described in the first embodiment.

In the present embodiment as shown above, it is possible to perform coding for the numbers of the coefficients in the neighboring blocks which are coded using the code table and the VLC table and determine the sum of the length of the bit stream at that time as an estimation value so as to perform efficiently the coding of the number of coefficients even for the picture whose apparition frequency of coefficients is uneven.

As for the coded blocks then used for the reference, the case in which only two blocks in the position of blocks B and D in stead of using three blocks in the position of blocks B, C and D for the current block X as shown in FIG. 4A are used can be treated in the same way. In this regard, when the blocks located above and on the left are neither coded nor situated outside the picture nor outside the slice, either a value 0 or other arbitrary value can be substituted.

Figure 13B:
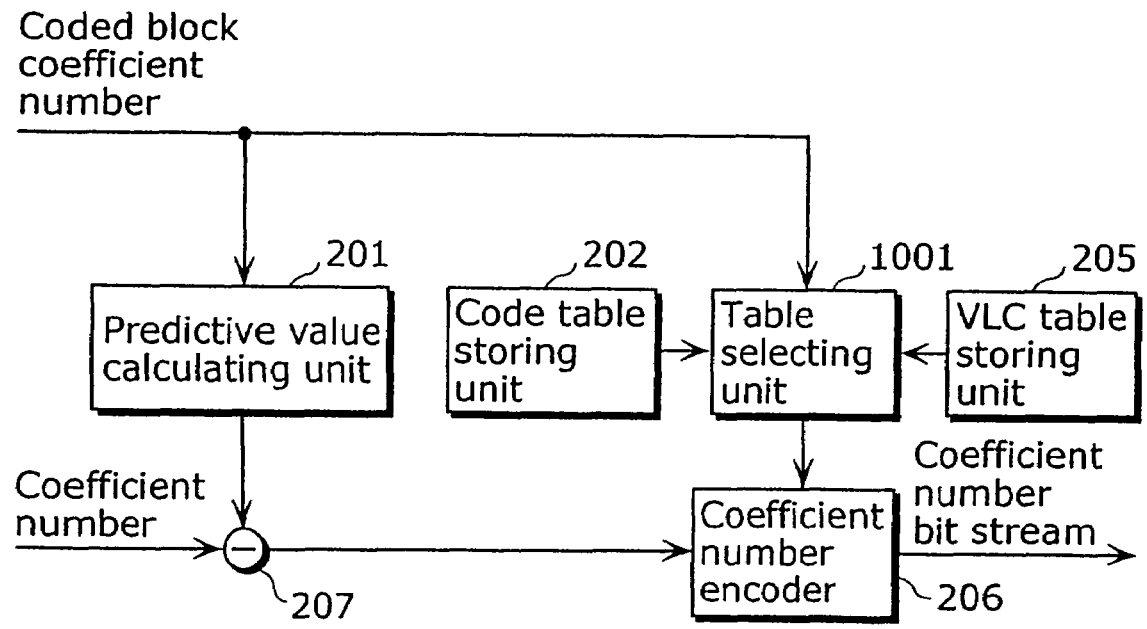
FIG. 13B is a block diagram showing a structure of a transformational example of the coefficient number encoder.

In the present embodiment, the coefficient number encoder 111 performs variable length coding for the value of the number of coefficients itself. However, as in the first embodiment, it is possible, as shown in FIG. 13, that a difference value between the predictive value calculated by the predictive value calculating unit 201 and the inputted value of the number of coefficients is calculated by the difference value calculating unit 207 and variable length coding is performed for the gained value by the same processing as described in the above-mentioned embodiments.

Also, in the present embodiment, the code table and the VLC table are to be switched in the coefficient number encoder 111, however, it is possible to fix either of them rather than to switch between them.

Fifth Embodiment

Figure 15:
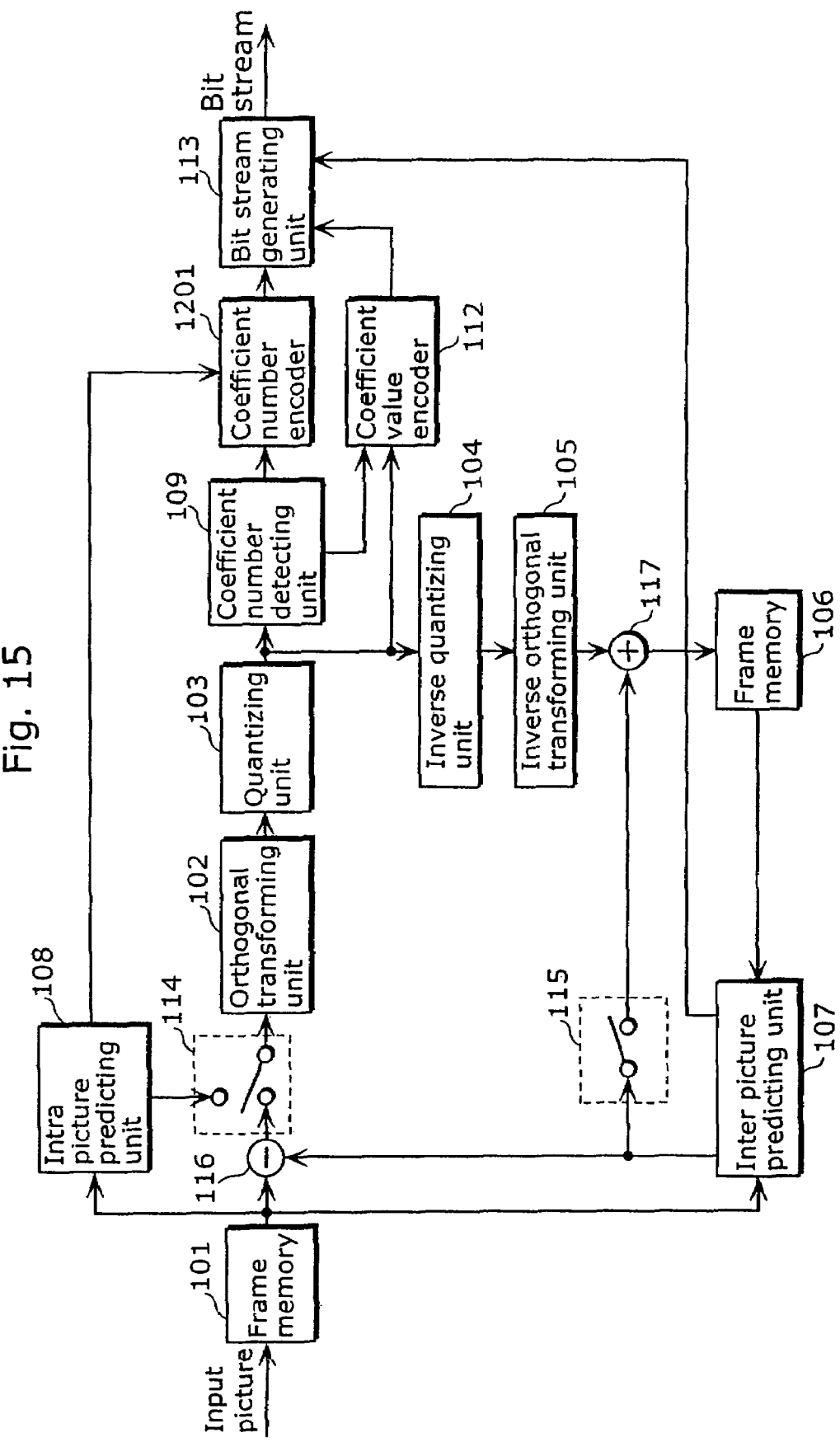
FIG. 15 is a block diagram showing a structure of a picture coding device according to the fifth embodiment of the present invention.

FIG. 15 is a block diagram showing a structure of a picture coding device in the fifth embodiment using a picture coding method according to the present invention. A sequence of coding processing is totally the same as the first embodiment. The difference, however, is that the present embodiment does not use the coefficient number storing unit 110 but employs inter picture prediction mode in case of inter picture prediction coding and intra picture prediction mode in case of intra picture prediction coding as referring information at a coefficient number encoder 1201 instead of using the number of the coefficients in the coded blocks as in the first embodiment.

Figure 16:
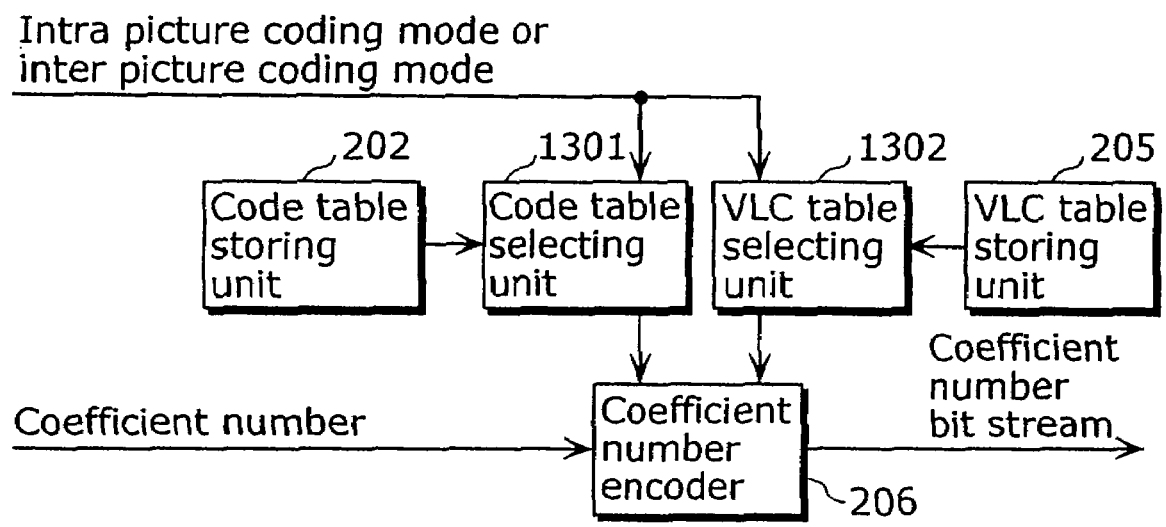
FIG. 16 is a block diagram showing a structure of a coefficient number encoder according to the fifth embodiment of the present invention.

Here, regarding an explanation of variable length coding processing at the coefficient number encoder 1201 shown in FIG. 15, the detail is explained using FIG. 16, Chart 10 and Chart 11.

FIG. 16 is a block diagram showing in detail an internal structure of the coefficient number encoder 1201.

As shown in FIG. 16, the coefficient number encoder 1201 does not include the predictive value calculating unit 201 shown in Chart 3A. An inter picture prediction mode is inputted from an inter picture predicting unit 107 and an intra picture prediction mode is inputted from an intra picture predicting unit 108 to a code table selecting unit 1301 and a VLC table selecting unit 1302. Consequently, the code table selecting 1301 selects a table based on the mode: the inter picture prediction mode for inter picture prediction and the intra picture prediction mode for intra picture prediction. Chart 10 shows a selection method for code tables at the code table selecting unit 1301.

CHART 10

| Reference table | Inter picture prediction mode | Intra picture prediction mode |
| --- | --- | --- |
| Code table 1 | 16 × 16, 16 × 8, 8 × 16 | Plane prediction |
| Code table 2 | 8 × 8 | Oblique prediction |
| Code table 3 | 8 × 4, 4 × 8 | Oblique prediction |
| Code table 4 | 4 × 4 | Vertical and horizontal prediction |

For example, in case where the current picture is coded using inter picture prediction, a code table 2 is selected accordingly for variable length coding of the number of coefficients when a prediction of the current block sized 8×8 is selected. The items are not limited to those used in Chart 10. Chart 11 shows a selecting method at the VLC table selecting unit 1302.

CHART 11

| Reference table | Inter picture prediction mode | Intra picture prediction mode |
|---|---|---|
| VLC table 1 | 16 × 16, 16 × 8, 8 × 16 | Plane prediction |
| VLC table 2 | 8 × 8 | Oblique prediction |
| VLC table 3 | 8 × 4, 4 × 8 | Oblique prediction |
| VLC table 4 | 4 × 4 | Vertical and horizontal prediction |

The VLC table selecting unit 1302 selects a VLC table for actual reference using a selection method shown in Chart 11 as in the case of the code table selecting unit 1301.

The coefficient number encoder 206 refers to the code table selected by the code table selecting unit 1301 and a VLC table selected by the VLC table selecting unit 1302 and performs variable length coding for the numbers of the coefficients in the current block which is inputted in the same way as in the first embodiment.

The present embodiment as shown above has shown a coding method which realizes efficient coding of the number of coefficients even for the picture whose apparition frequency of coefficients is uneven, with reference to the code table and the VLC table by switching between them adaptively according to the mode: inter picture prediction mode for inter picture prediction coding and intra picture prediction mode for intra picture prediction coding.

In the present embodiment, the coefficient number encoder 1201 performs variable length coding for the value of the number of coefficients itself as in the first embodiment. However, it is possible, as in the first embodiment, to determine a predictive value using the numbers of the coefficients in the neighboring blocks which are coded as in the first embodiment and obtain a difference value between this predictive value and the inputted value of the number of coefficients so as to perform variable length coding for the gained value in the same processing as in the above-mentioned embodiments.

Also, in the present embodiment the coefficient number encoder 1201 performs variable length coding by switching both the code table and the VLC table. It is, however, possible to fix either of them rather than switching either or both of them. In this case, this is realized by preparing only a storing unit which has one certain type of code tables or one certain type of VLC tables in stead of using table selecting units.

Sixth Embodiment

Figure 17:
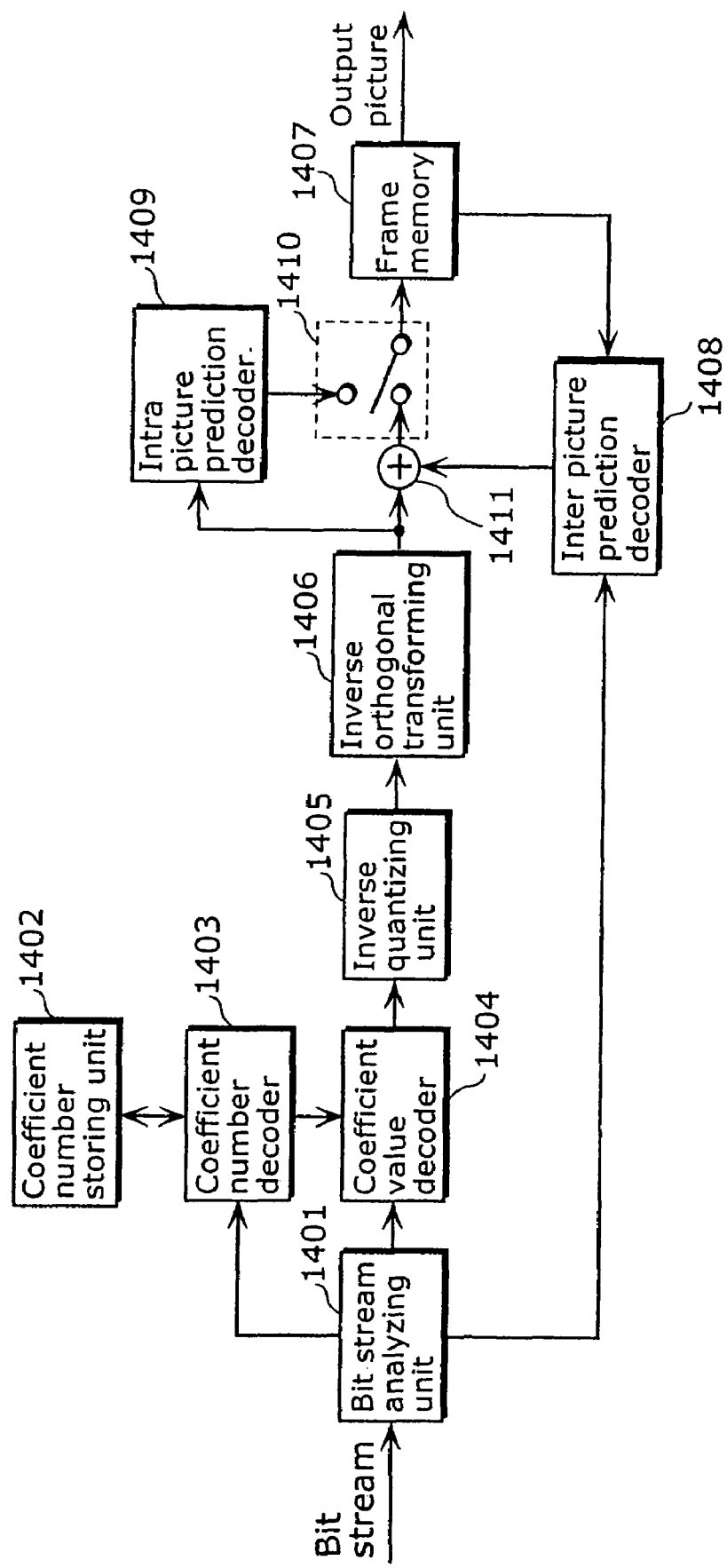
FIG. 17 is a block diagram showing a structure of an embodiment of a picture decoding device using a picture decoding method according to the present invention.

FIG. 17 is a block diagram showing a structure of an embodiment of a picture decoding device using a picture decoding method according to the present invention. The bit stream created by the picture coding device according to the first embodiment shall be inputted here.

The picture decoding device includes a bit stream analyzing unit 1401, a coefficient number storing unit 1402, a coefficient number decoder 1403, a coefficient value decoder 1404, an inverse quantizing unit 1405, an inverse orthogonal transforming unit 1406, a frame memory 1407, an inter picture prediction decoder 1408, an intra picture prediction decoder 1409 and a switch 1410.

The bit stream analyzing unit 1401 extracts from the inputted bit stream various types of information such as a coding mode, motion vectors used for coding, a bit stream of the number of coefficients (the number of coefficients showing a spatial frequency component which has a value other than 0 for each block) and various types of information on the bit stream of the value of the coefficients. The coefficient number storing unit 1402 stores the numbers of the coefficients of the decoded blocks. The coefficient number decoder 1403 decodes the bit stream of the numbers of coefficients by referring to the numbers of the coefficients in the decoded blocks.

The coefficient value decoder 1404 decodes the bit stream of the value of the coefficients using the numbers of coefficients decoded by the coefficient number decoder 1403. The inverse quantizing unit 1405 performs inverse quantization to the decoded coefficients. The inverse orthogonal transforming unit 1406 performs inverse orthogonal transformation to the data inversely quantized and transforms it to predictive residual picture data.

The inter picture prediction decoder 1408 creates motion compensation picture data based on the motion vectors extracted by the bit stream analyzing unit 1401 as well as decoded pictures or the like when a current macroblock to be decoded is coded with inter picture prediction. An addition calculating unit 1411 adds the predictive residual picture data inputted from the inverse orthogonal transforming unit 1406 and the motion compensation picture data inputted from the inter picture prediction decoder 1408 so as to create decoded picture data. The frame memory 1407 stores the created decoded picture data.

The intra picture prediction decoder 1409 performs intra picture prediction using information on the adjacent decoded blocks so as to create decoded picture data when the current macroblock is coded with intra picture prediction.

Next, an explanation of an operation of a picture decoding device as constructed above follows.

As a start, a bit stream is inputted to the bit stream analyzing unit 1401. The bit stream analyzing unit 1401 extracts from the inputted bit stream various types of information on motion vectors, a bit stream of the number of coefficients and a bit stream of the value of the coefficients and so on. Then, the bit stream analyzing unit 1401 outputs respectively as follows: the motion vectors to the inter picture prediction decoding unit 1408, the bit stream of the number of coefficients to the coefficient number decoder 1403 and the bit stream of the value of the coefficients to the coefficient value decoder 1404.

The coefficient number decoder 1403 to which the bit stream of the number of coefficients is inputted decodes this bit stream as the number of coefficients which has a value other than 0 for each block. In this case, the coefficient number decoder 1403 performs decoding by referring to the numbers of coefficients in the decoded blocks stored in the coefficient number storing unit 1402 with a method which is to be explained later on. Then, the coefficient value decoder 1404 performs decoding of the value of the coefficients itself with reference to the code tables and the VLC tables necessary for variable length decoding by switching between them using number information of the coefficient gained by the coefficient number decoder 1403. The gained coefficient is transformed into predictive residual picture data by the inverse quantizing unit 1405 as well as the inverse orthogonal transforming unit 1406.

The motion vectors extracted by the bit stream analyzing unit 1401 are inputted to the inter picture prediction decoder 1408, when a current macroblock to be decoded is coded with inter picture prediction. The inter picture prediction decoder 1408 creates motion compensation picture data by having decoded picture data of the decoded pictures stored in the frame memory 1407 as reference pictures, based on the information on the motion vectors. The motion compensation picture data thus gained is created as decoded picture data by being added to the predictive residual picture data at the addition calculating unit 1411 and then stored in the frame memory 1407.

On the other hand, when the current macroblock is coded using intra picture prediction, intra picture prediction is performed using information on the adjacent decoded blocks by the intra picture prediction decoder 1409, and decoded picture data is created and stored in the frame memory 1407. Then, the frame memory 1407 outputs it as definitive output picture in display order.

The outline of a flow of decoding has been explained above. Next, a decoding processing of the number of coefficients performed by the coefficient number decoder 1403 is explained in detail using FIG. 18~FIG. 21.

Figure 18A:
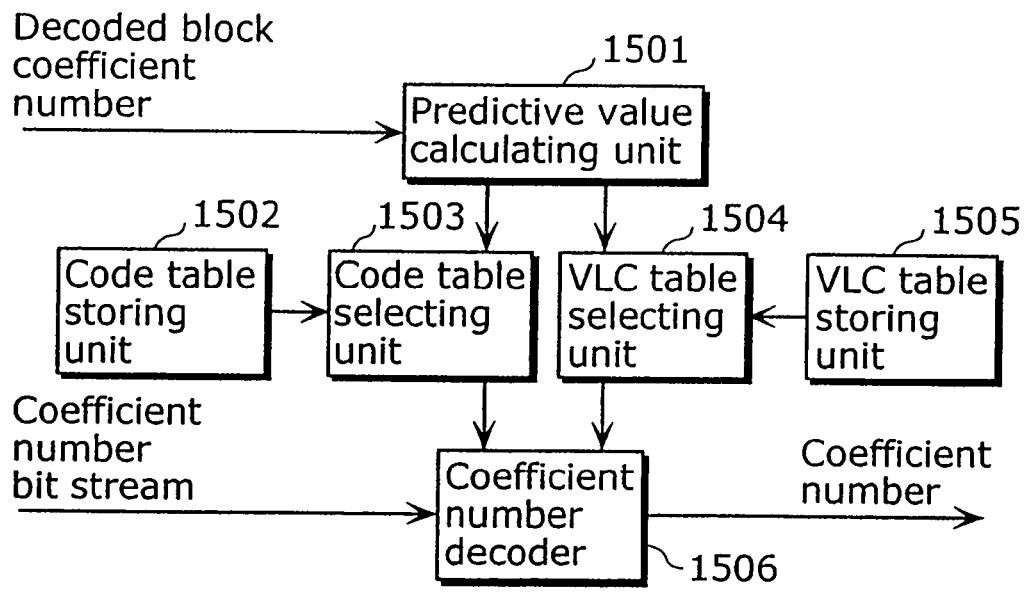
FIG. 18A is a block diagram showing a structure of a coefficient number decoder according to the sixth embodiment of the present invention.
Figure 18B:
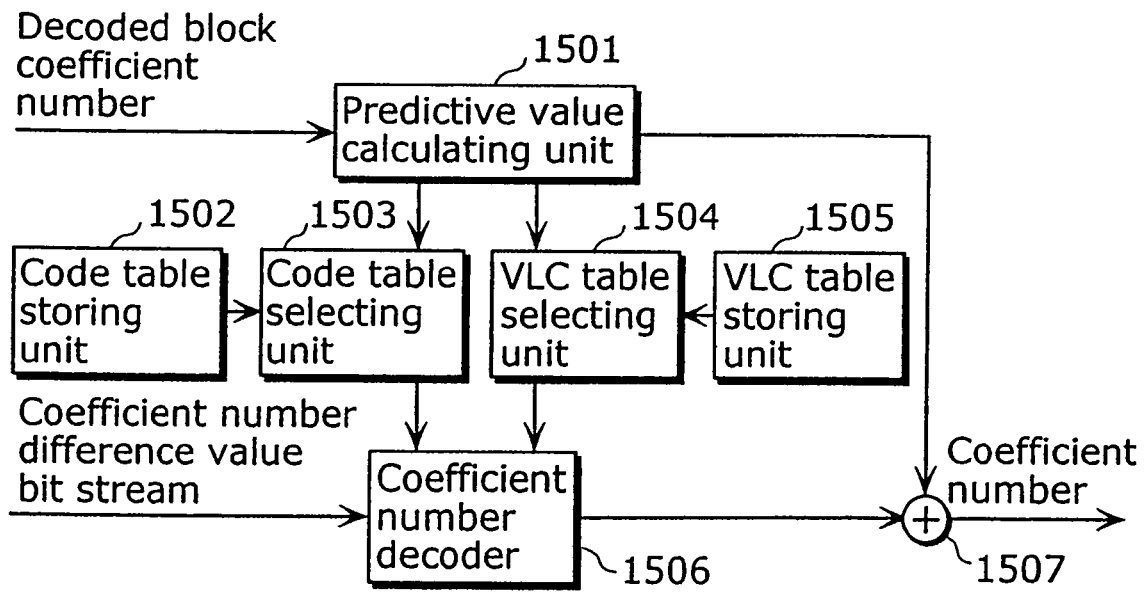
FIG. 18B is a block diagram showing a structure of a transformational example of the coefficient number decoder.

FIG. 18A is a block diagram showing in detail an internal structure of the coefficient number decoder 1403.

Here, an example of using two tables of a VLC table and a code table for performing variable length decoding of the numbers of coefficients. The VLC table is a table used for transforming variable length code in a bit stream into a code number whereas the code table is table used for transforming the code number gained by the VLC table into the number of coefficients.

As shown in FIG. 18A, the coefficient number decoder 1403 includes a predictive value calculating unit 1501, a code table storing unit 1502, a code table selecting unit 1503, a VLC table selecting unit 1504, a VLC table storing unit 1505 and a coefficient number decoder 1506.

Firstly, the numbers of the coefficients in the decoded blocks located on the periphery are inputted from the coefficient number storing unit 1402 as shown in FIG. 17 to the predictive value calculating unit 1501. The predictive value calculating unit 1501 determines a predictive value by calculating an average value of these values. A maximum value, a minimum value or a medium value may be used according to the predictive value calculating method for coding. The decoded blocks to be then referred to are determined following Chart 1 using three blocks in the position of blocks B, C and D for the current block X shown in FIG. 4A, as in the first embodiment. As for signs in Chart 1, a sign ○ signifies a coded block and a sign X signifies a block which can not be referred to since it is either not decoded or situated outside the picture or outside the slice. Chart 1 shows a relation between conditions of the reference blocks and the block(s) which can be referred to, however, the patterns are not limited to this. If no reference blocks are found, either a value 0 or other arbitrary value can be given directly as a predictive value.

The code table selecting unit 1503 selects a code table for actual use from a plurality of code tables stored in the code table storing unit 1502, according to the predictive value calculated by the predictive value calculating unit 1501.

Chart 2 is an example of a code table which relates numbers of coefficients and code numbers, prepared in advance by the code table storing unit 1502. Here, four types of code tables are prepared; however, the numbers of types of tables and the values indicated in the tables are not limited to those used in Chart 2. In this case, however, the same table as the one used for coding shall be used. Also, Chart 3 shows selection criteria for code tables based on a predictive value. The way of assigning the predictive value or the items of table is not limited to those used in Chart 3. However, the same table as the one used for coding shall be used.

The VLC table selecting unit 1504 selects a VLC table for actual use from a plurality of VLC tables stored in the VLC table selecting unit 1505 according to the predictive value calculated by the predictive value calculating unit 1501.

Chart 4 shows an example of a VLC table which relates number of coefficients and code numbers, prepared in advance by the VLC table storing unit 1505. Here, four types of VLC tables are prepared, however, the numbers of types of tables and the values indicated in the tables are not limited to those used in Chart 4. However, in this case, the same table as the one used for coding shall be used. Also, Chart 5 shows selecting criteria for VLC tables based on a predictive value. The way of assigning the predictive value and the items indicated in the reference tables are not limited to those used in Chart 5. However, in this case, it is conditioned to use the same table as the one used for coding.

Figure 19:
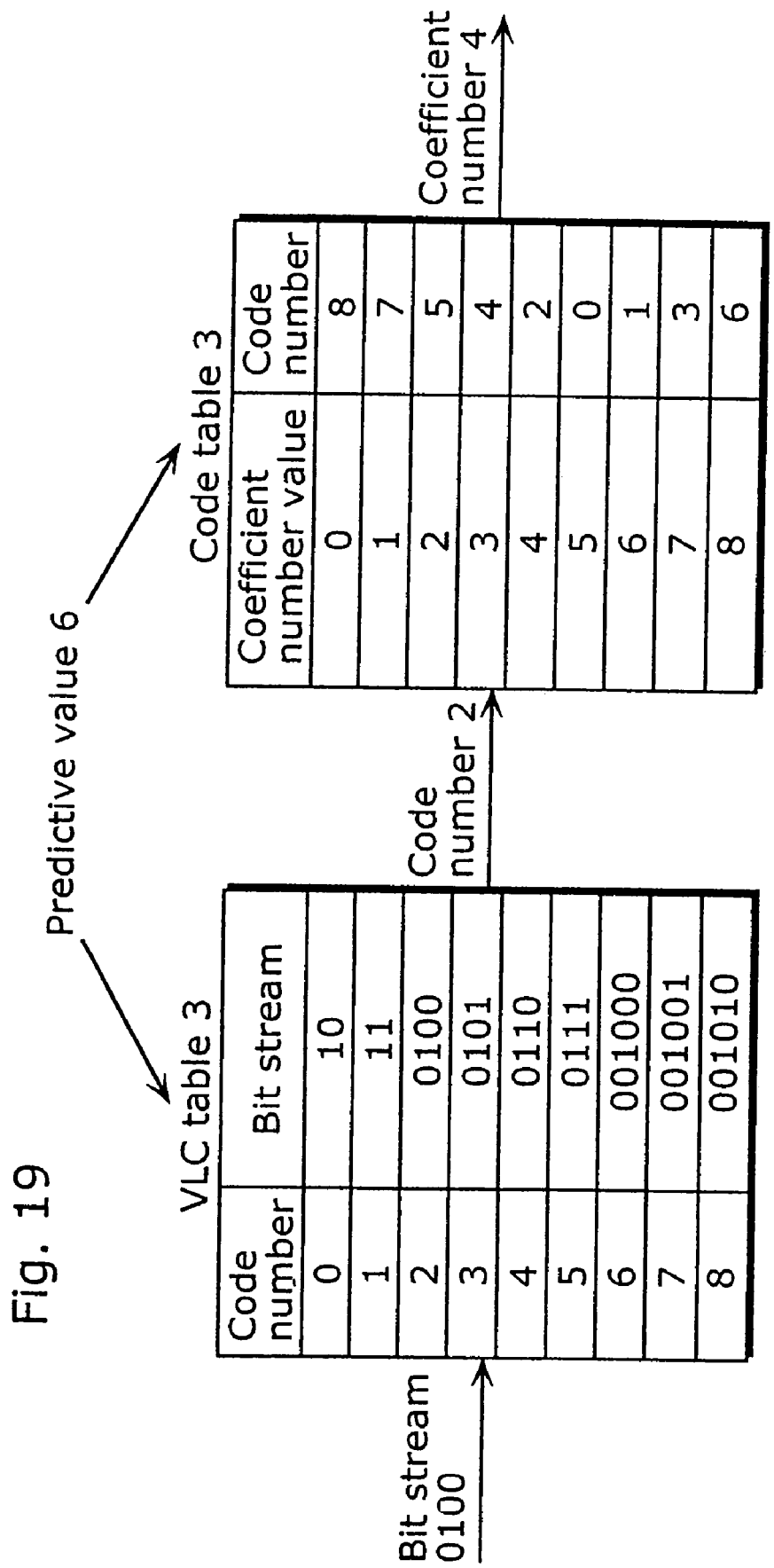
FIG. 19 is a pattern diagram showing an example of a flow when a bit stream of a number of coefficients is transformed into the number of coefficients with reference to tables.

The coefficient number decoder 1506 refers to the code table as well as the VLC table selected in the above processing and performs variable length decoding for a bit stream of the number of the coefficients in the inputted current block. The coefficient number decoder 1506 first transforms the number of coefficients into a code number using the VLC table and then transforms it into a value of the number of coefficients corresponding to the code number using the code table. FIG. 19 is a pattern diagram showing an example of decoding when a predictive value calculated at the predictive value calculating unit 1501 is "6" and a bit stream of the number of coefficients in the current block is "0100". The predictive value being "6", the code table selecting unit 1503 selects a code table 3 shown in FIG. 19 using Chart 3 and Chart 2, and the VLC table selecting unit 1504 selects a VLC table 3 shown in FIG. 19 using Chart 5 and Chart 4. The coefficient number decoder 1506 transforms the inputted bit stream "0100" into a code number "2" according to the VLC table 3 and then determines the definitive number of coefficients "4" according to the code table.

The following describes in detail storing processing of the number of coefficients performed by the coefficient number storing unit 1402, the detail is explained. FIG. 6A used for the description of the first embodiment is used here, however, a black boarder containing blocks coded B1~B16 shows a current macroblock to be decoded whereas hatched blocks show reference blocks for the current macroblock. The numbers put for the blocks indicates an order of decoding performed within the macroblock.

The coefficient number storing unit 1402 stores the numbers of coefficients decoded by the coefficient number decoder 1403, at least for the reference blocks which are hatched as shown in FIG. 6A necessary for the current macroblock at the time of starting the processing of the current macroblock shown in FIG. 6A. Namely, the coefficient number storing unit 1402 stores the number of the coefficients detected from the blocks of the current macroblock (B1, B2, B3, . . . and B16) which are to be processed sequentially. For example, when a block B6 is a current block, the coefficient number storing unit 1402 stores the numbers of each coefficient of the block B1, B2, B3, B4 and B5 which are already processed, in addition to those of the reference blocks as shown in FIG. 6A. When the coefficient number decoder 1403 decodes the number of coefficients of the block B6, the coefficient number storing unit 1402 stores it. The coefficient number storing unit 1402 thus stores the numbers of the coefficients of the blocks in the current macroblock, which are to be processed sequentially.

When a current macroblock is a macroblock MB11 shown in FIG. 2B, the coefficient number storing unit 1402 at least stores the numbers of the coefficients of the blocks in the bottom row and in the right column of the macroblock MB11 (hatched blocks) in FIG. 7A when the processing of this macroblock MB11 terminates and shifts to the next macroblock MB12. Next, the coefficient number storing unit 1402 at least stores the numbers of the coefficients of the blocks in the bottom row and in the right column of the macroblock MB12 in the same way as well as the numbers of the coefficients of the blocks in the bottom row of the macroblock MB11 (shaded blocks) as shown in FIG. 7B when the processing of the macroblock MB12 terminates and the processing proceeds to the next macroblock MB13.

When a current macroblock is located at the right edge of the picture as in a macroblock MB9 shown in FIG. 2B, the coefficient number storing unit 1402 at least stores the numbers of the coefficients of the blocks in the bottom row of the macroblock MB9 when the processing of this macroblock MB9 terminates and proceeds to the next macroblock MB10.

When a current block is located at the bottom edge of the picture as a macroblock MBm shown in FIG. 2B, the coefficient number storing unit 1402 at least stores the numbers of the coefficients of the blocks in the right column of this macroblock MBm (hatched blocks) as shown in FIG. 7C.

Thus the coefficient number storing unit 1402 at least stores the numbers of coefficients for the blocks to be referred to. It is possible to delete, in an arbitrary timing, the information on the numbers of coefficients of the blocks other than those to be stored as described in the above explanation when the blocks are no longer used for reference. For example, it is possible to delete the information when processing proceeds to the next macroblock as well as while processing the macroblock. Also, the numbers of the coefficients of the blocks which are not used for reference do not always need processing of deleting. For instance, the coefficient number storing unit 1402 may identify the numbers of coefficients of the blocks which are not referred to any longer as unnecessary and may overwrite to them if necessary.

It is explained above that it is possible to refer to the numbers of the coefficients of the decoded blocks by storing them in the coefficient number storing unit 1402. However, a system for calculating the number of coefficients, may be used, if necessary, by storing not the values of the number of coefficients themselves but, for instance, the values of the coefficients of the blocks, indicating spatial frequency components.

Thus, in the present embodiment, it is possible to calculate the predictive value using the numbers of coefficients in the decoded adjacent blocks and decode the number of coefficients with reference to the code table and the VLC table by switching between them adaptively according to the predictive value.

Also, it handles the changes in a position where the apparition probability of the number of coefficients is the highest, with reference to the code tables by switching them adaptively according to the predictive value. At the same time, it can correspond to a size of the dispersion of the apparition probability of the number of coefficients with reference to the VLC tables by switching them according to the predictive value.

It is possible to use only two blocks in the position of the blocks B and D as the blocks to be referred to by the predictive value calculating unit 1501 for the current block X as shown in FIG. 4B instead of using three neighboring blocks as shown in FIG. 4A. In this case, changes in the reference blocks can be made as in Chart 6 when the blocks are either not decoded or located outside the picture or outside the slice. As for the signs in Chart 6, a sign ○ signifies a decoded block and a sign X signifies a block which can not be referred to since it is either not decoded or situated outside the picture or outside the slice, as in Chart 1. Chart 6 shows a relation between conditions of the reference blocks and the block(s) which can be referred to, however, the patterns are not limited to this.

Either a value 0 or other arbitrary value is given directly as a predictive value when no reference blocks are found. However, the same value as the one used for coding shall be used. In this case, the coefficient number storing unit 1402 may only store the numbers of coefficients decoded by the coefficient number decoder 1403, at least those of the reference blocks necessary for the current macroblock, shown in FIG. 6B.

It is also possible, as a method to calculate a predictive value at the predictive value calculating unit 1501, for example, to select an optimal method according to each sequence, each GOP, each picture or each slice rather than to fix the method of using either of an average value, a maximum value, a minimum value or a medium value. In this case, a calculating method is determined by decoding the signals for identifying a calculation method described in the header section of the sequence or the picture or the slice, of the bit stream. The slice is a picture further divided into a plurality of sections. A section equivalent to one column in transverse direction in each macroblock is an example of this.

Also, it is possible to select, for example, either of an average value, a maximum value, a minimum value or a medium value according to the average value of the numbers of coefficients in the decoded reference blocks as a method to calculate a predictive value at the predictive value calculating unit 1501. Chart 7 shows the selection criteria. The way of assigning the average value and the items indicated as predictive value calculation methods are not limited to those used in Chart 7. In this regard, the same method as the one used for coding shall be used.

The present embodiment shows a decoding processing method of a bit stream in which variable length coding is performed for the values of the number of coefficients themselves by the coefficient number decoder 1403. It is, however, possible to perform decoding of a bit stream in which variable length coding is performed for a difference value between the predictive value and the number of coefficients. In this case, the number of coefficients is determined by the fact that the addition calculating unit 1507 adds the predictive value calculated by the predictive value calculating unit 1501 to the difference value of the number of coefficients decoded by the coefficient number decoder 1506.

Figure 20A:
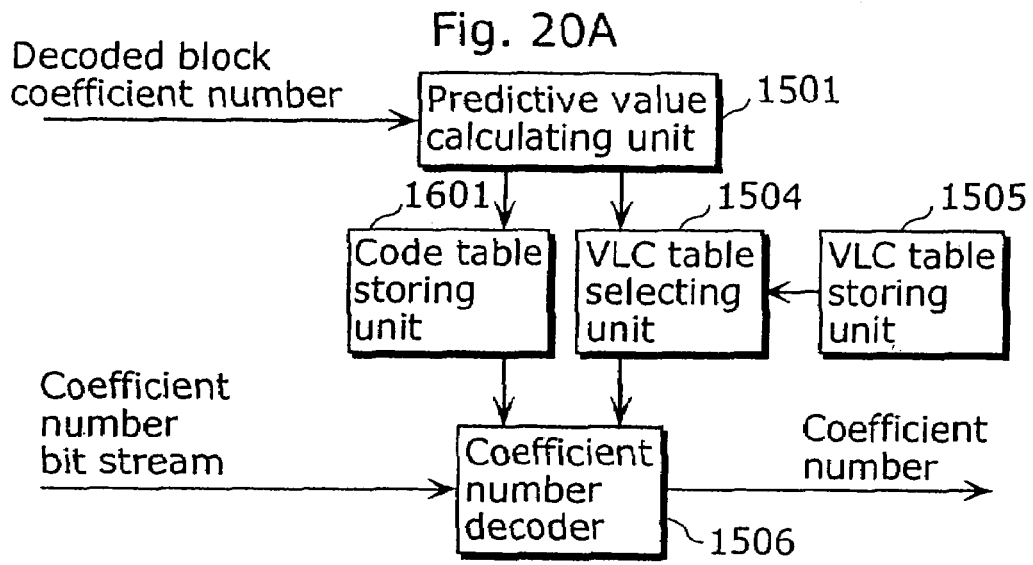
FIG. 20A and FIG. 20B are block diagrams showing a structure of a transformational example of a coefficient number decoder according to the sixth embodiment of the present invention.
Figure 20B:
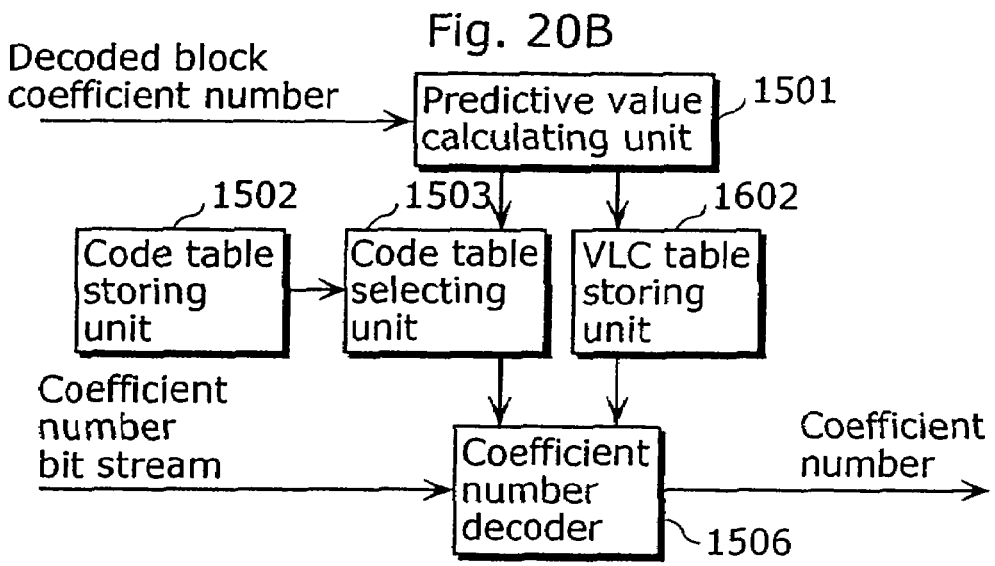

Also, the coefficient number decoder 1403 performs variable length decoding by switching both the code table and the VLC table according to the predictive value based on the numbers of the coefficients of the neighboring blocks. It is, however, possible to fix either of them rather than to switch between them. In this case, this is realized by preparing a storing unit which has either one certain type of code tables or one certain type of VLC tables. FIG. 20A is a block diagram showing a structure of the coefficient number decoder 1403 for performing variable length decoding of the number of coefficients by fixing only the code table. FIG. 20B is a block diagram showing a structure of the coefficient number decoder 1403 for performing variable length decoding of the number of coefficients by fixing only the VLC table. In case of fixing only the code table, the coefficient number decoder 1403 as shown in FIG. 20A includes a code table storing unit 1601 in stead of the code table storing unit 1502 and the code table selecting unit 1503 shown in FIG. 18A. The code table storing unit 1601 has one certain type of code tables. The coefficient number decoder 1506 first transforms variable length code into a code number using the VLC table selected by the VLC table selecting unit 1504 and then transforms the code number into the number of coefficients using the code table stored in the code table storing unit 1601.

On the other hand, in case of fixing only the VLC table, the coefficient number decoder 1403 as shown in FIG. 20B includes a VLC table storing unit 1602 in stead of the VLC table storing unit 1505 and the VLC table selecting unit 1504 shown in FIG. 18A. The VLC table storing unit 1602 has one certain type of VLC table. The coefficient number decoder 1506 firstly transforms a variable length code into a code number using the VLC table stored in the VLC table storing unit 1602 and then transforms the code number into the number of coefficients using the code table selected by the code table selecting unit 1503.

Thus it is possible to reduce memory capacity for storing a plurality of tables by fixing either of a code table and a VLC table.

Figure 20C:
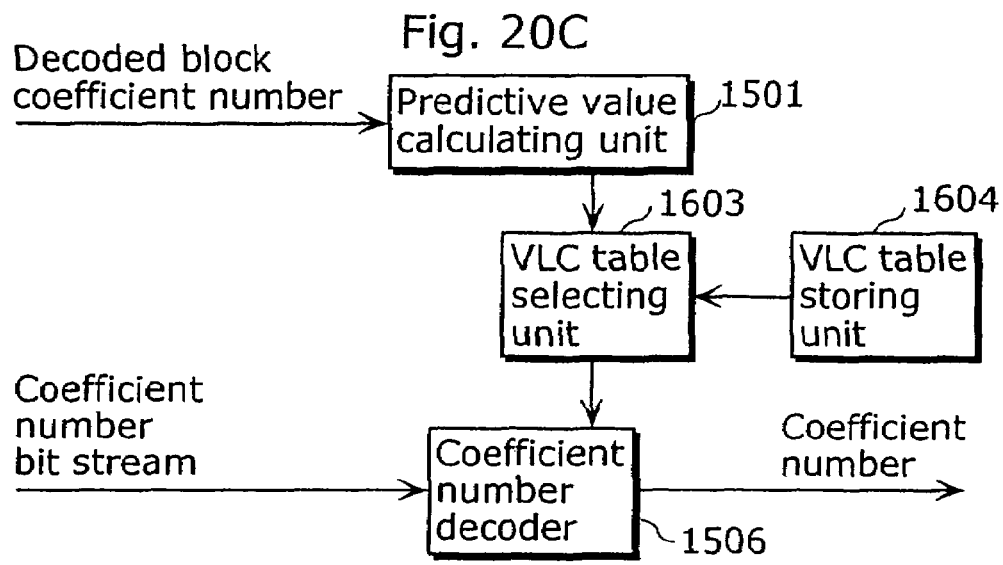
FIG. 20C presents a case of using a VLC table without using code tables.

It is also possible to perform variable length decoding in the coefficient number decoder 1403 by switching only the VLC tables without using code tables, according to the predictive value based on the numbers of the coefficients of the neighboring blocks. FIG. 20C is a block diagram showing a structure of the coefficient number decoder 1403 when performing variable length decoding of the coefficient number using only a VLC table without using code tables. In this case, as shown in FIG. 20C, the coefficient number decoder 1403 includes neither the code table storing unit 1502 nor the code table selecting unit 1503 shown in FIG. 18A. In the coefficient number decoder 1403, the VLC table selecting unit 1603 selects the VLC table for actual use from a plurality of VLC tables stored in the VLC table storing unit 1604, based on the predictive value calculated by the predictive value calculating unit 1501. Then, the coefficient number decoder 1506 transforms directly a variable length code into the number of coefficients without transforming the number of coefficients into a code number using the code table as described above.

Thus by fixing either of the code table or the VLC table in stead of switching between them, the throughput for switching tables can be reduced or an amount of memory for storing a plurality of tables can be reduced although the effects of coding efficiency decreases more or less.

Figure 21:
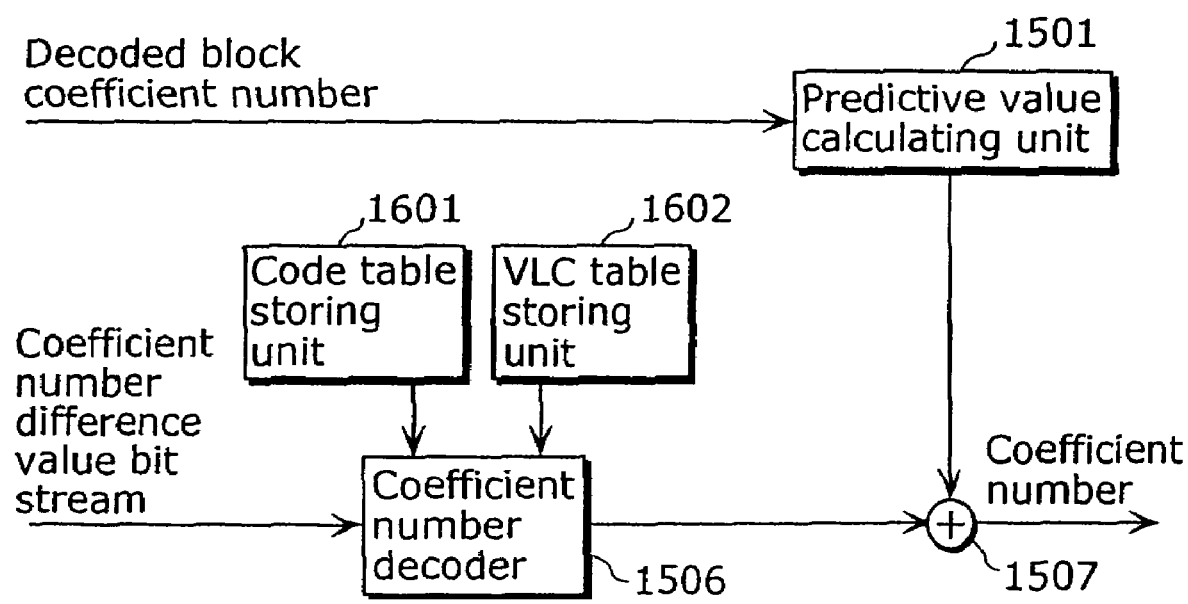
FIG. 21 is a block diagram showing a structure of a transformational example of a coefficient number decoder according to the sixth embodiment of the present invention.

Also, a case in which the coefficient number decoder 1403 decodes a bit stream in which variable length coding is performed to the difference value between the predictive value and the number of coefficients, in stead of the value of the number of coefficients, can be handled in the same way. FIG. 21 is a block diagram of its example showing a structure of the coefficient number decoder 1403 for performing decoding of the bit stream in which variable length decoding is performed to the difference value between the predictive value and the number of coefficients by fixing both the code table and the VLC table. In this case, as shown in FIG. 21, the coefficient number decoder 1403 includes a code table storing unit 1601 in stead of the code table storing unit 1502 and the code table selecting unit 1503 shown in FIG. 18A as well as a VLC table storing unit 1602 in stead of the VLC table storing unit 1505 and the VLC table selecting unit 1504 shown in FIG. 18A. This code table storing unit 1601 has one certain type of code tables whereas the VLC table storing unit 1602 has one certain type of VLC table. The coefficient number decoder 1506 first transforms a variable length code into a code number using the VLC table stored in the VLC table storing unit 1602 and then transforms the code number into a difference value between the predictive value and the number of coefficients using the code table stored in the code table storing unit 1601. The addition calculating unit 1507 calculates the number of coefficients by adding the difference value to the predictive value.

Seventh Embodiment

The structure of the picture decoding device and the outline of the decoding processing are totally the same as in the sixth embodiment, apart from the coefficient number decoder 1403 shown in FIG. 17. As for a variable length decoding processing of the number of coefficients performed at the coefficient number decoder 1403 according to the seventh embodiment, the detail is explained here using FIGS. 11 and 22. The bit stream created at the picture coding device according to the second embodiment shall be inputted.

Figure 22A:
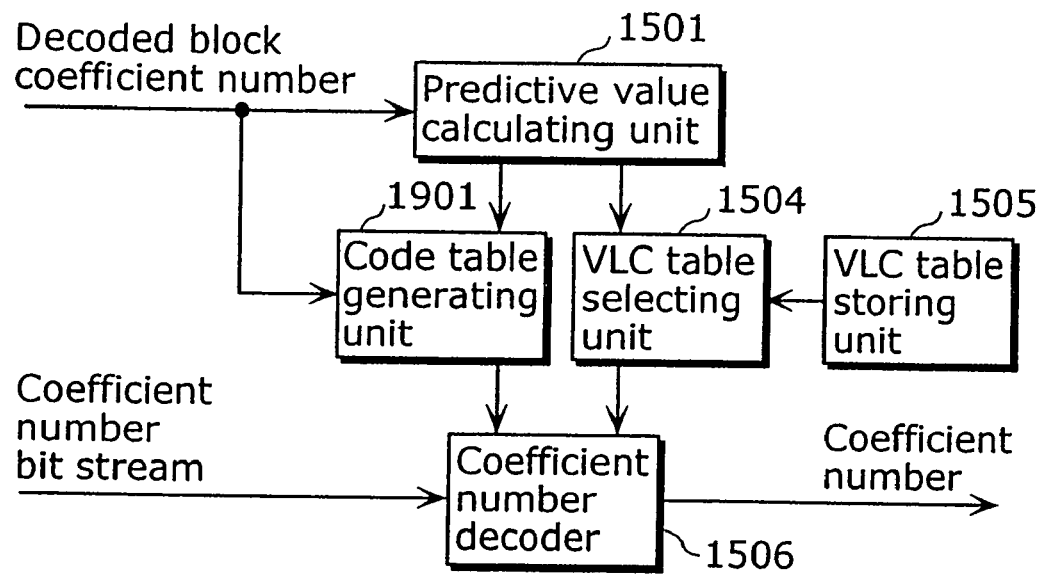
FIG. 22A is a block diagram for explaining an operation of processing showing a structure of a coefficient number decoder according to the seventh embodiment of the present invention.

FIG. 22A is a block diagram showing in detail an internal structure of the coefficient number decoder 1403.

As shown in FIG. 22A, the coefficient number decoder 1403 includes a code table generating unit 1901 in stead of the code table storing unit 1502 and the code table selecting unit 1503 shown in FIG. 18A. The numbers of coefficients in the decoded blocks are inputted from the coefficient number storing unit 1402 shown in FIG. 17 to the code table generating unit 1901. The code table generating unit 1901 counts the number of the decoded blocks having the same number of coefficients as the value of the number of coefficients at each value of the number of coefficients and creates code tables by assigning code numbers in descending order starting from a number of coefficients which recorded the highest frequency based on the statistic. FIG. 11A is a pattern diagram presenting a position of decoded blocks targeted for statistics. Here, a P1, a P3 and a P4 are pictures in which inter picture prediction is performed whereas an I2 is a picture in which intra picture prediction is performed. Supposing that a current block to be decoded belongs to the P3, all the blocks in the P1, a picture immediately preceding the current picture decoded with the same method, are targeted for statistics. The case in which the blocks equivalent to one picture including the decoded blocks in the current picture are targeted for statistics can be handled in the same way. Also, a table for the initial condition in ascending order starting from the value 0 is used when the decoded blocks equivalent to one picture which can be targeted for statistics do not exist. Here, the blocks equivalent to one picture are targeted for statistics, however, the case in which the number of blocks other than this is used as a parameter can be handled in the same way. In this regard, the same number as the one used for coding shall be used. In the case of generating the code table as described above by making reference as shown in FIG. 11A, the table may be generated only once when encoding of the current picture is started.

Meanwhile, the numbers of coefficients in the decoded blocks located on the periphery are inputted to the predictive value calculating unit 1501. The predictive value calculating unit 1501 determines the predictive value by calculating an average value based on these values as in the sixth embodiment. A maximum value, a minimum value or a medium value may be used in stead of the average value as a method to determine the predictive value. As in the sixth embodiment, the decoded blocks then used as reference, are determined using the three blocks located in the position of the blocks B, C and D for the current block X shown in FIG. 4A according to Chart 1. Chart 1 shows a relation between conditions of the reference blocks and the block(s) which can be referred to, however, the patterns are not limited to this. Either a value 0 or other arbitrary value is given directly as a predictive value when no reference blocks are found. In this regard, the same value as the one used for coding shall be used.

The predictive value calculated by the predictive value calculating unit 1501 is used only in the VLC table selecting unit 1504. The VLC table selecting unit 1504 selects, as in the sixth embodiment, a VLC table for decoding the number of coefficients from a plurality of VLC tables prepared beforehand in the VLC table storing unit 1505 as shown in Chart 4, according to the selection criteria shown in Chart 5.

The coefficient number decoder 1506 refers to the code table created by the code table generating unit 1901 and the VLC table selected by the VLC table selecting unit 1504 and performs variable length decoding for the bit stream of the number of coefficients inputted in the same way as in the sixth embodiment.

Thus, in the present embodiment, it is possible to create a code table by taking statistics of the numbers of coefficients in the decoded blocks and determine a VLC table according to the predictive value calculated using the numbers of the coefficients in the decoded blocks and perform the decoding of the number of coefficients by referring to both of the tables.

It is also possible to determine the decoded blocks to be used for reference at the predictive value calculating unit 1501 as in the sixth embodiment according to Chart 6, using only two blocks located in the position of the blocks B and D with respect to the current block X shown in FIG. 4B, in stead of using three adjacent blocks as shown in FIG. 4A. Chart 6 shows a relation between conditions of the reference blocks and the block(s) which can be referred to, however, the patterns are not limited to this. Either a value 0 or other arbitrary value is given directly as a predictive value when no reference blocks are found. In this regard, the same value as the one used for coding shall be used.

It is also possible, as a method to calculate a predictive value at the predictive value calculating unit 1501, for example, to select an optimal method according to each sequence, each GOP, each picture or each slice rather than to fix the method to use either of an average value, a maximum value, a minimum value or a medium value. In this case, the calculation method is determined by decoding the signals for identifying the calculating method described in the header of the sequence, the GOP or the picture or the slice, of the bit stream.

Also, it is possible to select, for example, either of an average value, a maximum value, a minimum value or a medium value according to the average value of the numbers of coefficients in the decoded reference blocks as a method to calculate a predictive value at the predictive value calculating unit 1501. Chart 7 shows its selection criteria. The way of assigning the average value and the items indicated as predictive value calculation methods are not limited to those used in Chart 7. In this regard, the same method as the one used for coding shall be used.

Figure 22B:
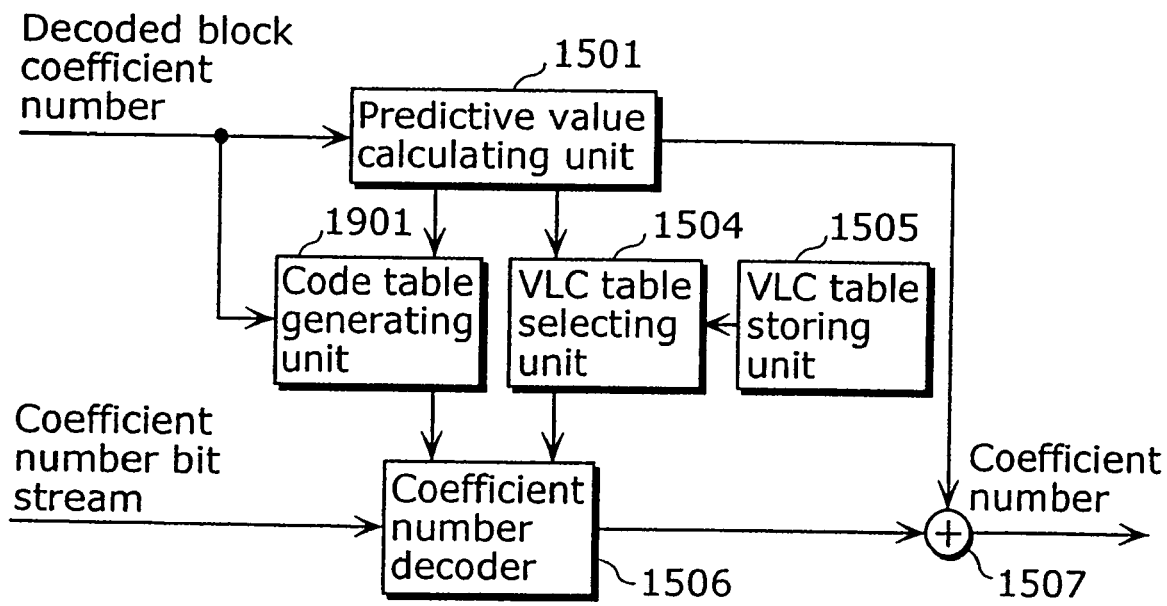
FIG. 22B is a block diagram showing a structure of a transformational example of the coefficient number decoder.

Also, the present embodiment shows a decoding processing method of a bit stream in which variable length coding is performed to the values of the number of coefficients themselves. It is, however, possible to perform decoding of a bit stream in which variable length coding is performed to a difference value between a predictive value and the number of coefficients. In this case, the number of coefficients is determined by the fact that the addition calculating unit 1507 adds the difference value between the predictive value calculated at the predictive value calculating unit 1501 as shown in FIG. 22 to the number of coefficients decoded by the coefficient number decoder 1506.

Also, in the above-mentioned embodiment, the coefficient number decoder 1403 performs variable length decoding by switching the VLC tables according to the predictive value based on the numbers of the coefficients in the adjacent blocks. It is, however, possible to fix the table rather than to switch between the tables as in the sixth embodiment. In this case, this is realized by using only a VLC table storing unit which has one certain type of VLC tables, in stead of using the VLC table selecting unit.

Eighth Embodiment

The structure of the picture decoding device and the outline of the decoding processing are totally the same as in the sixth embodiment, apart from the coefficient number decoder 1403 shown in FIG. 17. As for variable length decoding processing of the number of coefficients performed by the coefficient number decoder 1403 according to the eighth embodiment, the detail is explained here using FIG. 23, Chart 8 and Chart 9. The bit stream created by the picture coding device according to the third embodiment shall be inputted.

FIG. 23A is a block diagram showing in detail an internal structure of the coefficient number decoder 1403.

As shown in FIG. 23A, the coefficient number decoder 1403 does not include the predictive value calculating unit 1501 shown in FIG. 18A. A code table selecting unit 2001 and a VLC table selecting unit 2002 select a table for actual use by using directly the numbers of coefficients in the decoded blocks without using a predictive value, which is different from the sixth embodiment. As for the decoded blocks then used for the reference shown in FIG. 4B, only two blocks in the position of the block B (above) and the block D (left) with respect to the current block X are used. However, when the blocks located above and on the left are neither decoded nor situated outside the picture nor outside the slice, either a value 0 or other arbitrary value can be substituted. In this regard, the same value as the one used for coding shall be used.

Chart 8 shows a selection method for code tables at the code table selecting unit 2001. The code table selecting unit 2001 classifies into two groups the respective numbers of coefficients in the blocks situated above and on the left of the current block, as shown in Chart 8, according to the value, and selects a table using a combination of the four thus formed. The method to classify the number of coefficients in the upper and the left blocks and the way to assign the code tables are not limited to those used in Chart 8. In this regard, the same method as the one used for coding is used in this case. Also, the VLC table selecting unit 2002 selects a VLC table for actual reference using the selection method shown in Chart 9, as in the case of the code table selecting unit 2001.

The coefficient number decoder 1506 refers to the code table selected by the code table selecting unit 2001 and the VLC table selected by the VLC table selecting unit 2002 and performs variable length decoding for the number of coefficients in the current block which is inputted in the same way as in the sixth embodiment.

The present embodiment as shown above, by classifying the number of coefficients in the decoded blocks located above and on the left of the current block into "N" group(s) according to the value with reference to the code table and the VLC table, according to the combination of N×N ways then formed, and by switching between them adaptively, it is possible to perform efficiently the decoding of the number of coefficients.

The present embodiment shows a decoding processing method of a bit stream in which variable length coding is performed to the values of the number of coefficients themselves. It is, however, possible to perform decoding of a bit stream in which variable length coding is performed to a difference value between the predictive value and the number of coefficients. In this case, the number of coefficients is determined by the fact that the addition calculating unit 1507 adds the difference value between the predictive value calculated at the predictive value calculating unit 1501 to the number of coefficients decoded by the coefficient number decoder 1506.

Also, the coefficient number decoder 1403 performs variable length decoding by switching both the code table and the VLC table according to the numbers of coefficients in the neighboring blocks. It is, however, possible to fix either of these tables rather than to switch between them as in the sixth embodiment. In this case, this is realized by using a storing unit which has either one certain type of code tables or one certain type of VLC tables, in stead of using the table selecting units. Furthermore, it is possible to perform variable length decoding by switching only the VLC tables without using code tables according to the numbers of coefficients in the adjacent blocks, as in the sixth embodiment.

Ninth Embodiment

The structure of the picture decoding device and the outline of the decoding processing according to the present embodiment are totally the same as the sixth embodiment apart from the coefficient number decoder 1403 shown in FIG. 17. Regarding variable length decoding processing of the number of coefficients performed by the coefficient number decoder 1403 according to the ninth embodiment, the detail is explained here using FIGS. 24 and 14. The bit stream created by the picture coding device according to the fourth embodiment shall be inputted.

Figure 24A:
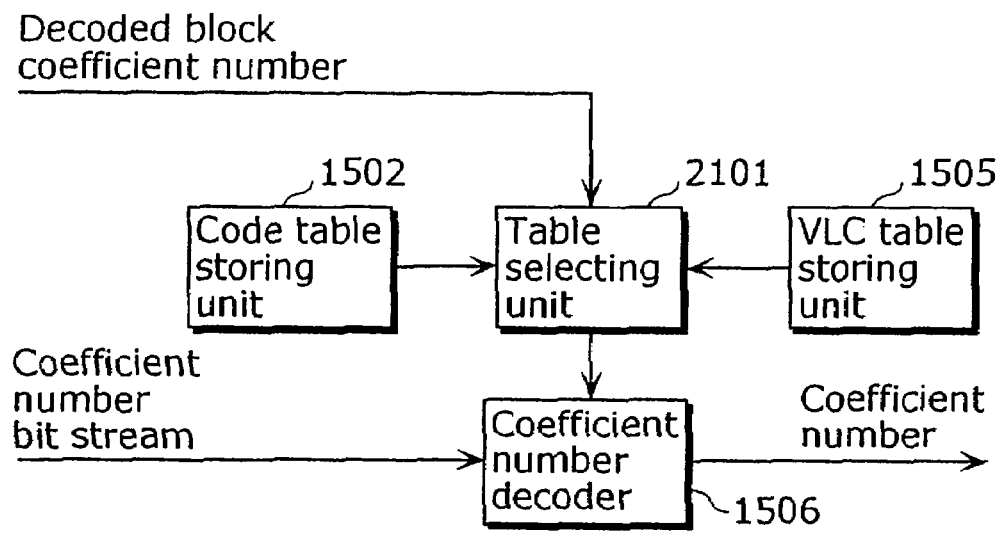
FIG. 24A is a block diagram for explaining an operation of processing which shows a structure of the coefficient number decoder according to the ninth embodiment of the present invention.

FIG. 24A is a block diagram showing in detail an internal structure of the coefficient number decoder 1403.

As shown in FIG. 24A, the coefficient number decoder 1403 includes a table selecting unit 2101 instead of the predictive value calculating unit 1501, the code table selecting unit 1503 and the VLC table selecting unit 1504 shown in FIG. 18A. The table selecting unit 2101 uses directly the number of the coefficients in the decoded blocks without using a predictive value and selects a table for actual use by evaluating both the code table and the VLC table at the same time, which is different from the sixth embodiment. As for the decoded blocks then used for the reference, the three blocks in the position of the blocks B, C and D with respect to the current block X are used as in FIG. 4A. In this regard, when the blocks thus located are neither decoded nor situated outside the picture nor outside the slice, either a value 0 or other arbitrary value is substituted as the number of coefficients. However, the same value as the one used for coding shall be used.

As shown in FIG. 14, the table selecting unit 2101 calculates a sum of a length of a bit stream which is created as a result of coding the numbers of the coefficients in the reference blocks using both the code table and the VLC table at the same time and determines it as an evaluation value as in the fourth embodiment. Then, the table selecting unit 2101 performs this processing for all the combinations of the code table and the VLC table stored in the code table storing unit 1502 as well as the VLC table storing unit 1505 and selects a combination of a code table and a VLC table in which the gained evaluation value is the smallest.

The coefficient number decoder 1506 refers to the code table and the VLC table selected by the table selecting unit 2101 and performs variable length coding for the number of the coefficients in the current block which is inputted in the same way as in the sixth embodiment.

Thus, in the present embodiment, the coding is performed for the numbers of coefficients in the neighboring blocks which are decoded using the code table and the VLC table, an estimation value is determined using the sum of the length of the bit stream at that time and decoding is performed for the number of coefficients by referring to the code table and the VLC table whose combination generates the smallest evaluation value.

As for the decoded blocks used for reference by the table selecting unit 2101, a case of using only two blocks located in the position of the blocks B and D with respect to the current block X as shown in FIG. 4B in stead of using three neighboring blocks shown in FIG. 4A, can be handled in the same way as in the sixth embodiment. In this regard, when the blocks thus located are neither decoded nor situated outside the picture nor outside the slice, either a value 0 or other arbitrary value can be substituted as a number of coefficients.

Figure 24B:
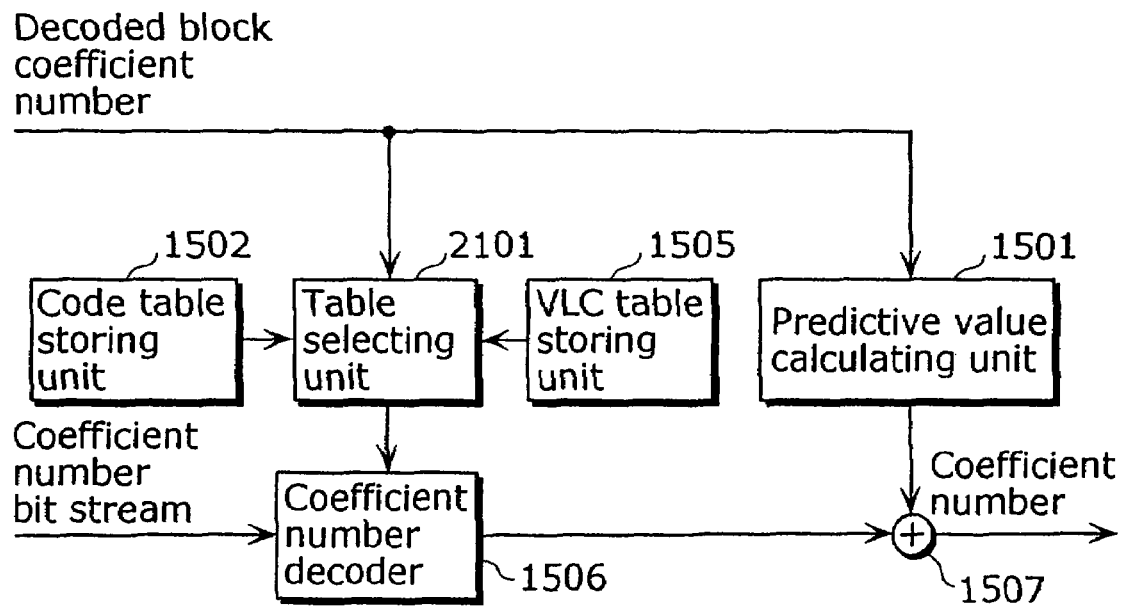
FIG. 24B is a block diagram showing a structure of a transformational example of the coefficient number decoder.

Also, the present embodiment shows a decoding processing method of a bit stream in which variable length coding is performed for the values of the number of coefficients themselves. It is, however, possible to perform decoding of a bit stream in which variable length coding is performed for a difference value between the predictive value and the number of coefficients. In this case, the number of coefficients is determined by the fact that the addition calculating unit 1507 adds the difference value between the predictive value calculated by the predictive value calculating unit 1501 to the number of coefficients decoded by the coefficient number decoder 1506, as shown in FIG. 24B.

Also, in the present embodiment, the code table and the VLC table are targeted for switching in the coefficient number decoder 1403, however, it is possible to fix either of them rather than to switch between them.

Tenth Embodiment

The structure of the picture decoding device and the outline of the decoding processing according to the present embodiment are totally the same as in the sixth embodiment, apart from the coefficient number decoder 1403 shown in FIG. 17. The present embodiment uses an inter picture prediction mode for inter picture prediction decoding and an intra picture prediction mode for intra picture prediction decoding as referring information at the coefficient number decoder 1403 in stead of the numbers of coefficients in the decoded blocks as in the sixth embodiment. The bit stream which is created at the picture coding device according to the fifth embodiment shall be inputted.

Here, regarding variable length decoding processing of the number of coefficients performed by the coefficient number decoder 1403 shown in FIG. 17, the detail is explained with reference to FIG. 25.

Figure 25:
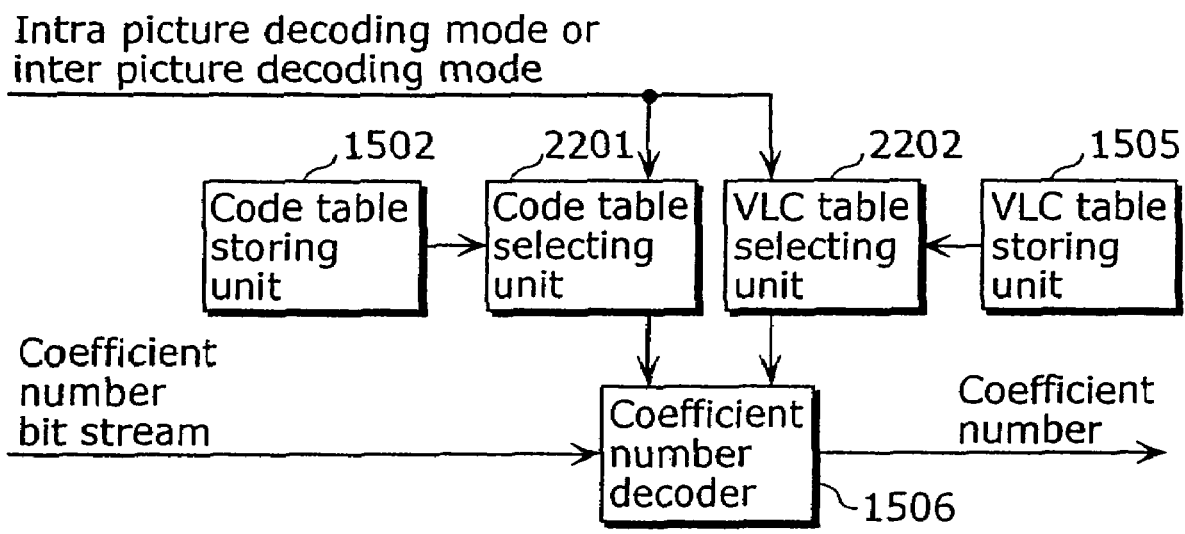
FIG. 25 is a block diagram for explaining an operation of processing which shows a structure of a coefficient number decoder according to the tenth embodiment of the present invention.

FIG. 25 is a block diagram showing in detail an internal structure of the coefficient number decoder 1403.

As shown in FIG. 25, the coefficient number decoder 1403 does not include the predictive value calculating unit 1501 shown in FIG. 18A. The inter picture prediction mode for inter picture prediction decoding and the intra picture prediction mode for intra picture prediction decoding are Inputted from the bit stream analyzing unit 1401 to a code table selecting unit 2201 as well as a VLC table selecting unit 2202. The code table selecting unit 2201 selects a table to be used based on the mode: the inter picture prediction mode for inter picture prediction decoding and the intra picture prediction mode for intra picture prediction decoding. Chart 10 shows a selection method for the code tables stored in the code table selecting unit 2201.

For example, in case where the current picture is decoded using inter picture prediction, a code table 2 is selected accordingly for variable length decoding of the number of coefficients when the size of the current block 8×8 is selected for prediction. The items are not limited to those used in Chart 10. In this regard, the same items as the ones used for coding shall be used.

Also, the VLC table selecting unit 2202 selects a VLC table for actual reference using the selection method as shown in Chart 11 as in the case of the code table selecting unit 2201.

The coefficient number decoder 1506 refers to the code table selected by the code table selecting unit 2201 as well as to the VLC table selected by the VLC table selecting unit 2202 so as to perform variable length decoding of the number of the coefficients in the current block which is inputted in the same way as in the sixth embodiment.

Thus in the present embodiment can perform decoding of the number of coefficients by referring to the code table and the VLC table in switching between them adaptively according to the mode: the inter picture prediction mode for inter picture prediction decoding and the intra picture prediction mode for intra picture prediction decoding.

The present embodiment shows a decoding processing method of a bit stream in which variable length coding is performed to the values of the number of coefficients themselves. It is, however, possible to perform decoding of a bit stream in which variable length coding is performed to a difference value between a predictive value and a number of coefficients. In this case, the predictive value is determined by using the numbers of the coefficients in the adjacent decoded blocks and the number of coefficients is determined by adding this value to the difference value of the number of coefficients, which is decoded by the coefficient number decoder 1506, as in the sixth embodiment.

Also, in the present embodiment, the coefficient number decoder 1403 performs variable length decoding by switching both of the code table and the VLC table. It is, however, possible to fix them rather than switching either or both of them. In this case, this is realized by preparing only a storing unit which has either one certain type of code tables or one certain type of VLC tables.

Eleventh Embodiment

If a program for realizing the structure of the coding method or the decoding method as shown in the above-mentioned embodiments is recorded on a memory medium such as a flexible disk, it becomes possible to perform the processing as shown in these embodiments easily in an independent computer system.

Figure 26A:
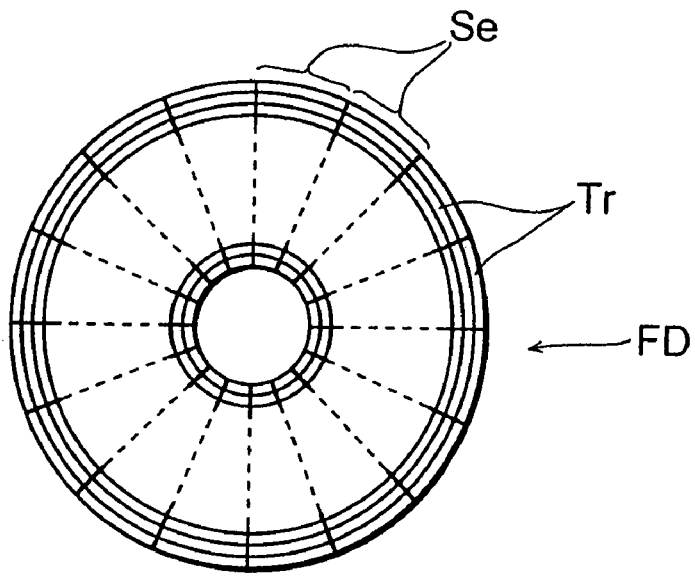
FIG. 26A and FIG. 26B are illustrations regarding a recording medium for storing a program in order to realize a picture coding method as well as a picture decoding method of each embodiment in a computing system.
Figure 26B:
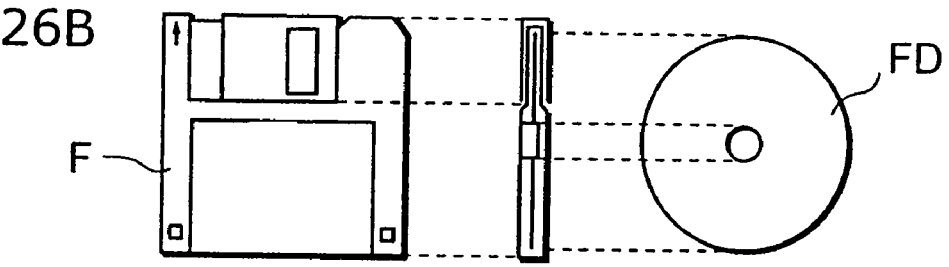
Figure 26C:
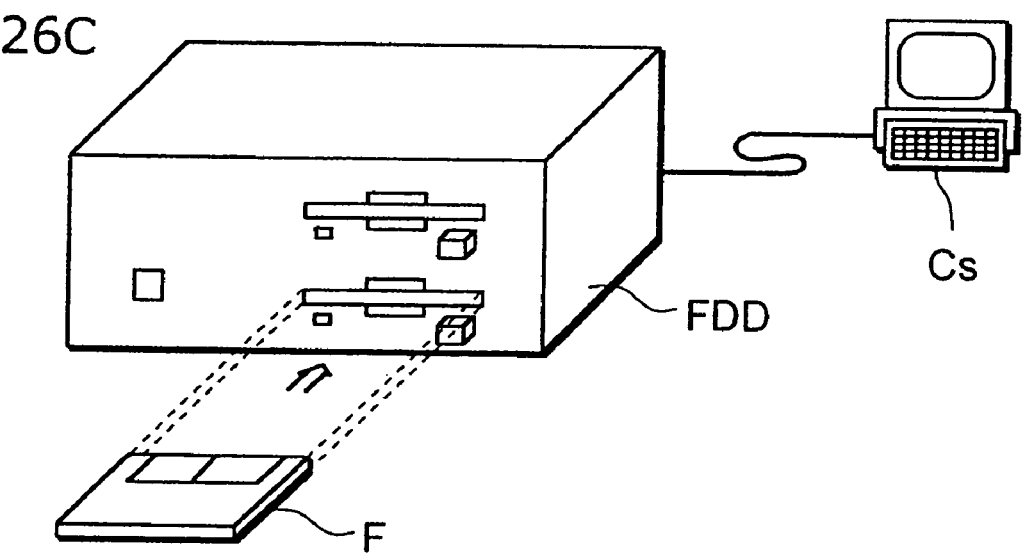
FIG. 26C is an illustration showing a structure for recording and reproducing the program on the flexible disk FD.

FIGS. 26A, 26B and 26C are illustrations showing the case where the processing shown in the 1~10 above-mentioned embodiments is performed in a computer system using a flexible disk which stores the coding method or the decoding method of the above-mentioned embodiments.

FIG. 26B shows a full appearance of a flexible disk, its structure at cross section and the flexible disk itself whereas FIG. 26A shows an example of a physical format of the flexible disk as a main body of a recording medium. A flexible disk FD is contained in a case F, a plurality of tracks Tr are formed concentrically from the periphery to the inside on the surface of the disk, and each track is divided into 16 sectors Se in the angular direction. Therefore, the flexible disk storing the above-mentioned program stores the data as the aforementioned program in an area assigned for it on the flexible disk FD.

FIG. 26C shows a structure for recording and reading out the program on the flexible disk FD. When the program is recorded on the flexible disk FD The computer system Cs writes in the data as the program via a flexible disk drive. When the coding device and the decoding device are constructed in the computer system by the program on the flexible disk, the program is read out from the flexible disk by the flexible disk drive and then transferred to the computer system.

The above explanation is made on an assumption that a flexible disk is used as a data recording medium, but the same processing can also be performed using an optical disk. In addition, the recording medium is not limited to a flexible disk and an optical disk, but any other medium such as an IC card and a ROM cassette capable of recording a program can be used.

Following is an explanation of the applications of the picture coding method as well as the picture decoding method as shown in the above-mentioned embodiments, and a system using them.

Figure 27:
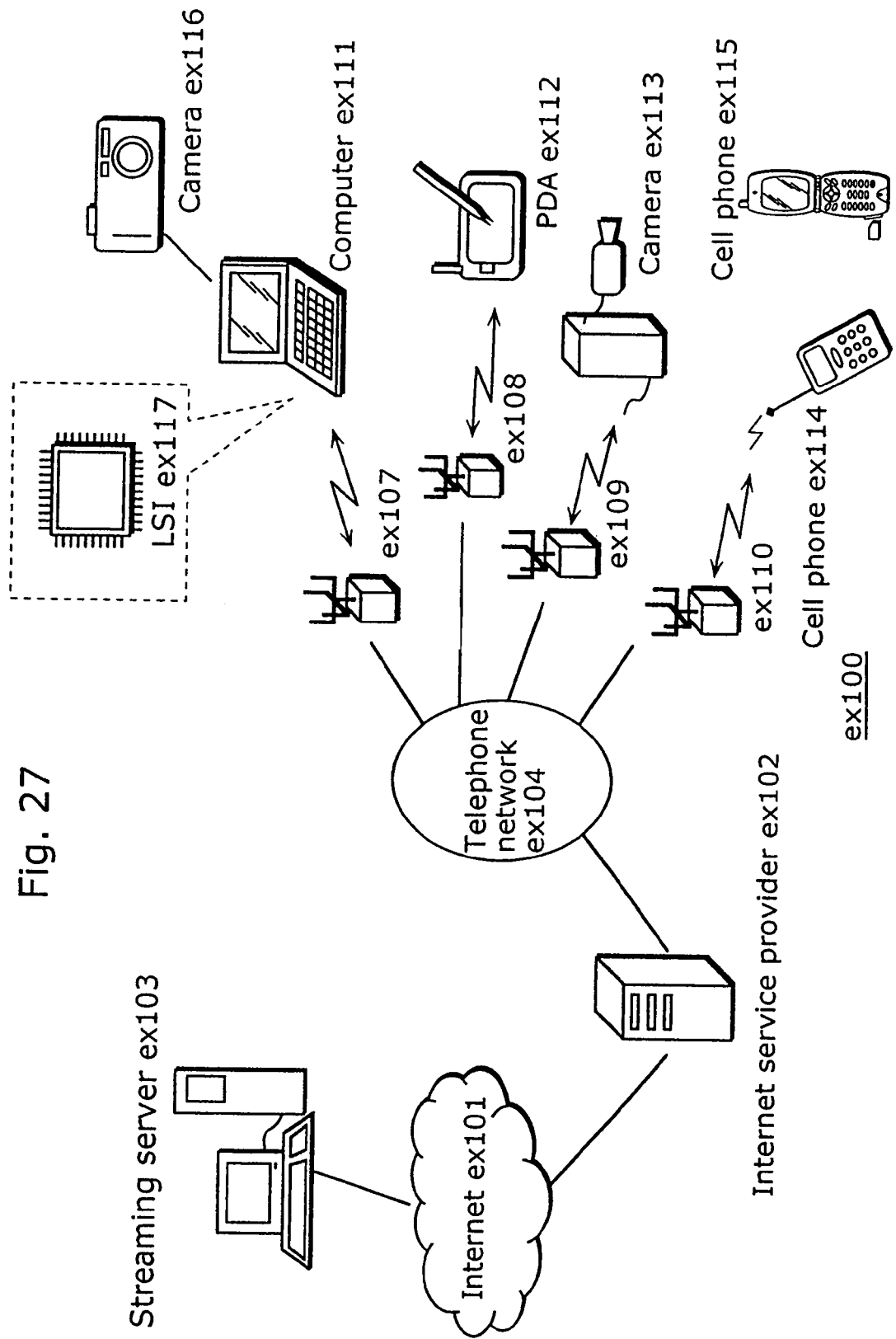
FIG. 27 is a block diagram showing a whole structure of a content providing system which realizes a content delivery service.

FIG. 27 is a block diagram showing an overall configuration of a content supply system ex100 for realizing content distribution service. The area for providing communication service is divided into cells of desired size, and cell sites ex107~ex110 which are fixed wireless stations placed in respective cells.

This content supply system ex100 is connected to devices such as a computer ex111, a PDA (Personal Digital Assistant) ex112, a camera ex113, a cell phone ex114 and a cell phone with a camera ex115 via the Internet ex101, an Internet service provider ex102, a telephone network ex104 and cell sites ex107~ex110.

However, the content supply system ex100 is not limited to the configuration as shown in FIG. 27 and may be connected to a combination of any of them. Also, each device may be connected directly to the telephone network ex104 not through the cell sites ex107~ex110.

The camera ex113 is a device capable of shooting video such as a digital video camera. The cell phone ex114 may be a cell phone of a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) or the like.

A streaming server ex103 is connected to the camera ex113 via the telephone network ex104 and the cell site ex109, which realizes a live distribution or the like using the camera ex113 based on the coded data transmitted from the user. Either the camera ex113 or the server which transmits the data may code the data. Also, the picture data shot by a camera ex116 may be transmitted to the streaming server ex103 via the computer ex111. In this case, either the camera ex116 or the computer ex111 may code the picture data. An LSI ex117 included in the computer ex111 or the camera ex116 actually performs coding processing. Software for coding and decoding pictures may be integrated into any type of storage medium (such as a CD-ROM, a flexible disk and a hard disk) that is a recording medium which is readable by the computer ex111 or the like. Furthermore, a cell phone with a camera ex115 may transmit the picture data. This picture data is the data coded by the LSI included in the cell phone ex115.

The content supply system ex100 codes contents (such as a music live video) shot by users using the camera ex113, the camera ex116 or the like in the same way as shown in the above-mentioned embodiments and transmits them to the streaming server ex103, while the streaming server ex103 makes stream distribution of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting.

When each device in this system performs coding or decoding, the picture coding device or the picture decoding device, as shown in the above-mentioned embodiments, can be used.

A cell phone will be explained as an example of the device.

Figure 28:
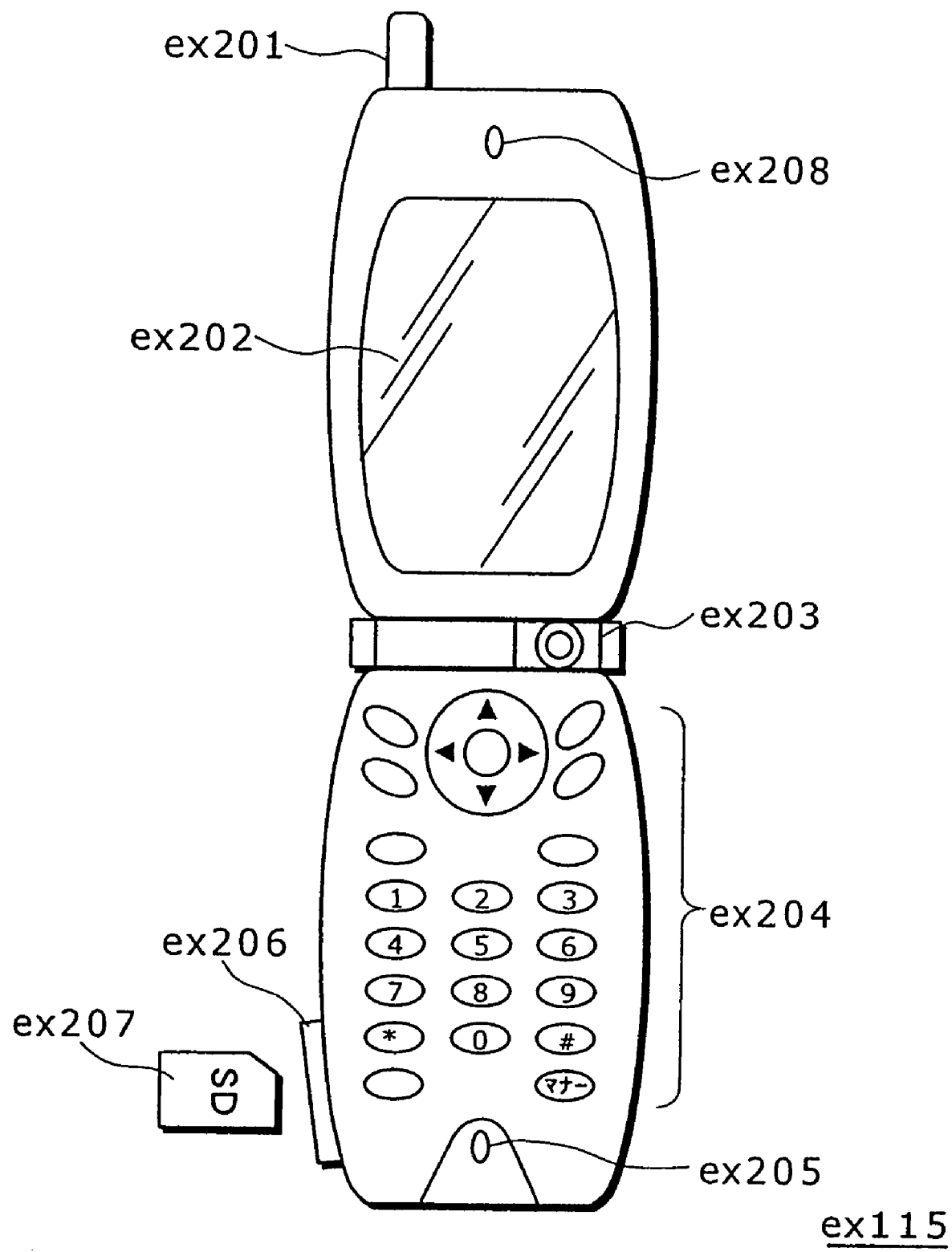
FIG. 28 is a sketch showing an example of a cell phone.

FIG. 28 is a diagram showing the cell phone ex115 using the picture coding method and the picture decoding method explained in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 and received by the antenna ex201, a body unit including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera, data of received e-mails and data of moving or still pictures, and a slot unit ex206 for attaching the storage medium ex207 to the cell phone ex115. The storage medium ex207 stores in itself a flash memory element, a kind of EEPROM (Electrically Erasable and Programmable Read Only Memory) that is a nonvolatile memory electrically erasable from and rewritable to a plastic case such as a SD card.

Next, the cell phone ex115 will be explained with reference to FIG. 29. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a read/write unit ex307, a modem circuit unit ex306 and a voice processing unit ex305 via a synchronous bus ex313.

When a call-end key or a power key is turned ON by a user's operation, the power supply circuit unit ex310 supplies respective units with power from a battery pack so as to activate the camera attached digital cell phone ex115 as a ready state.

In the cell phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing of the digital voice data, and the communication circuit unit ex301 performs digital-to-analog conversion and frequency transformation of the data, so as to transmit it via the antenna ex201. Also, in the cell phone ex115, the communication circuit unit ex301 amplifies the data received by the antenna ex201 in conversation mode and performs frequency transformation and analog-to-digital conversion to the data, the modem circuit unit ex306 performs inverse spread spectrum processing of the data, and the voice processing unit ex305 converts it into analog voice data, so as to output it via the voice output unit 208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency transformation to it, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit 202 via the camera interface unit ex303 and the LCD control unit ex302.

The picture coding unit ex312, which includes the picture coding device as explained in the present invention, compresses and codes the picture data supplied from the camera unit ex203 by the coding method used for the picture coding device as shown in the above-mentioned first embodiment so as to transform it into coded picture data, and sends it out to the multiplexing/demultiplexing unit ex308. At this time, the cell phone ex115 sends out the voices received by the voice input unit ex205 during the shooting with the camera unit ex203 to the multiplexing/demultiplexing unit ex308 as digital voice data via the voice processing unit ex305.

The multiplexing/demultiplexing unit ex308 multiplexes the coded picture data supplied from the picture coding unit ex312 and the voice data supplied from the voice processing unit ex305 using a predetermined method, the modem circuit unit ex306 performs spread spectrum processing of the multiplexed data obtained as a result of the multiplexing, and the communication circuit unit ex301 performs digital-to-analog conversion and frequency transformation of the data for the transmission via the antenna ex201.

As for receiving data of a moving picture file which is linked to a Web page or the like in data communication mode, the modem circuit unit ex306 performs inverse spread spectrum processing of the data received from the cell site ex110 via the antenna ex201, and sends out the multiplexed data obtained as a result of the processing to the multiplexing/demultiplexing unit ex308.

In order to decode the multiplexed data received via the antenna ex201, the multiplexing/demultiplexing unit ex308 separates the multiplexed data into a bit stream of picture data and a bit stream of voice data, and supplies the coded picture data to the picture decoding unit ex309 and the voice data to the voice processing unit ex305 respectively via the synchronous bus ex313.

Next, the picture decoding unit ex309, which includes the picture decoding device as explained in the above-mentioned invention, decodes the bit stream of picture data by the decoding method corresponding to the coding method as shown in the above-mentioned embodiments to generate reproduced moving picture data, and supplies this data to the display unit ex202 via the LCD control unit ex302, and thus picture data included in a moving picture file linked to a Web page, for instance, is displayed. At the same time, the voice processing unit ex305 converts the voice data into analog voice data, and supplies this data to the voice output unit ex208, and thus voice data included in the moving picture file linked to a Web page, for instance, is reproduced.

Figure 30:
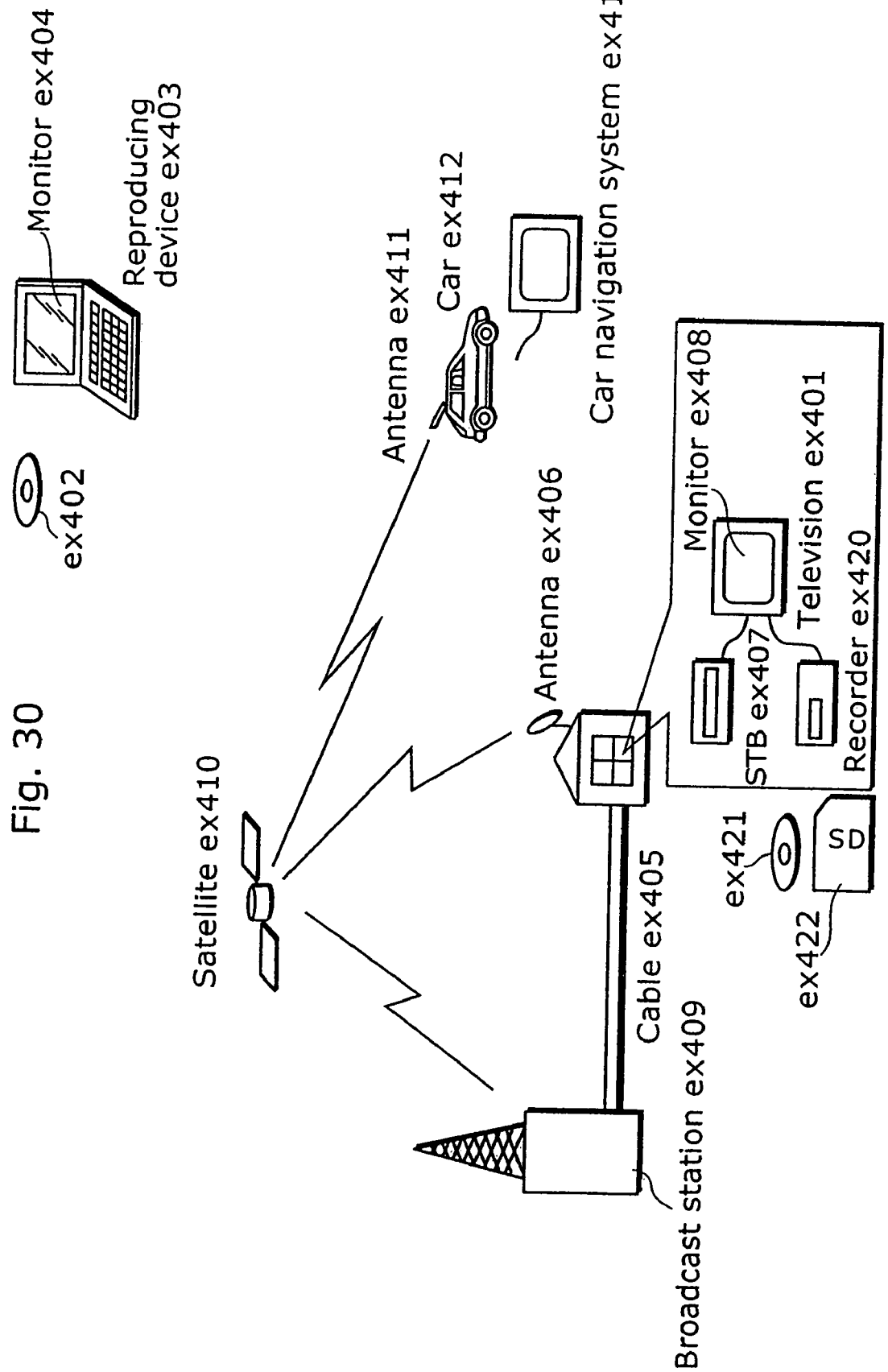
FIG. 30 is a block diagram showing a whole system of a digital broadcasting system.

The present invention is not limited to the above-mentioned system, and either the picture coding device or the picture decoding device in the above-mentioned embodiments can be incorporated into a digital broadcasting system as shown in FIG. 30. Such ground-based or satellite digital broadcasting has been in the news lately. More specifically, a bit stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a set top box (STB) ex407 decodes the bit stream for reproduction. The picture decoding device as shown in the above-mentioned embodiment can be implemented in the reproducing device ex403 for reading out and decoding the bit stream recorded on a storage medium ex402 that is a recording medium such as a CD and a DVD. In this case, the reproduced video signals are displayed on a monitor ex404. It is also conceivable to implement the picture decoding device in the set top box ex407 connected to a cable ex405 for a cable television or the antenna ex406 for satellite and/or ground-based broadcasting so as to reproduce them on a monitor ex408 of the television ex401. The picture decoding device may be incorporated into the television, not in the set top box. Also, a car ex412 having an antenna ex411 can receive signals from the satellite ex410 or the cell site ex107 for reproducing moving pictures on a display device such as a car navigation system ex413.

Furthermore, the picture coding device as shown in the above-mentioned embodiments can code picture signals for recording on a recording medium. As a concrete example, there is a recorder ex420 such as a DVD recorder for recording picture signals on a DVD disk ex421 and a disk recorder for recording them on a hard disk. They can be recorded on an SD card ex422. If the recorder ex420 includes the picture decoding device as shown in the above-mentioned embodiments, the picture signals recorded on the DVD disk ex421 or the SD card ex422 can be reproduced for display on the monitor ex408.

Figure 29:
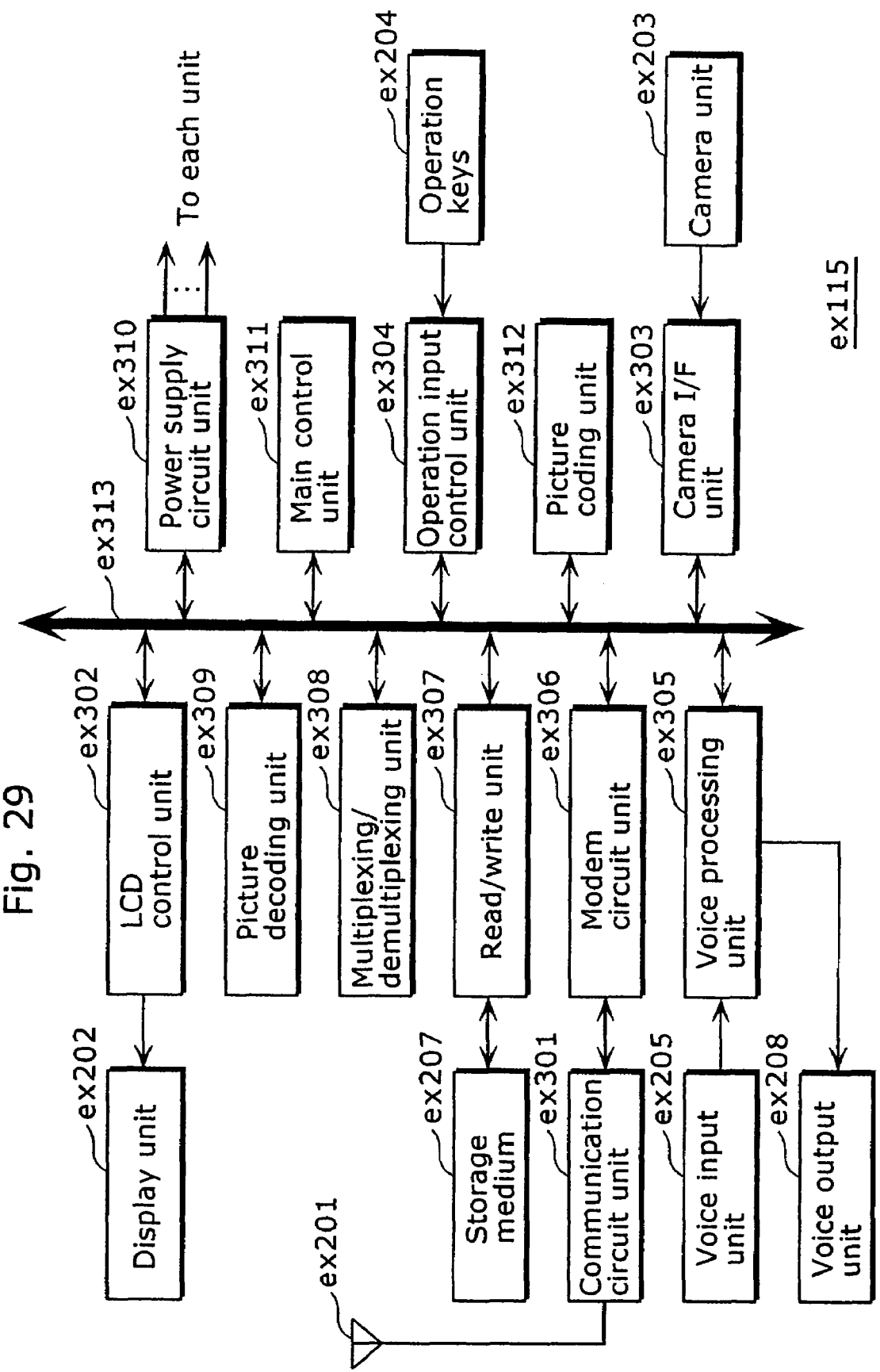
FIG. 29 is a block diagram showing an internal structure of the cell phone.

As for the structure of the car navigation system ex413, the structure without the camera unit ex203, the camera interface unit ex303 and the picture coding unit ex312, out of the components shown in FIG. 29, is conceivable. The same goes for the computer ex111, the television (receiver) ex401 and others.

In addition, three types of implementations can be conceived for a terminal such as the above-mentioned cell phone ex114; a sending/receiving terminal implemented with both an encoder and a decoder, a sending terminal implemented with an encoder only, and a receiving terminal implemented with a decoder only.

As described above, it is possible to use the picture coding method or the picture decoding method in the above-mentioned embodiments for any of the above-mentioned devices and systems, and by using this method, the effects described in the above-mentioned embodiments can be obtained.

Also, the present invention is not limited to the above-mentioned embodiments and a wide range of variations or modifications within the scope of the following claims are possible.

A picture coding method according to the present invention improves coding efficiency since optimal tables for variable length coding can be referred to when the number of coefficients other than 0 contained in a current block to be coded is encoded.

Also, a picture decoding method according to the present invention decodes correctly a bit stream in which a number of coefficients other than 0 contained in a block after orthogonal transformation is coded with reference to optimal tables for variable length coding.

INDUSTRIAL APPLICABILITY

Thus, the picture coding method and the picture decoding method according to the present invention are useful as a method to encode an image so as to create a bit stream as well as to decode the created bit stream using devices such as a cell phone, a DVD device, a personal computer or the like.

The invention claimed is:

1. A coding method for coding an image on a block basis, the method comprising:
   determining a predictive value for a total number of non-zero coefficients included in a current block to be coded based on a total number of non-zero coefficients included in a coded block located above the current block and a total number of non-zero coefficients included in a coded block located to the left of the current block, wherein each non-zero coefficient is a transform coefficient having a level value other than "0";
   selecting a variable length code table based on the determined predictive value; and
   coding the total number of non-zero coefficients included in the current block by using the selected variable length code table,
   wherein
   the predictive value is determined based on the total number of non-zero coefficients included in the coded block located to the left of the current block when an upper boundary of the current block is a boundary of a slice which is one of a plurality of sections into which the picture is divided, and a left boundary of the current block is not the boundary of the slice, and
   the predictive value is determined based on the total number of non-zero coefficients included in the coded block located above the current block when a left boundary of the current block is a boundary of a slice which is one of a plurality of sections into which the picture is divided, and an upper boundary of the current block is not the boundary of the slice.

2. A coding method for coding an image on a block basis, the method comprising:
   determining a predictive value for a total number of non-zero coefficients included in a current block to be coded based on a total number of non-zero coefficients included in a coded block located above the current block and a total number of non-zero coefficients included in a coded block located to the left of the current block, wherein each non-zero coefficient is a transform coefficient having a level value other than "0";
   selecting a variable length code table based on the determined predictive value; and
   coding the total number of non-zero coefficients included in the current block by using the selected variable length code table,
   wherein, in a case of when one of the two coded blocks located above and to the left of the current block is located outside a slice including the current block, the predictive value is determined based on the total number of non-zero coefficients included in the other of the two coded blocks.

* * * * *